(12) United States Patent
Sumnicht et al.

(10) Patent No.: US 9,456,729 B2
(45) Date of Patent: *Oct. 4, 2016

(54) METHOD OF CLEANING RESIDUE FROM A SURFACE USING A HIGH EFFICIENCY DISPOSABLE CELLULOSIC WIPER

(71) Applicant: Georgia-Pacific Consumer Products LP, Atlanta, GA (US)

(72) Inventors: Daniel W. Sumnicht, Hobart, WI (US); Joseph H. Miller, Neenah, WI (US)

(73) Assignee: Georgia-Pacific Consumer Products LP, Atlanta, GA (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/611,324

(22) Filed: Feb. 2, 2015

(65) Prior Publication Data

US 2015/0144157 A1 May 28, 2015

Related U.S. Application Data

(60) Division of application No. 14/168,071, filed on Jan. 30, 2014, now Pat. No. 8,980,011, which is a continuation of application No. 13/430,757, filed on Mar. 27, 2012, now Pat. No. 8,778,086, which is a division of application No. 12/284,148, filed on Sep. 17, 2008, now Pat. No. 8,187,422, which is a continuation-in-part of application No. 11/725,253, filed on Mar. 19, 2007, now Pat. No. 7,718,036.

(60) Provisional application No. 60/994,483, filed on Sep. 19, 2007, provisional application No. 60/784,228, filed on Mar. 21, 2006, provisional application No. 60/850,467, filed on Oct. 10, 2006, provisional application No. 60/850,681, filed on Oct. 10, 2006, provisional application No. 60/881,310, filed on Jan. 19, 2007.

(51) Int. Cl.

| | |
|---|---|
| *B08B 1/00* | (2006.01) |
| *D21H 13/08* | (2006.01) |
| *D21H 21/18* | (2006.01) |
| *D21H 21/20* | (2006.01) |
| *D21H 17/52* | (2006.01) |
| *D21H 17/55* | (2006.01) |
| *D21H 11/18* | (2006.01) |
| *A47L 13/16* | (2006.01) |
| *D21H 27/00* | (2006.01) |
| *D21H 11/04* | (2006.01) |
| *D21H 11/20* | (2006.01) |
| *D21H 17/27* | (2006.01) |
| *C11D 17/04* | (2006.01) |

(52) U.S. Cl.
CPC ............. *A47L 13/16* (2013.01); *B08B 1/006* (2013.01); *C11D 17/049* (2013.01); *D21H 11/04* (2013.01); *D21H 11/18* (2013.01); *D21H 11/20* (2013.01); *D21H 13/08* (2013.01); *D21H 17/27* (2013.01); *D21H 17/52* (2013.01); *D21H 17/55* (2013.01); *D21H 21/18* (2013.01); *D21H 21/20* (2013.01); *D21H 27/002* (2013.01); *D21H 27/005* (2013.01); *D21H 27/007* (2013.01); *Y10T 428/249965* (2015.04); *Y10T 428/2904* (2015.01); *Y10T 428/2965* (2015.01)

(58) Field of Classification Search
CPC .... D21H 11/17; D21H 13/07; D21H 27/002; D21H 21/18; B08B 1/006; A47K 13/16
USPC ............. 162/109, 141, 146, 149–150, 157.1, 162/157.6, 157.7, 158, 164.1, 164.3, 164.6, 162/168.1, 168.2, 179, 177; 428/292.1, 428/304.4, 311.11, 311.51, 311.7, 359, 428/364–365, 393; 442/333–335, 414; 134/6, 25.1, 25.2, 40; 15/208, 209.1; 51/303
See application file for complete search history.

(56) References Cited

U.S. PATENT DOCUMENTS

| | | |
|---|---|---|
| 2,428,046 A | 9/1947 | Sisson et al. |
| 2,440,761 A | 5/1948 | Sisson et al. |

(Continued)

FOREIGN PATENT DOCUMENTS

| | | |
|---|---|---|
| EP | 1 302 146 A2 | 4/2003 |
| EP | 1 302 592 A1 | 4/2003 |

(Continued)

OTHER PUBLICATIONS

Dymrose-Peterson, Katharine. "Smart Materials for Liquid Control," Nonwovens World, Oct.-Nov. 1999, pp. 95-99.

(Continued)

*Primary Examiner* — Jose Fortuna
(74) *Attorney, Agent, or Firm* — Laura L. Bozek

(57) ABSTRACT

A method of cleaning residue from a surface includes providing a disposable cellulosic wiper including a percentage by weight of pulp-derived papermaking fibers, and a percentage by weight of regenerated independent cellulosic microfibers having a number average diameter of less than about 2 microns and a characteristic Canadian Standard Freeness (CSF) value of less than 175 ml. The microfibers are selected and present in amounts such that the wiper exhibits a relative wicking ratio of at least 1.5. The wiper is applied, with a predetermined amount of pressure, to a residue-bearing surface. The surface is wiped with the applied wiper, while applying the predetermined amount of pressure, to remove residue from the surface, such that the surface has less than 1 g/m$^2$ of residue after being wiped under the predetermined amount of pressure.

19 Claims, 26 Drawing Sheets

(56) References Cited

U.S. PATENT DOCUMENTS

| | | |
|---|---|---|
| 2,996,424 A | 8/1961 | Voigtman et al. |
| 3,009,822 A | 11/1961 | Drelich et al. |
| 3,047,445 A | 7/1962 | Gresham |
| 3,175,339 A | 3/1965 | McDowell |
| 3,209,402 A | 10/1965 | Riley et al. |
| 3,337,671 A | 8/1967 | Drisch et al. |
| 3,351,696 A | 11/1967 | Drisch |
| 3,382,140 A | 5/1968 | Henderson et al. |
| 3,491,495 A | 1/1970 | Prince |
| 3,508,941 A | 4/1970 | Johnson |
| 3,508,945 A | 4/1970 | Haemer et al. |
| 3,556,932 A | 1/1971 | Coscia et al. |
| 3,556,933 A | 1/1971 | Williams et al. |
| 3,700,623 A | 10/1972 | Keim |
| 3,772,076 A | 11/1973 | Keim |
| 3,785,918 A | 1/1974 | Kawai et al. |
| 3,965,518 A | 6/1976 | Muoio |
| 3,994,771 A | 11/1976 | Morgan, Jr. et al. |
| 4,036,679 A | 7/1977 | Back et al. |
| 4,100,324 A | 7/1978 | Anderson et al. |
| 4,102,737 A | 7/1978 | Morton |
| 4,145,532 A | 3/1979 | Franks et al. |
| 4,196,282 A | 4/1980 | Franks et al. |
| 4,246,221 A | 1/1981 | McCorsley, III |
| 4,267,047 A | 5/1981 | Henne et al. |
| 4,307,143 A | 12/1981 | Meitner |
| 4,374,702 A | 2/1983 | Turbak et al. |
| 4,426,228 A | 1/1984 | Brandner et al. |
| 4,426,417 A | 1/1984 | Meitner et al. |
| 4,436,780 A | 3/1984 | Hotchkiss et al. |
| 4,441,962 A | 4/1984 | Osborn, III |
| 4,481,076 A | 11/1984 | Herrick |
| 4,481,077 A | 11/1984 | Herrick |
| 4,483,743 A | 11/1984 | Turbak et al. |
| 4,528,316 A | 7/1985 | Soerens |
| 4,529,480 A | 7/1985 | Trokhan |
| 4,720,383 A | 1/1988 | Drach et al. |
| 4,735,849 A | 4/1988 | Murakami et al. |
| 4,802,942 A | 2/1989 | Takemura et al. |
| 4,906,513 A | 3/1990 | Kebbell et al. |
| 4,908,097 A | 3/1990 | Box |
| 4,931,201 A | 6/1990 | Julemont |
| 4,987,632 A | 1/1991 | Rowe et al. |
| 5,039,431 A | 8/1991 | Johnson et al. |
| 5,124,197 A | 6/1992 | Bernardin et al. |
| 5,213,588 A | 5/1993 | Wong et al. |
| 5,223,096 A | 6/1993 | Phan et al. |
| 5,227,024 A | 7/1993 | Gomez |
| 5,262,007 A | 11/1993 | Phan et al. |
| 5,264,082 A | 11/1993 | Phan et al. |
| 5,269,470 A | 12/1993 | Ishikawa et al. |
| 5,312,522 A | 5/1994 | Van Phan et al. |
| 5,320,710 A | 6/1994 | Reeves et al. |
| 5,354,524 A | 10/1994 | Sellars et al. |
| 5,385,640 A | 1/1995 | Weibel et al. |
| 5,415,737 A | 5/1995 | Phan et al. |
| 5,505,768 A | 4/1996 | Altadonna |
| 5,562,739 A | 10/1996 | Urben |
| 5,580,356 A | 12/1996 | Taylor |
| 5,582,681 A | 12/1996 | Back et al. |
| 5,607,551 A | 3/1997 | Farrington, Jr. et al. |
| H1672 H | 8/1997 | Hermans et al. |
| 5,688,468 A | 11/1997 | Lu |
| 5,725,821 A | 3/1998 | Gannon et al. |
| 5,759,210 A | 6/1998 | Potter et al. |
| 5,759,926 A | 6/1998 | Pike et al. |
| 5,779,737 A | 7/1998 | Potter et al. |
| 5,785,813 A | 7/1998 | Smith et al. |
| 5,786,065 A | 7/1998 | Annis et al. |
| 5,858,021 A | 1/1999 | Sun et al. |
| 5,863,652 A | 1/1999 | Matsumura et al. |
| 5,895,710 A | 4/1999 | Sasse et al. |
| 5,935,880 A | 8/1999 | Wang et al. |
| 5,964,983 A | 10/1999 | Dinand et al. |
| 6,001,218 A | 12/1999 | Hsu et al. |
| 6,042,769 A | 3/2000 | Gannon et al. |
| 6,074,527 A | 6/2000 | Hsu et al. |
| 6,117,545 A | 9/2000 | Cavaille et al. |
| 6,146,494 A | 11/2000 | Seger et al. |
| 6,153,136 A | 11/2000 | Collier et al. |
| 6,183,596 B1 | 2/2001 | Matsuda et al. |
| 6,187,137 B1 | 2/2001 | Druecke et al. |
| 6,214,163 B1 | 4/2001 | Matsuda et al. |
| 6,221,487 B1 | 4/2001 | Luo et al. |
| 6,235,392 B1 | 5/2001 | Luo et al. |
| 6,245,197 B1 | 6/2001 | Oriaran et al. |
| 6,258,210 B1 | 7/2001 | Takeuchi et al. |
| 6,258,304 B1 | 7/2001 | Bahia |
| 6,267,898 B1 | 7/2001 | Fukuda et al. |
| 6,273,995 B1 | 8/2001 | Ikeda et al. |
| 6,287,419 B1 | 9/2001 | Takeuchi et al. |
| 6,340,663 B1 | 1/2002 | Deleo et al. |
| 6,344,109 B1 | 2/2002 | Gross |
| 6,432,267 B1 | 8/2002 | Watson |
| 6,440,547 B1 | 8/2002 | Luo et al. |
| 6,444,314 B1 | 9/2002 | Luo et al. |
| 6,447,640 B1 | 9/2002 | Watson et al. |
| 6,461,476 B1 | 10/2002 | Goulet et al. |
| 6,471,727 B2 | 10/2002 | Luo et al. |
| 6,491,788 B2 | 12/2002 | Sealey, II et al. |
| 6,511,746 B1 | 1/2003 | Collier et al. |
| 6,514,613 B2 | 2/2003 | Luo et al. |
| 6,533,898 B2 | 3/2003 | Gross |
| 6,540,853 B1 | 4/2003 | Suzuki et al. |
| 6,544,912 B1 | 4/2003 | Tanio et al. |
| 6,573,204 B1 | 6/2003 | Philipp et al. |
| 6,582,560 B2 | 6/2003 | Runge et al. |
| 6,596,033 B1 | 7/2003 | Luo et al. |
| 6,602,386 B1 | 8/2003 | Takeuchi et al. |
| 6,624,100 B1 | 9/2003 | Pike |
| 6,635,146 B2 | 10/2003 | Lonsky et al. |
| 6,645,618 B2 | 11/2003 | Hobbs et al. |
| 6,673,205 B2 | 1/2004 | Kokko |
| 6,692,827 B2 | 2/2004 | Luo et al. |
| 6,706,237 B2 | 3/2004 | Luo et al. |
| 6,706,876 B2 | 3/2004 | Luo et al. |
| 6,746,976 B1 | 6/2004 | Urankar et al. |
| 6,749,718 B2 | 6/2004 | Takai et al. |
| 6,767,634 B2 | 7/2004 | Krishnaswamy |
| 6,773,648 B2 | 8/2004 | Luo et al. |
| 6,808,557 B2 | 10/2004 | Holbrey et al. |
| 6,824,599 B2 | 11/2004 | Swatloski et al. |
| 6,832,612 B2 | 12/2004 | Zhao et al. |
| 6,833,187 B2 | 12/2004 | Luo et al. |
| 6,835,311 B2 | 12/2004 | Koslow |
| 6,841,038 B2 | 1/2005 | Horenziak et al. |
| 6,849,329 B2 | 2/2005 | Perez et al. |
| 6,861,023 B2 | 3/2005 | Sealey, II et al. |
| 6,872,311 B2 | 3/2005 | Koslow |
| 6,890,649 B2 | 5/2005 | Hobbs et al. |
| 6,899,790 B2 | 5/2005 | Lee |
| 6,936,136 B2 | 8/2005 | Shannon et al. |
| 6,951,895 B1 | 10/2005 | Qin et al. |
| 6,969,443 B1 | 11/2005 | Kokko |
| 6,984,290 B2 | 1/2006 | Runge et al. |
| 7,037,405 B2 | 5/2006 | Nguyen et al. |
| 7,067,444 B2 | 6/2006 | Luo et al. |
| 7,083,704 B2 | 8/2006 | Sealey, II et al. |
| 7,094,317 B2 | 8/2006 | Lundberg et al. |
| 7,097,737 B2 | 8/2006 | Luo et al. |
| 7,195,694 B2 | 3/2007 | Von Drach et al. |
| 7,241,711 B2 | 7/2007 | Takai et al. |
| 7,250,382 B2 | 7/2007 | Takai et al. |
| 7,258,764 B2 | 8/2007 | Mauler |
| 7,276,166 B2 | 10/2007 | Koslow |
| 7,296,691 B2 | 11/2007 | Koslow |
| 7,381,294 B2 | 6/2008 | Suzuki et al. |
| 7,390,378 B2 | 6/2008 | Carels et al. |
| 7,399,378 B2 | 7/2008 | Edwards et al. |
| 7,442,278 B2 | 10/2008 | Murray et al. |
| 7,494,563 B2 | 2/2009 | Edwards et al. |
| 7,503,998 B2 | 3/2009 | Murray et al. |
| 7,566,014 B2 | 7/2009 | Koslow et al. |
| 7,585,388 B2 | 9/2009 | Yeh et al. |

(56) References Cited

U.S. PATENT DOCUMENTS

| | | | |
|---|---|---|---|
| 7,585,389 B2 | 9/2009 | Yeh et al. | |
| 7,585,392 B2 | 9/2009 | Kokko et al. | |
| 7,588,660 B2 | 9/2009 | Edwards et al. | |
| 7,588,831 B2 | 9/2009 | Akiyama et al. | |
| 7,605,096 B2 | 10/2009 | Tomarchio et al. | |
| 7,608,164 B2 | 10/2009 | Chou et al. | |
| 7,655,112 B2 | 2/2010 | Koslow | |
| 7,662,257 B2 | 2/2010 | Edwards et al. | |
| 7,691,760 B2 | 4/2010 | Bergsten et al. | |
| 7,696,109 B2 | 4/2010 | Ouellette et al. | |
| 7,700,764 B2 | 4/2010 | Heijnesson-Hultén | |
| 7,718,036 B2 | 5/2010 | Sumnicht et al. | |
| 7,763,715 B2 | 7/2010 | Hecht et al. | |
| 7,789,995 B2 | 9/2010 | Super et al. | |
| 7,799,169 B2 | 9/2010 | Bhat et al. | |
| 7,799,968 B2 | 9/2010 | Chen et al. | |
| 7,820,008 B2 | 10/2010 | Edwards et al. | |
| 7,850,823 B2 | 12/2010 | Chou et al. | |
| 7,888,412 B2 | 2/2011 | Holbrey et al. | |
| 7,951,264 B2 | 5/2011 | Sumnicht | |
| 7,951,266 B2 | 5/2011 | Kokko et al. | |
| 7,959,761 B2 | 6/2011 | Boettcher et al. | |
| 7,972,474 B2 | 7/2011 | Underhill et al. | |
| 7,985,321 B2 | 7/2011 | Sumnicht et al. | |
| 7,998,313 B2 | 8/2011 | Kokko | |
| 8,012,312 B2 | 9/2011 | Goto et al. | |
| 8,025,764 B2 | 9/2011 | Bhat et al. | |
| 8,030,231 B2 | 10/2011 | Lange et al. | |
| 8,066,849 B2 | 11/2011 | Kokko et al. | |
| 8,152,957 B2 | 4/2012 | Edwards et al. | |
| 8,152,958 B2 | 4/2012 | Super et al. | |
| 8,177,938 B2 | 5/2012 | Sumnicht | |
| 8,187,421 B2 | 5/2012 | Sumnicht et al. | |
| 8,187,422 B2 | 5/2012 | Sumnicht et al. | |
| 8,216,424 B2 | 7/2012 | Bhat et al. | |
| 8,216,425 B2 | 7/2012 | Sumnicht et al. | |
| 8,257,552 B2 | 9/2012 | Edwards et al. | |
| 8,318,859 B2 | 11/2012 | Amano et al. | |
| 8,357,734 B2 | 1/2013 | Kokko | |
| 8,361,278 B2 | 1/2013 | Fike et al. | |
| 8,444,808 B2 | 5/2013 | Koslow et al. | |
| 8,540,846 B2 * | 9/2013 | Miller | B31F 1/126 162/109 |
| 8,591,982 B2 | 11/2013 | Lundberg et al. | |
| 8,632,658 B2 * | 1/2014 | Miller | B31F 1/126 162/109 |
| 8,778,086 B2 * | 7/2014 | Sumnicht | D21H 13/08 134/25.2 |
| 8,864,944 B2 | 10/2014 | Miller et al. | |
| 8,968,516 B2 | 3/2015 | Super et al. | |
| 8,980,011 B2 * | 3/2015 | Sumnicht | D21H 13/08 134/25.2 |
| 8,980,055 B2 | 3/2015 | Sumnicht et al. | |
| 9,045,863 B2 | 6/2015 | Dwiggins et al. | |
| 9,045,864 B2 | 6/2015 | Dwiggins et al. | |
| 9,051,691 B2 | 6/2015 | Miller et al. | |
| 9,057,158 B2 | 6/2015 | Miller et al. | |
| 2001/0028955 A1 | 10/2001 | Luo et al. | |
| 2002/0031966 A1 | 3/2002 | Tomarchio et al. | |
| 2002/0036070 A1 | 3/2002 | Luo et al. | |
| 2002/0037407 A1 | 3/2002 | Luo et al. | |
| 2002/0041961 A1 | 4/2002 | Sealey, II et al. | |
| 2002/0060382 A1 | 5/2002 | Luo et al. | |
| 2002/0064654 A1 | 5/2002 | Luo et al. | |
| 2002/0074009 A1 | 6/2002 | Zhao et al. | |
| 2002/0074097 A1 | 6/2002 | Gross | |
| 2002/0076556 A1 | 6/2002 | Luo et al. | |
| 2002/0081428 A1 | 6/2002 | Luo et al. | |
| 2002/0088572 A1 | 7/2002 | Sealey, II et al. | |
| 2002/0088575 A1 | 7/2002 | Lonsky et al. | |
| 2002/0096294 A1 | 7/2002 | Nicholass et al. | |
| 2002/0160186 A1 | 10/2002 | Luo et al. | |
| 2002/0162635 A1 | 11/2002 | Hsu et al. | |
| 2002/0168912 A1 | 11/2002 | Bond et al. | |
| 2003/0024669 A1 | 2/2003 | Kokko | |
| 2003/0025252 A1 | 2/2003 | Sealey, II et al. | |
| 2003/0056916 A1 | 3/2003 | Horenziak et al. | |
| 2003/0065059 A1 | 4/2003 | Krishnaswamy | |
| 2003/0099821 A1 | 5/2003 | Takai et al. | |
| 2003/0100240 A1 | 5/2003 | Takai et al. | |
| 2003/0114059 A1 | 6/2003 | Suzuki et al. | |
| 2003/0135181 A1 | 7/2003 | Chen et al. | |
| 2003/0144640 A1 | 7/2003 | Nguyen | |
| 2003/0157351 A1 | 8/2003 | Swatloski et al. | |
| 2003/0159786 A1 | 8/2003 | Runge et al. | |
| 2003/0168401 A1 | 9/2003 | Koslow | |
| 2003/0177909 A1 | 9/2003 | Koslow | |
| 2003/0178166 A1 | 9/2003 | Takeuchi et al. | |
| 2003/0200991 A1 | 10/2003 | Keck et al. | |
| 2003/0203695 A1 | 10/2003 | Polanco et al. | |
| 2004/0038031 A1 | 2/2004 | Holbrey et al. | |
| 2004/0045687 A1 | 3/2004 | Shannon et al. | |
| 2004/0058140 A1 | 3/2004 | Hobbs et al. | |
| 2004/0123962 A1 | 7/2004 | Shannon et al. | |
| 2004/0144510 A1 | 7/2004 | Mauler | |
| 2004/0178142 A1 | 9/2004 | Koslow | |
| 2004/0203306 A1 | 10/2004 | Grafe et al. | |
| 2004/0206463 A1 | 10/2004 | Luo et al. | |
| 2004/0207110 A1 | 10/2004 | Luo et al. | |
| 2004/0209078 A1 | 10/2004 | Luo et al. | |
| 2004/0226671 A1 | 11/2004 | Nguyen et al. | |
| 2004/0238135 A1 | 12/2004 | Edwards et al. | |
| 2005/0006040 A1 | 1/2005 | Boettcher et al. | |
| 2005/0011827 A1 | 1/2005 | Koslow | |
| 2005/0051487 A1 | 3/2005 | Koslow | |
| 2005/0074542 A1 | 4/2005 | Lundberg et al. | |
| 2005/0148264 A1 | 7/2005 | Varona et al. | |
| 2005/0176326 A1 | 8/2005 | Bond et al. | |
| 2005/0217814 A1 | 10/2005 | Super et al. | |
| 2005/0241786 A1 | 11/2005 | Edwards et al. | |
| 2005/0241787 A1 | 11/2005 | Murray et al. | |
| 2005/0274469 A1 | 12/2005 | Lundberg et al. | |
| 2005/0279471 A1 | 12/2005 | Murray et al. | |
| 2005/0288484 A1 | 12/2005 | Holbrey et al. | |
| 2006/0019571 A1 | 1/2006 | Lange et al. | |
| 2006/0090271 A1 | 5/2006 | Price et al. | |
| 2006/0141881 A1 | 6/2006 | Bergsten et al. | |
| 2006/0207722 A1 | 9/2006 | Amano et al. | |
| 2006/0237154 A1 | 10/2006 | Edwards et al. | |
| 2006/0240727 A1 | 10/2006 | Price et al. | |
| 2006/0240728 A1 | 10/2006 | Price et al. | |
| 2006/0241287 A1 | 10/2006 | Hecht et al. | |
| 2006/0289132 A1 | 12/2006 | Heijnesson-Hulten | |
| 2006/0289133 A1 | 12/2006 | Yeh et al. | |
| 2006/0289134 A1 | 12/2006 | Yeh et al. | |
| 2007/0131366 A1 | 6/2007 | Underhill et al. | |
| 2007/0204966 A1 | 9/2007 | Chou et al. | |
| 2007/0224419 A1 | 9/2007 | Sumnicht et al. | |
| 2007/0232180 A1 | 10/2007 | Polat et al. | |
| 2008/0029235 A1 | 2/2008 | Edwards et al. | |
| 2008/0054107 A1 | 3/2008 | Koslow et al. | |
| 2008/0057307 A1 | 3/2008 | Koslow et al. | |
| 2008/0083519 A1 | 4/2008 | Kokko et al. | |
| 2008/0105394 A1 | 5/2008 | Kokko | |
| 2008/0135193 A1 | 6/2008 | Kokko | |
| 2008/0173418 A1 | 7/2008 | Sumnicht | |
| 2008/0173419 A1 | 7/2008 | Sumnicht | |
| 2009/0020139 A1 * | 1/2009 | Sumnicht | D21H 13/08 134/6 |
| 2009/0020248 A1 | 1/2009 | Sumnicht et al. | |
| 2009/0036826 A1 | 2/2009 | Sage, Jr. et al. | |
| 2009/0065164 A1 | 3/2009 | Goto et al. | |
| 2009/0120598 A1 | 5/2009 | Edwards et al. | |
| 2009/0120599 A1 | 5/2009 | Nguyen | |
| 2009/0151881 A1 | 6/2009 | Nguyen | |
| 2009/0159224 A1 | 6/2009 | Chou et al. | |
| 2009/0308551 A1 | 12/2009 | Kokko et al. | |
| 2010/0006249 A1 | 1/2010 | Kokko et al. | |
| 2010/0065235 A1 | 3/2010 | Fike et al. | |
| 2010/0212850 A1 | 8/2010 | Sumnicht et al. | |
| 2010/0272938 A1 | 10/2010 | Mitchell et al. | |
| 2010/0282423 A1 | 11/2010 | Super et al. | |
| 2010/0288456 A1 | 11/2010 | Westland et al. | |
| 2010/0330139 A1 | 12/2010 | Shimmin et al. | |

(56) References Cited

U.S. PATENT DOCUMENTS

| | | | |
|---|---|---|---|
| 2011/0011545 A1 | 1/2011 | Edwards et al. | |
| 2011/0039469 A1 | 2/2011 | Cabell et al. | |
| 2011/0057346 A1 | 3/2011 | Nunn | |
| 2011/0209840 A1 | 9/2011 | Barnholtz et al. | |
| 2011/0265965 A1 | 11/2011 | Sumnicht et al. | |
| 2011/0293931 A1 | 12/2011 | Vogel et al. | |
| 2011/0294388 A1 | 12/2011 | Konishi et al. | |
| 2012/0023690 A1 | 2/2012 | Hunger et al. | |
| 2012/0080155 A1 | 4/2012 | Konishi et al. | |
| 2012/0151700 A1 | 6/2012 | Cooper et al. | |
| 2012/0285640 A1 | 11/2012 | Westland et al. | |
| 2013/0029106 A1 | 1/2013 | Lee et al. | |
| 2013/0111681 A1 | 5/2013 | Kusin et al. | |
| 2013/0153164 A1 | 6/2013 | Miller et al. | |
| 2013/0172226 A1 | 7/2013 | Dreher et al. | |
| 2013/0299105 A1 | 11/2013 | Miller et al. | |
| 2013/0327489 A1 | 12/2013 | Super et al. | |
| 2014/0144466 A1* | 5/2014 | Sumnicht | D21H 13/08 134/6 |
| 2015/0122432 A1 | 5/2015 | Sumnicht et al. | |
| 2015/0122434 A1 | 5/2015 | Sumnicht et al. | |
| 2015/0122435 A1 | 5/2015 | Sumnicht et al. | |
| 2015/0122436 A1 | 5/2015 | Sumnicht et al. | |
| 2015/0122437 A1 | 5/2015 | Sumnicht et al. | |
| 2015/0122438 A1 | 5/2015 | Sumnicht et al. | |
| 2015/0122439 A1 | 5/2015 | Sumnicht et al. | |
| 2015/0129147 A1 | 5/2015 | Sumnicht et al. | |
| 2015/0144157 A1 | 5/2015 | Sumnicht et al. | |
| 2015/0144158 A1 | 5/2015 | Sumnicht et al. | |
| 2015/0144281 A1 | 5/2015 | Sumnicht et al. | |
| 2015/0164295 A1 | 6/2015 | Sumnicht et al. | |
| 2015/0173581 A1 | 6/2015 | Sumnicht et al. | |
| 2015/0173582 A1 | 6/2015 | Sumnicht et al. | |
| 2015/0173583 A1 | 6/2015 | Sumnicht et al. | |
| 2015/0176215 A1 | 6/2015 | Sumnicht et al. | |
| 2015/0182092 A1* | 7/2015 | Sumnicht | D21H 13/08 134/6 |
| 2015/0240427 A1 | 8/2015 | Miller et al. | |

FOREIGN PATENT DOCUMENTS

| | | | |
|---|---|---|---|
| EP | 2 004 904 A2 | 12/2008 | |
| GB | 978 953 A | 1/1965 | |
| GB | 2 160 887 A | 1/1986 | |
| GB | 2 412 083 A | 9/2005 | |
| GB | 2498265 A | 7/2013 | |
| RU | 2127343 C1 | 3/1999 | |
| RU | 2144101 C1 | 1/2000 | |
| RU | 2183648 C2 | 6/2002 | |
| RU | 2222652 C2 | 1/2004 | |
| RU | 2328255 C2 | 7/2008 | |
| WO | 95/35399 A1 | 12/1995 | |
| WO | 98/03710 A1 | 1/1998 | |
| WO | 98/07914 A1 | 2/1998 | |
| WO | 2005/010273 A1 | 2/2005 | |
| WO | 2005/067779 A1 | 7/2005 | |
| WO | 2007/109259 A2 | 9/2007 | |
| WO | 2008/045770 A2 | 4/2008 | |
| WO | 2009/038730 A1 | 3/2009 | |
| WO | 2009/038735 A1 | 3/2009 | |
| WO | WO 2009038735 A1 * | 3/2009 | D21H 13/08 |
| WO | 2009/099166 A1 | 8/2009 | |
| WO | 2010/033536 A2 | 3/2010 | |
| WO | 2010/065367 A1 | 6/2010 | |

OTHER PUBLICATIONS

Egan, R.R. "Cationic Surface Active Agents as Fabric Softeners," J. Am. Oil Chemists' Soc., vol. 55, 1978, pp. 118-121.

Espy, Herbert H. "Chapter 2: Alkaline-Curing Polymeric Amine-Epichlorohydrin Resins," Wet Strength Resins and Their Application, L. Chan, Editor, 1994, pp. 13-44.

Evans, W. P. "Cationic fabric softeners," Chemistry and Industry, Jul. 5, 1969, pp. 893-903.

Gooding, R.W., and J.A. Olson. "Fractionation in a Bauer-McNett Classifier," Journal of Pulp and Paper Science, vol. 72, No. 12, Dec. 2001, pp. 423-428.

Imperato, Giovanni, et al. "Low-melting sugar-urea-salt mixtures as solvents for Diels-Alder reactions," Chem. Commun., Issue 9, RSC Publishing, 2005, pp. 1170-1172.

Miller, Bernard, and Ilya Tyomkin. "Liquid Porosimetry: New Methodology and Applications," J. of Colloid and Interface Sci., 162 (1994) (TRI/Princeton), pp. 163-170.

Trivedi, B.C., et al. "Quaternization of Imidazoline: Unequivocal Structure Proof," J. Am. Oil Chemists' Soc., Jun. 1981, pp. 754-756.

Waterhouse, J.F. "On-line Formation Measurements and Paper Quality," Institute of Paper Science and Technology, 1996, IPST Technical Paper Series 604.

Westfelt, Lars. "Chemistry of Paper Wet-Strength. I. A Survey of Mechanisms of Wet-Strength Development," Cellulose Chemistry and Technology, vol. 13, 1979, pp. 813-825.

Russian Decision on Grant dated Jun. 19, 2012, issued in corresponding Russian Patent Application No. 20100115259/05 (21665), with an English translation.

International Search Report and Written Opinion of the International Searching Authority mailed Jun. 4, 2008, in corresponding International Application No. PCT/US07/06892.

International Search Report and Written Opinion of the International Searching Authority mailed Dec. 1, 2008, in corresponding International Application No. PCT/US08/10840.

International Search Report and Written Opinion of the International Searching Authority mailed Dec. 12, 2008, in corresponding International Application No. PCT/US08/10833.

International Search Report and Written Opinion of the International Searching Authority mailed Jul. 2, 2010, in corresponding International Application No. PCT/US09/057078.

* cited by examiner

25% MICROFIBER, AIR SIDE

25% MICROFIBER, AIR SIDE

25% MICROFIBER, YANKEE SIDE

25% MICROFIBER, YANKEE SIDE

50% MICROFIBER, AIR SIDE

50% MICROFIBER, AIR SIDE

50% MICROFIBER, YANKEE SIDE

50% MICROFIBER, YANKEE SIDE

METHOD OF CLEANING RESIDUE FROM A SURFACE USING A HIGH EFFICIENCY DISPOSABLE CELLULOSIC WIPER

CLAIM FOR PRIORITY

This application is a divisional application of U.S. patent application Ser. No. 14/168,071, filed Jan. 30, 2014, now U.S. Pat. No. 8,980,011 which was published as U.S. Patent Application Publication No. 2014/0144466, which is a continuation of U.S. patent application Ser. No. 13/430,757, filed on Mar. 27, 2012, now U.S. Pat. No. 8,778,086, issued on Jul. 15, 2014, which is a division of U.S. patent application Ser. No. 12/284,148, filed Sep. 17, 2008, now U.S. Pat. No. 8,187,422, issued on May 29, 2012, which is based on U.S. Provisional Patent Application No. 60/994,483, filed Sep. 19, 2007. U.S. patent application Ser. No. 12/284,148 is also a continuation-in-part of U.S. patent application Ser. No. 11/725,253, filed Mar. 19, 2007, now U.S. Pat. No. 7,718,036, issued May 18, 2010. U.S. patent application Ser. No. 11/725,253 was based on the following U.S. Provisional Patent Applications:

(a) U.S. Provisional Patent Application No. 60/784,228, filed Mar. 21, 2006, entitled "Absorbent Sheet Having Lyocell Microfiber Network";
(b) U.S. Provisional Patent Application No. 60/850,467, filed Oct. 10, 2006, entitled "Absorbent Sheet Having Lyocell Microfiber Network";
(c) U.S. Provisional Patent Application No. 60/850,681, filed Oct. 10, 2006, entitled "Method of Producing Absorbent Sheet with Increased Wet/Dry CD Tensile Ratio"; and
(d) U.S. Provisional Patent Application No. 60/881,310, filed Jan. 19, 2007, entitled "Method of Making Regenerated Cellulose Microfibers and Absorbent Products Incorporating Same".

The priorities of the foregoing applications are hereby claimed and the entirety of their disclosures is incorporated herein by reference.

TECHNICAL FIELD

The present invention relates to methods of cleaning surfaces such as eyeglasses, computer screens, appliances, windows, and other substrates, using high efficiency disposable cellulosic wipers. In a preferred embodiment, the wipers contain fibrillated lyocell microfiber and provide substantially residue-free cleaning.

BACKGROUND

Lyocell fibers are typically used in textiles or filter media. See, for example, U.S. Patent Application Publication No. 2003/0177909, now U.S. Pat. No. 6,872,311, and No. 2003/0168401, now U.S. Pat. No. 6,835,311, both to Koslow, as well as U.S. Pat. No. 6,511,746 to Collier et al. On the other hand, high efficiency wipers for cleaning glass and other substrates are typically made from thermoplastic fibers.

U.S. Pat. No. 6,890,649 to Hobbs et al. (3M) discloses polyester microfibers for use in a wiper product. According to the '649 patent, the microfibers have an average effective diameter less than 20 microns and, generally, from 0.01 microns to 10 microns. See column 2, lines 38 to 40. These microfibers are prepared by fibrillating a film surface and then harvesting the fibers.

U.S. Pat. No. 6,849,329 to Perez et al. discloses microfibers for use in cleaning wipes. These fibers are similar to those described in the '649 patent discussed above. U.S. Pat. No. 6,645,618 also to Hobbs et al. also discloses microfibers in fibrous mats such as those used for removal of oil from water or their use as wipers.

U.S. Patent Application Publication No. 2005/0148264 (application Ser. No. 10/748,648) of Varona et al. discloses a wiper with a bimodal pore size distribution. The wiper is made from melt blown fibers as well as coarser fibers and papermaking fibers. See page 2, paragraph 16.

U.S. Patent Application Publication No. 2004/0203306 (application Ser. No. 10/833,229) of Grafe et al. discloses a flexible wipe including a non-woven layer and at least one adhered nanofiber layer. The nanofiber layer is illustrated in numerous photographs. It is noted on page 1, paragraph [0009], that the microfibers have a fiber diameter of from about 0.05 microns to about 2 microns. In this publication, the nanofiber webs were evaluated for cleaning automotive dashboards, automotive windows, and so forth. For example, see page 8, paragraphs [0055] and [0056].

U.S. Pat. No. 4,931,201 to Julemont discloses a non-woven wiper incorporating melt-blown fiber. U.S. Pat. No. 4,906,513 to Kebbell et al. also discloses a wiper having melt-blown fiber. Here, polypropylene microfibers are used and the wipers are reported to provide streak-free wiping properties. This patent is of general interest as is U.S. Pat. No. 4,436,780 to Hotchkiss et al., which discloses a wiper having a layer of melt-blown polypropylene fibers and, on either side, a spun bonded polypropylene filament layer. U.S. Pat. No. 4,426,417 to Meitner et al. also discloses a non-woven wiper having a matrix of non-woven fibers including a microfiber and a staple fiber. U.S. Pat. No. 4,307,143 to Meitner discloses a low cost wiper for industrial applications, which includes thermoplastic, melt-blown fibers.

U.S. Pat. No. 4,100,324 to Anderson et al. discloses a non-woven fabric useful as a wiper, which incorporates wood pulp fibers.

U.S. Patent Application Publication No. 2006/0141881 (application Ser. No. 11/361,875), now U.S. Pat. No. 7,691,760, of Bergsten et al., discloses a wipe with melt-blown fibers. This publication also describes a drag test at pages 7 and 9. Note, for example, page 7, paragraph [0059]. According to the test results on page 9, microfiber increases the drag of the wipe on a surface.

U.S. Patent Application Publication No. 2003/0200991 (application Ser. No. 10/135,903) of Keck et al. discloses a dual texture absorbent web. Note pages 12 and 13 that describe cleaning tests and a Gardner wet abrasion scrub test.

U.S. Pat. No. 6,573,204 to Philipp et al. discloses a cleaning cloth having a non-woven structure made from micro staple fibers of at least two different polymers and secondary staple fibers bound into the micro staple fibers. The split fiber is reported to have a titer of 0.17 to 3.0 dtex prior to being split. See column 2, lines 7 through 9. Note also, U.S. Pat. No. 6,624,100 to Pike, which discloses splittable fiber for use in microfiber webs.

While there have been advances in the art as to high efficiency wipers, existing products tend to be relatively difficult and expensive to produce, and are not readily re-pulped or recycled. Wipers of this invention are economically produced on conventional equipment, such as a conventional wet press (CWP) papermachine and may be re-pulped and recycled with other paper products. Moreover, the wipers of the invention are capable of removing microparticles and substantially all of the residue from a surface, reducing the need for biocides and cleaning solutions in typical cleaning or sanitizing operations.

SUMMARY OF THE INVENTION

One aspect of the invention provides a method of cleaning residue from a surface. The method includes providing a disposable cellulosic wiper comprising a percentage by weight of pulp-derived papermaking fibers, and a percentage by weight of regenerated independent cellulosic microfibers having a number average diameter of less than about 2 microns, and a characteristic Canadian Standard Freeness (CSF) value of less than 175 ml, the microfibers being selected and present in amounts such that the wiper exhibits a relative wicking ratio of at least 1.5, applying the wiper, with a predetermined amount of pressure, to a residue-bearing surface, and wiping the surface with the applied wiper, while applying the predetermined amount of pressure, to remove residue from the surface, such that the surface has less than 1 $g/m^2$ of residue after being wiped under the predetermined amount of pressure with the applied wiper In another aspect, our invention provides a method of cleaning residue from a surface using a high efficiency disposable cellulosic wiper incorporating pulp-derived papermaking fiber having a characteristic scattering coefficient of less than 50 $m^2/kg$, and up to 75% by weight or more of fibrillated regenerated cellulosic microfiber having a characteristic Canadian Standard Freeness (CSF) value of less than 175 ml, the microfiber being selected and present in amounts such that the wiper exhibits a scattering coefficient of greater than 50 $m^2/kg$.

In yet another aspect, our invention provides a method of cleaning residue from a surface using a high efficiency disposable cellulosic wiper with pulp-derived papermaking fiber, and up to about 75% by weight of fibrillated regenerated cellulosic microfiber having a characteristic CSF value less than 175 ml, the microfiber being further characterized in that 40% by weight thereof is finer than 14 mesh.

The fibrillated cellulose microfiber is present in amounts of greater than 25 percent or greater than 35 percent or 40 percent by weight, and more, based on the weight of fiber in the product, in some cases. More than 37.5 percent, and so forth, may be employed, as will be appreciated by one of skill in the art. In some embodiments, the regenerated cellulose microfiber may be present from 10 to 75% as noted below, it being understood that the weight ranges described herein may be substituted in any embodiment of the invention sheet, if so desired.

High efficiency wipers of the invention typically exhibit relative wicking ratios of two to three times that of comparable sheet without cellulose microfiber, as well as Relative Bendtsen Smoothness of 1.5 to 5 times conventional sheet of a like nature. In still further aspects of the invention, wiper efficiencies far exceed those of conventional cellulosic sheets and the pore size of the sheet has a large volume fraction of pore with a radius of 15 microns or less.

The invention is better appreciated by reference to FIGS. 1A, 1B, 2A, 2B, 3A, 3B, 4A, and 4B. FIGS. 1A and 1B are scanning electron micrographs (SEM's) of a creped sheet of pulp-derived papermaking fibers and fibrillated lyocell (25% by weight), air side, at 150× and 750×. FIGS. 2A and 2B are SEM's of the Yankee side of the sheet at like magnification. FIGS. 1A to 2B show that the microfiber is of a very high surface area and forms a microfiber network over the surface of the sheet.

FIGS. 3A and 3B are SEM's of a creped sheet of 50% lyocell microfiber, 50% pulp-derived papermaking fiber (air side) at 150× and 750×. FIGS. 4A and 4B are SEM's of the Yankee side of the sheet at like magnification. Here is seen that substantially all of the contact area of the sheet is fibrillated, regenerated cellulose of a very small fiber diameter.

Without intending to be bound by theory, it is believed that the microfiber network is effective to remove substantially all of the residue from a surface under moderate pressure, whether the residue is hydrophilic or hydrophobic. This unique property provides for cleaning a surface with reduced amounts of cleaning solution, which can be expensive and may irritate the skin, for example. In addition, the removal of even microscopic residue will include removing microbes, reducing the need for biocides and/or increasing their effectiveness.

The inventive wipers are particularly effective for cleaning glass and appliances when even very small amounts of residue impair clarity and destroy surface sheen.

Still further features and advantages of the invention will become apparent from the discussion that follows.

BRIEF DESCRIPTION OF DRAWINGS

The invention is described in detail below with reference to the Figures wherein.

DETAILED DESCRIPTION

Figure 1A:
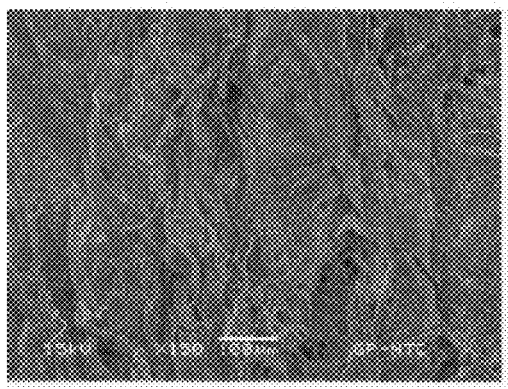
FIGS. 1A and 1B are scanning electron micrographs (SEM's) of a creped sheet of pulp-derived papermaking fibers and fibrillated lyocell (25% by weight), air side at 150× and 750×.
Figure 1B:
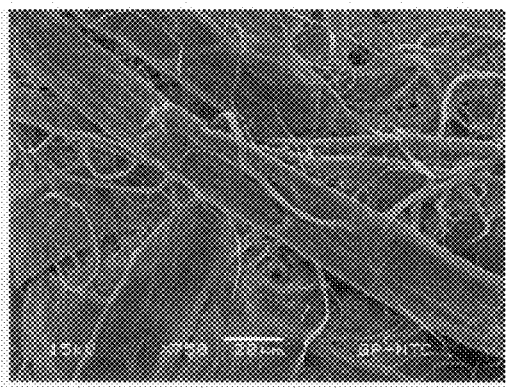
Figure 2A:
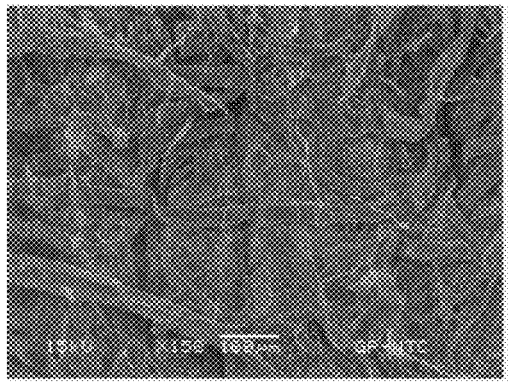
FIGS. 2A and 2B are SEM's of the Yankee side of the sheet of FIGS. 1A and 1B at like magnification.
Figure 2B:
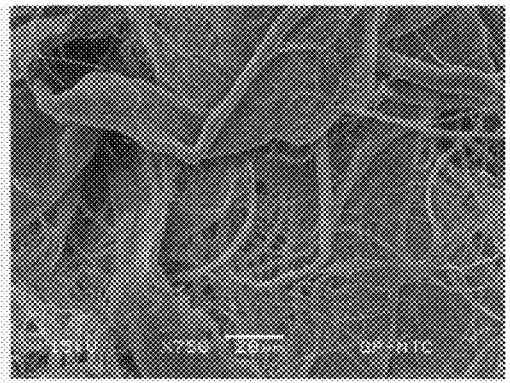
Figure 3A:
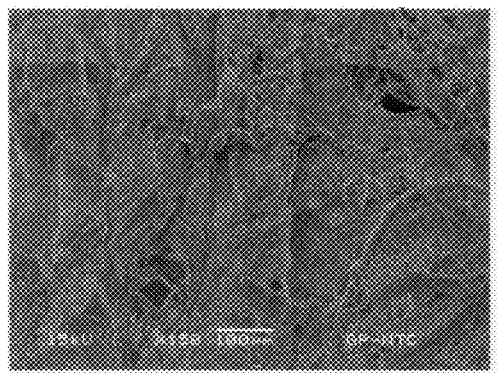
FIGS. 3A and 3B are SEM's of a creped sheet of 50% lyocell microfiber, 50% pulp-derived papermaking fiber (air side) at 150× and 750×.
Figure 3B:
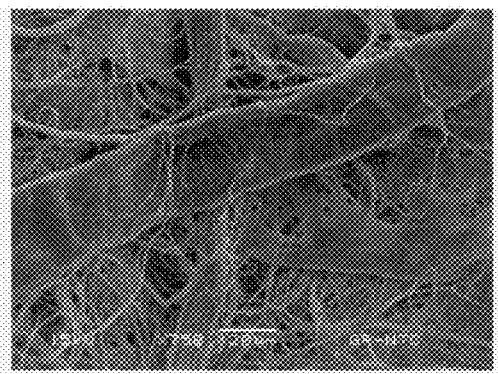
Figure 4A:
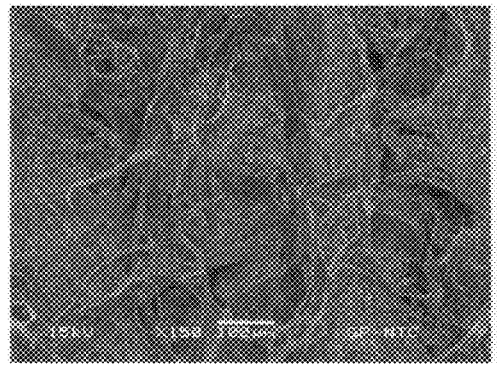
FIGS. 4A and 4B are SEM's of the Yankee side of the sheet of FIGS. 3A and 3B at like magnification.
Figure 4B:
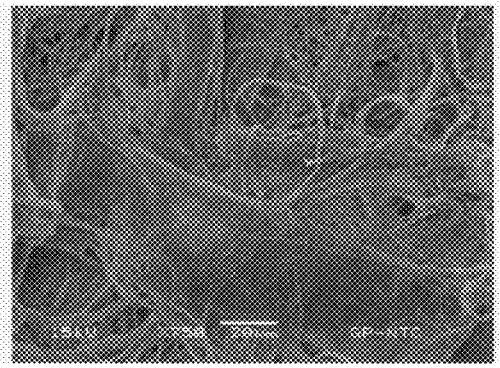

The invention is described in detail below with reference to several embodiments and numerous examples. Such a discussion is for purposes of illustration only. Modifications to particular examples within the spirit and scope of the present invention, set forth in the appended claims, will be readily apparent to one of skill in the art.

Terminology used herein is given its ordinary meaning consistent with the exemplary definitions set forth immediately below, mils refers to thousandths of an inch, mg refers to milligrams and $m^2$ refers to square meters, percent means weight percent (dry basis), "ton" means short ton (2000 pounds), unless otherwise indicated "ream" means 3000 $ft^2$, and so forth. Unless otherwise specified, the version of a test method applied is that in effect as of Jan. 1, 2006, and test specimens are prepared under standard TAPPI conditions, that is, conditioned in an atmosphere of 23°±1.0° C. (73.4°±1.8° F.) at 50% relative humidity for at least about 2 hours.

Absorbency of the inventive products is measured with a simple absorbency tester. The simple absorbency tester is a particularly useful apparatus for measuring the hydrophilicity and absorbency properties of a sample of tissue, napkins, or towel. In this test, a sample of tissue, napkins, or towel 2.0 inches in diameter is mounted between a top flat plastic cover and a bottom grooved sample plate. The tissue, napkin, or towel sample disc is held in place by a ⅛ inch wide circumference flange area. The sample is not compressed by the holder. De-ionized water at 73° F. is introduced to the sample at the center of the bottom sample plate through a 1 mm diameter conduit. This water is at a hydrostatic head of minus 5 mm. Flow is initiated by a pulse introduced at the start of the measurement by the instrument mechanism. Water is thus imbibed by the tissue, napkin, or towel sample from this central entrance point radially outward by capillary action. When the rate of water imbibation decreases below 0.005 gm water per 5 seconds, the test is terminated. The amount of water removed from the reservoir and absorbed by the sample is weighed and reported as grams of water per square meter of sample or grams of water per gram of sheet. In practice, an M/K Systems Inc. Gravimetric Absorbency Testing System is used. This is a commercial system obtainable from M/K Systems Inc., 12 Garden Street, Danvers, Mass., 01923. WAC or water absorbent capacity, also referred to as SAT, is actually determined by the instrument itself. WAC is defined as the point where the weight versus time graph has a "zero" slope, i.e., the sample has stopped absorbing. The termination criteria for a test are expressed in maximum change in water weight absorbed over a fixed time period. This is basically an estimate of zero slope on the weight versus time graph. The program uses a change of 0.005 g over a 5 second time interval as termination criteria; unless "Slow SAT" is specified, in which case, the cut off criteria is 1 mg in 20 seconds.

The void volume and/or void volume ratio, as referred to hereafter, are determined by saturating a sheet with a non-polar POROFIL™ liquid and measuring the amount of liquid absorbed. The volume of liquid absorbed is equivalent to the void volume within the sheet structure. The percent weight increase (PWI) is expressed as grams of liquid absorbed per gram of fiber in the sheet structure times 100, as noted hereafter. More specifically, for each single-ply sheet sample to be tested, select 8 sheets and cut out a 1 inch by 1 inch square (1 inch in the machine direction and 1 inch in the cross-machine direction). For multi-ply product samples, each ply is measured as a separate entity. Multiple samples should be separated into individual single plies and 8 sheets from each ply position used for testing. To measure absorbency, weigh and record the dry weight of each test specimen to the nearest 0.0001 gram. Place the specimen in a dish containing POROFIL™ liquid having a specific gravity of about 1.93 grams per cubic centimeter, available from Coulter Electronics Ltd., Beckman Coulter, Inc., 250 S. Kraemer Boulevard, P.O. Box 8000, Brea, Calif. 92822-8000 USA. After 10 seconds, grasp the specimen at the very edge (1 to 2 millimeters in) of one corner with tweezers and remove from the liquid. Hold the specimen with that corner uppermost and allow excess liquid to drip for 30 seconds. Lightly dab (less than ½ second contact) the lower corner of the specimen on #4 filter paper (Whatman Lt., Maidstone, England) in order to remove any excess of the last partial drop. Immediately weigh the specimen, within 10 seconds, recording the weight to the nearest 0.0001 gram. The PWI for each specimen, expressed as grams of POROFIL™ liquid per gram of fiber, is calculated as follows:

$$PWI=[(W_2-W_1)/W_1]\times 100\%$$

wherein

"$W_1$" is the dry weight of the specimen, in grams; and

"$W_2$" is the wet weight of the specimen, in grams.

The PWI for all eight individual specimens is determined as described above and the average of the eight specimens is the PWI for the sample.

The void volume ratio is calculated by dividing the PWI by 1.9 (density of fluid) to express the ratio as a percentage, whereas the void volume (gms/gm) is simply the weight increase ratio, that is, PWI divided by 100.

Unless otherwise specified, "basis weight", BWT, bwt, and so forth, refers to the weight of a 3000 square foot ream of product. Consistency refers to percent solids of a nascent web, for example, calculated on a bone dry basis. "Air dry" means including residual moisture, by convention up to about 10 percent moisture for pulp and up to about 6% for paper. A nascent web having 50 percent water and 50 percent bone dry pulp has a consistency of 50 percent.

Bendtsen Roughness is determined in accordance with ISO Test Method 8791-2. Relative Bendtsen Smoothness is the ratio of the Bendtsen Roughness value of a sheet without cellulose microfiber to the Bendtsen Roughness value of a like sheet when cellulose microfiber has been added.

The term "cellulosic", "cellulosic sheet," and the like, is meant to include any product incorporating papermaking fibers having cellulose as a major constituent. "Papermaking fibers" include virgin pulps or recycle (secondary) cellulosic fibers or fiber mixes comprising cellulosic fibers. Fibers suitable for making the webs of this invention include nonwood fibers, such as cotton fibers or cotton derivatives, abaca, kenaf, sabai grass, flax, esparto grass, straw, jute hemp, bagasse, milkweed floss fibers, and pineapple leaf fibers, and wood fibers such as those obtained from deciduous and coniferous trees, including softwood fibers, such as northern and southern softwood kraft fibers, hardwood fibers, such as *eucalyptus*, maple, birch, aspen, or the like. Papermaking fibers used in connection with the invention are typically naturally occurring pulp-derived fibers (as opposed to reconstituted fibers such as lyocell or rayon), which are liberated from their source material by any one of a number of pulping processes familiar to one experienced in the art including sulfate, sulfite, polysulfide, soda pulping, etc. The pulp can be bleached if desired by chemical means including the use of chlorine, chlorine dioxide, oxygen, alkaline peroxide, and so forth. Naturally occurring pulp-derived fibers are referred to herein simply as "pulp-derived" papermaking fibers. The products of the present invention may comprise a blend of conventional fibers (whether derived from virgin pulp or recycle sources) and high coarseness lignin-rich tubular fibers, such as bleached chemical thermomechanical pulp (BCTMP). Pulp-derived fibers thus also include high yield fibers such as BCTMP as well as thermomechanical pulp (TMP), chemithermomechanical pulp (CTMP) and alkaline peroxide mechanical pulp (APMP). "Furnishes" and like terminology refers to aqueous compositions including papermaking fibers, optionally, wet strength resins, debonders, and the like, for making paper products. For purposes of calculating relative percentages of papermaking fibers, the fibrillated lyocell content is excluded as noted below.

Formation index is a measure of uniformity or formation of tissue or towel. Formation indices reported herein are on the Robotest scale wherein the index ranges from 20 to 120, with 120 corresponding to a perfectly homogeneous mass distribution. See J. F. Waterhouse, "On-Line Formation Measurements and Paper Quality," IPST technical paper series 604, Institute of Paper Science and Technology (1996), the disclosure of which is incorporated herein by reference.

Kraft softwood fiber is low yield fiber made by the well known kraft (sulfate) pulping process from coniferous material and includes northern and southern softwood kraft fiber, Douglas fir kraft fiber, and so forth. Kraft softwood fibers generally have a lignin content of less than 5 percent by weight, a length weighted average fiber length of greater than 2 mm, as well as an arithmetic average fiber length of greater than 0.6 mm.

Kraft hardwood fiber is made by the kraft process from hardwood sources, i.e., *eucalyptus* and also generally has a lignin content of less than 5 percent by weight. Kraft hardwood fibers are shorter than softwood fibers, typically, having a length weighted average fiber length of less than 1.2 mm and an arithmetic average length of less than 0.5 mm or less than 0.4 mm.

Recycle fibers may be added to the furnish in any amount. While any suitable recycle fibers may be used, recycle fibers with relatively low levels of groundwood is preferred in many cases, for example, recycle fibers with less than 15% by weight lignin content, or less than 10% by weight lignin content may be preferred depending on the furnish mixture employed and the application.

Tissue calipers and/or bulk reported herein may be measured at 8 or 16 sheet calipers as specified. Hand sheet caliper and bulk is based on 5 sheets. The sheets are stacked and the caliper measurement taken about the central portion of the stack. Preferably, the test samples are conditioned in an atmosphere of 23°±1.0° C. (73.4°±1.8° F.) at 50% relative humidity for at least about 2 hours and then measured with a Thwing-Albert Model 89-II-JR or Progage Electronic Thickness Tester with two inch (50.8 mm) diameter anvils, 539±10 grams dead weight load, and 0.231 in./sec. descent rate. For finished product testing, each sheet of product to be tested must have the same number of plies as the product when sold. For testing in general, eight sheets are selected and stacked together. For napkin testing, napkins are unfolded prior to stacking. For base sheet testing off of winders, each sheet to be tested must have the same number of plies as produced off of the winder. For base sheet testing off of the papermachine reel, single plies must be used. Sheets are stacked together, aligned in the MD. On custom embossed or printed product, try to avoid taking measurements in these areas if at all possible. Bulk may also be expressed in units of volume/weight by dividing caliper by basis weight (specific bulk).

The term "compactively dewatering" the web or furnish refers to mechanical dewatering by wet pressing on a dewatering felt, for example, in some embodiments, by use of mechanical pressure applied continuously over the web surface as in a nip between a press roll and a press shoe wherein the web is in contact with a papermaking felt. The terminology "compactively dewatering" is used to distinguish processes wherein the initial dewatering of the web is carried out largely by thermal means as is the case, for example, in U.S. Pat. No. 4,529,480 to Trokhan and U.S. Pat. No. 5,607,551 to Farrington et al. Compactively dewatering a web thus refers, for example, to removing water from a nascent web having a consistency of less than 30 percent or so by application of pressure thereto and/or increasing the consistency of the web by about 15 percent or more by application of pressure thereto.

Crepe can be expressed as a percentage calculated as:

Crepe percent=[1−reel speed/Yankee speed]×100%.

A web creped from a drying cylinder with a surface speed of 100 fpm (feet per minute) to a reel with a velocity of 80 fpm has a reel crepe of 20%.

A creping adhesive used to secure the web to the Yankee drying cylinder is preferably a hygroscopic, re-wettable, substantially non-crosslinking adhesive. Examples of preferred adhesives are those that include poly(vinyl alcohol) of the general class described in U.S. Pat. No. 4,528,316 to Soerens et al. Other suitable adhesives are disclosed in U.S. patent application Ser. No. 10/409,042 (U.S. Patent Application Publication No. 2005/0006040 A1), filed Apr. 9, 2003, now U.S. Pat. No. 7,959,761, entitled "Improved Creping Adhesive Modifier and Process for Producing Paper Products". The disclosures of the '316 patent and the '761 patent are incorporated herein by reference. Suitable adhesives are optionally provided with modifiers, and so forth. It is preferred to use crosslinker and/or modifier sparingly or not at all in the adhesive.

"Debonder", "debonder composition", "softener" and like terminology refers to compositions used for decreasing tensiles or softening absorbent paper products. Typically, these compositions include surfactants as an active ingredient and are further discussed below.

"Freeness" or Canadian Standard Freeness (CSF) is determined in accordance with TAPPI Standard T 227 OM-94 (Canadian Standard Method). Any suitable method of preparing the regenerated cellulose microfiber for freeness testing may be employed, as long as the fiber is well dispersed. For example, if the fiber is pulped at a 5% consistency for a few minutes or more, i.e., 5 to 20 minutes before testing, the fiber is well dispersed for testing. Likewise, partially dried fibrillated regenerated cellulose microfiber can be treated for 5 minutes in a British disintegrator at 1.2% consistency to ensure proper dispersion of the fibers. All preparation and testing is done at room temperature and either distilled or deionized water is used throughout.

A like sheet prepared without regenerated cellulose microfiber and like terminology refers to a sheet made by substantially the same process having substantially the same composition as a sheet made with regenerated cellulose microfiber, except that the furnish includes no regenerated cellulose microfiber and substitutes papermaking fiber having substantially the same composition as the other papermaking fiber in the sheet. Thus, with respect to a sheet having 60% by weight northern softwood fiber, 20% by weight northern hardwood fiber and 20% by weight regenerated cellulose microfiber made by a conventional wet press (CWP) process, a like sheet without regenerated cellulose microfiber is made by the same CWP process with 75% by weight northern softwood fiber and 25% by weight northern hardwood fiber. Similarly, "a like sheet prepared with cellulose microfiber" refers to a sheet made by substantially the same process having substantially the same composition as a fibrous sheet made without cellulose microfiber except that other fibers are proportionately replaced with cellulose microfiber.

Lyocell fibers are solvent spun cellulose fibers produced by extruding a solution of cellulose into a coagulating bath. Lyocell fiber is to be distinguished from cellulose fiber made by other known processes, which rely on the formation of a soluble chemical derivative of cellulose and its subsequent decomposition to regenerate the cellulose, for example, the viscose process. Lyocell is a generic term for fibers spun directly from a solution of cellulose in an amine containing medium, typically, a tertiary amine N-oxide. The production of lyocell fibers is the subject matter of many patents. Examples of solvent-spinning processes for the production of lyocell fibers are described in: U.S. Pat. No. 6,235,392 of Luo et al., and U.S. Pat. Nos. 6,042,769 and 5,725,821 to Gannon et al., the disclosures of which are incorporated herein by reference.

"MD" means machine direction and "CD" means cross-machine direction.

Opacity or TAPPI opacity is measured according to TAPPI test procedure T425-OM-91, or equivalent.

Effective pore radius is defined by the Laplace Equation discussed herein and is suitably measured by intrusion and/or extrusion porosimetry. The relative wicking ratio of a sheet refers to the ratio of the average effective pore diameter of a sheet made without cellulose microfiber to the average effective pore diameter of a sheet made with cellulose microfiber.

"Predominant" and like terminology means more than 50% by weight. The fibrillated lyocell content of a sheet is calculated based on the total fiber weight in the sheet, whereas the relative amount of other papermaking fibers is calculated exclusive of fibrillated lyocell content. Thus, a sheet that is 20% fibrillated lyocell, 35% by weight softwood fiber and 45% by weight hardwood fiber has hardwood fiber as the predominant papermaking fiber, inasmuch as 45/80 of the papermaking fiber (exclusive of fibrillated lyocell) is hardwood fiber.

"Scattering coefficient" sometimes abbreviated "S", is determined in accordance with TAPPI test method T-425 om-01, the disclosure of which is incorporated herein by reference. This method functions at an effective wavelength of 572 nm. Scattering coefficient ($m^2$/kg herein) is the normalized value of scattering power to account for basis weight of the sheet.

Characteristic scattering coefficient of a pulp refers to the scattering coefficient of a standard sheet made from 100% of that pulp, excluding components that substantially alter the scattering characteristics of neat pulp such as fillers, and the like.

"Relative bonded area" or "RBA"=$(S_0-S)/S_0$ where $S_0$ is the scattering coefficient of the unbonded sheet, obtained from an extrapolation of S versus Tensile to zero tensile. See W. L. Ingmanson and E. F. Thode, TAPPI 42(1):83 (1959), the disclosure of which is incorporated herein by reference.

Dry tensile strengths (MD and CD), stretch, ratios thereof, modulus, break modulus, stress, and strain are measured with a standard Instron® test device or other suitable elongation tensile tester that may be configured in various ways, typically, using 3 or 1 inch or 15 mm wide strips of tissue or towel, conditioned in an atmosphere of 23°±1° C. (73.4°±1° F.) at 50% relative humidity for 2 hours. The tensile test is run at a crosshead speed of 2 in./min. Tensile strength is sometimes referred to simply as "tensile" and is reported in g/3" or g/3 in. Tensile may also be reported as breaking length (km).

GM Break Modulus is expressed in grams/3 inches/% strain, unless other units are indicated. % strain is dimensionless and units need not be specified. Tensile values refer to break values unless otherwise indicated. Tensile strengths are reported in g/3" at break.

GM Break Modulus is thus: $[(MD\ tensile/MD\ Stretch\ at\ break) \times (CD\ tensile/CD\ Stretch\ at\ break)]^{1/2}$, unless otherwise indicated. Break Modulus for handsheets may be measured on a 15 mm specimen and expressed in kg/mm$^2$, if so desired.

Tensile ratios are simply ratios of the values determined by way of the foregoing methods. Unless otherwise specified, a tensile property is a dry sheet property.

The wet tensile of the tissue of the present invention is measured using a three-inch wide strip of tissue that is folded into a loop, clamped in a special fixture termed a Finch Cup, then immersed in water. The Finch Cup, which is available from the Thwing-Albert Instrument Company of Philadelphia, Pa., is mounted onto a tensile tester equipped with a 2.0 pound load cell with the flange of the Finch Cup clamped by the lower jaw of the tensile tester and the ends of tissue loop clamped into the upper jaw of the tensile tester. The sample is immersed in water that has been adjusted to a pH of 7.0±0.1 and the tensile is tested after a 5 second immersion time. Values are divided by two, as appropriate, to account for the loop.

Wet/dry tensile ratios are expressed in percent by multiplying the ratio by 100. For towel products, the wet/dry CD tensile ratio is the most relevant. Throughout this specification and claims that follow "wet/dry ratio" or like terminology refers to the wet/dry CD tensile ratio unless clearly specified otherwise. For handsheets, MD and CD values are approximately equivalent.

Debonder compositions are typically comprised of cationic or anionic amphiphilic compounds, or mixtures thereof (hereafter referred to as surfactants) combined with other diluents and non-ionic amphiphilic compounds, where the typical content of surfactant in the debonder composition ranges from about 10 wt % to about 90 wt %. Diluents include propylene glycol, ethanol, propanol, water, polyethylene glycols, and nonionic amphiphilic compounds. Diluents are often added to the surfactant package to render the latter more tractable (i.e., lower viscosity and melting point). Some diluents are artifacts of the surfactant package synthesis (e.g., propylene glycol). Non-ionic amphiphilic compounds, in addition to controlling composition properties, can be added to enhance the wettability of the debonder, when both debonding and maintenance of absorbency properties are critical to the substrate that a debonder is applied. The nonionic amphiphilic compounds can be added to debonder compositions to disperse inherent water immiscible surfactant packages in water streams, such as encountered during papermaking. Alternatively, the nonionic amphiphilic compounds, or mixtures of different non-ionic amphiphilic compounds, as indicated in U.S. Pat. No. 6,969,443 to Kokko, can be carefully selected to predictably adjust the debonding properties of the final debonder composition.

Quaternary ammonium compounds, such as dialkyl dimethyl quaternary ammonium salts are suitable, particularly when the alkyl groups contain from about 10 to 24 carbon atoms. These compounds have the advantage of being relatively insensitive to pH.

Biodegradable softeners can be utilized. Representative biodegradable cationic softeners/debonders are disclosed in U.S. Pat. Nos. 5,312,522; 5,415,737; 5,262,007; 5,264,082; and 5,223,096, all of which are incorporated herein by reference in their entirety. The compounds are biodegradable diesters of quaternary ammonia compounds, quaternized amine-esters, and biodegradable vegetable oil based esters functional with quaternary ammonium chloride and diester dierucyldimethyl ammonium chloride and are representative biodegradable softeners.

After debonder treatment, the pulp may be mixed with strength adjusting agents such as permanent wet strength agents (WSR), optionally, dry strength agents, and so forth, before the sheet is formed. Suitable permanent wet strength agents are known to the skilled artisan. A comprehensive, but non-exhaustive, list of useful strength aids includes urea-formaldehyde resins, melamine formaldehyde resins, glyoxylated polyacrylamide resins, polyamidamine-epihalohydrin resins, and the like. Thermosetting polyacrylamides are produced by reacting acrylamide with diallyl dimethyl ammonium chloride (DADMAC) to produce a cationic polyacrylamide copolymer that is ultimately reacted with glyoxal to produce a cationic cross-linking wet strength resin, glyoxylated polyacrylamide. These materials are generally described in U.S. Pat. No. 3,556,932 to Coscia et al. and U.S. Pat. No. 3,556,933 to Williams et al., both of which are incorporated herein by reference in their entirety. Resins of this type are commercially available under the trade name of PAREZ™ by Bayer Corporation (Pittsburgh, Pa.). Different mole ratios of acrylamide/DADMAC/glyoxal can be used to produce cross-linking resins, which are useful as wet strength agents. Furthermore, other dialdehydes can be substituted for glyoxal to produce thermosetting wet strength characteristics. Of particular utility as wet strength resins (WSR) are the polyamidamine-epihalohydrin permanent wet strength resins, an example of which is sold under the trade names Kymene 557LX and Kymene 557H by Hercules Incorporated of Wilmington, Del. and Amres® from Georgia-Pacific Resins, Inc. These resins and the processes for making the resins are described in U.S. Pat. No. 3,700,623 and U.S. Pat. No. 3,772,076, each of which is incorporated herein by reference in its entirety. An extensive description of polymeric-epihalohydrin resins is given in Chapter 2: Alkaline-Curing Polymeric Amine-Epichlorohydrin by Espy in Wet Strength Resins and Their Application (L. Chan, Editor, 1994), herein incorporated by reference in its entirety. A reasonably comprehensive list of wet strength resins is described by Westfelt in Cellulose Chemistry and Technology Volume 13, page 813, 1979, which is incorporated herein by reference.

Suitable dry strength agents include starch, guar gum, polyacrylamides, carboxymethyl cellulose (CMC), and the like. Of particular utility is carboxymethyl cellulose, an example of which is sold under the trade name Hercules CMC, by Hercules Incorporated of Wilmington, Del.

In accordance with the invention, regenerated cellulose fiber is prepared from a cellulosic dope comprising cellulose dissolved in a solvent comprising tertiary amine N-oxides or ionic liquids. The solvent composition for dissolving cellulose and preparing underivatized cellulose dopes suitably includes tertiary amine oxides such as N-methylmorpholine-N-oxide (NMMO) and similar compounds enumerated in U.S. Pat. No. 4,246,221 to McCorsley, the disclosure of which is incorporated herein by reference. Cellulose dopes may contain non-solvents for cellulose such as water, alkanols or other solvents as will be appreciated from the discussion which follows.

Suitable cellulosic dopes are enumerated in Table 1, below.

TABLE 1

EXAMPLES OF TERTIARY AMINE N-OXIDE SOLVENTS

| Tertiary Amine N-oxide | % water | % cellulose |
|---|---|---|
| N-methylmorpholine N-oxide | up to 22 | up to 38 |
| N,N-dimethyl-ethanol-amine N-oxide | up to 12.5 | up to 31 |
| N,N-dimethylcyclohexylamine N-oxide | up to 21 | up to 44 |
| N-methylhomopiperidine N-oxide | 5.5-20 | 1-22 |
| N,N,N-triethylamine N-oxide | 7-29 | 5-15 |
| 2(2-hydroxypropoxy)-N-ethyl-N,N,-dimethyl-amide N-oxide | 5-10 | 2-7.5 |
| N-methylpiperidine N-oxide | up to 17.5 | 5-17.5 |
| N,N-dimethylbenzylamine N-oxide | 5.5-17 | 1-20 |

See, also, U.S. Pat. No., 3,508,945 to Johnson, the disclosure of which is incorporated herein by reference.

Details with respect to preparation of cellulosic dopes including cellulose dissolved in suitable ionic liquids and cellulose regeneration therefrom are found in U.S. patent application Ser. No. 10/256,521, U.S. Patent Application Publication No. 2003/0157351, now U.S. Pat. No. 6,824,599, of Swatloski et al. entitled "Dissolution and Processing of Cellulose Using Ionic Liquids", the disclosure of which is incorporated herein by reference. Here again, suitable levels of non-solvents for cellulose may be included. This patent publication generally describes a process for dissolving cellulose in an ionic liquid without derivatization and regenerating the cellulose in a range of structural forms. It is reported that the cellulose solubility and the solution properties can be controlled by the selection of ionic liquid constituents with small cations and halide or pseudohalide anions favoring solution. Preferred ionic liquids for dissolving cellulose include those with cyclic cations such as the following cations: imidazolium; pyridinum; pyridazinium; pyrimidinium; pyrazinium; pyrazolium; oxazolium; 1,2,3-triazolium; 1,2,4-triazolium; thiazolium; piperidinium; pyrrolidinium; quinolinium; and isoquinolinium.

Processing techniques for ionic liquids/cellulose dopes are also discussed in U.S. Pat. No. 6,808,557 to Holbrey et al., entitled "Cellulose Matrix Encapsulation and Method", the disclosure of which is incorporated herein by reference. Note also, U.S. patent application Ser. No. 11/087,496, U.S. Patent Application Publication No. 2005/0288484, now U.S. Pat. No. 7,888,412, of Holbrey et al., entitled "Polymer Dissolution and Blend Formation in Ionic Liquids", as well as U.S. patent application Ser. No. 10/394,989, U.S. Patent Application Publication No. 2004/0038031, now U.S. Pat. No. 6,808,557, of Holbrey et al., entitled "Cellulose Matrix Encapsulation and Method", the disclosures of which are incorporated herein by reference. With respect to ionic fluids, in general, the following documents provide further detail: U.S. patent application Ser. No. 11/406,620, U.S. Patent Application Publication No. 2006/0241287, now U.S. Pat. No. 7,763,715, of Hecht et al., entitled "Extracting Biopolymers From a Biomass Using Ionic Liquids"; U.S. patent application Ser. No. 11/472,724, U.S. Patent Application Publication No. 2006/0240727 of Price et al., entitled "Ionic Liquid Based Products and Method of Using The Same"; U.S. patent application Ser. No. 11/472,729, U.S. Patent Application Publication No. 2006/0240728 of Price et al., entitled "Ionic Liquid Based Products and Method of Using the Same"; U.S. patent application Ser. No. 11/263,391, U.S. Patent Application Publication No. 2006/0090271 of Price et al., entitled "Processes For Modifying Textiles Using Ionic Liquids"; and U.S. patent application Ser. No. 11/375,963, U.S. Patent Application Publication No. 2006/0207722, now U.S. Pat. No. 8,318,859, of Amano et al., the disclosures of which are incorporated herein by reference. Some ionic liquids and quasi-ionic liquids that may be suitable are disclosed by Imperator et al., Chem. Commun. pages 1170 to 1172, 2005, the disclosure of which is incorporated herein by reference.

"Ionic liquid" refers to a molten composition including an ionic compound that is preferably a stable liquid at temperatures of less than 100° C. at ambient pressure. Typically, such liquids have a very low vapor pressure at 100° C., less than 75 mBar or so, and preferably, less than 50 mBar or less than 25 mBar at 100° C. Most suitable liquids will have a vapor pressure of less than 10 mBar at 100° C. and, often, the vapor pressure is so low that it is negligible, and is not easily measurable, since it is less than 1 mBar at 100° C.

Suitable commercially available ionic liquids are Basionic™ ionic liquid products available from BASF (Florham Park, N.J.) and are listed in Table 2 below.

TABLE 2

Exemplary Ionic Liquids

| IL Abbreviation | Basionic ™ Grade | Product name | CAS Number |
|---|---|---|---|
| STANDARD | | | |
| EMIM Cl | ST 80 | 1-Ethyl-3-methylimidazolium chloride | 65039-09-0 |
| EMIM CH$_3$SO$_3$ | ST 35 | 1-Ethyl-3-methylimidazolium methanesulfonate | 145022-45-3 |
| BMIM Cl | ST 70 | 1-Butyl-3-methylimidazolium chloride | 79917-90-1 |
| BMIM CH$_3$SO$_3$ | ST 78 | 1-Butyl-3-methylimidazolium methanesulfonate | 342789-81-5 |
| MTBS | ST 62 | Methyl-tri-n-butylammonium methylsulfate | 13106-24-6 |
| MMMPZ MeOSO$_3$ | ST 33 | 1,2,4-Trimethylpyrazolium methylsulfate | |
| EMMIM EtOSO$_3$ | ST 67 | 1-Ethyl-2,3-di-methylimidazolium ethylsulfate | 516474-08-01 |
| MMMIM MeOSO$_3$ | ST 99 | 1,2,3-Trimethyl-imidazolium methylsulfate | 65086-12-6 |
| ACIDIC | | | |
| HMIM Cl | AC 75 | Methylimidazolium chloride | 35487-17-3 |
| HMIM HSO$_4$ | AC 39 | Methylimidazolium hydrogensulfate | 681281-87-8 |
| EMIM HSO$_4$ | AC 25 | 1-Ethyl-3-methylimidazolium hydrogensulfate | 412009-61-1 |
| EMIM AlCl$_4$ | AC 09 | 1-Ethyl-3-methylimidazolium tetrachloroaluminate | 80432-05-9 |
| BMIM HSO$_4$ | AC 28 | 1-Butyl-3-methylimidazolium hydrogensulfate | 262297-13-2 |
| BMIM AlCl$_4$ | AC 01 | 1-Butyl-3-methylimidazolium tetrachloroaluminate | 80432-09-3 |
| BASIC | | | |
| EMIM Acetat | BC 01 | 1-Ethyl-3-methylimidazolium acetate | 143314-17-4 |
| BMIM Acetat | BC 02 | 1-Butyl-3-methylimidazolium acetate | 284049-75-8 |

TABLE 2-continued

Exemplary Ionic Liquids

| IL Abbreviation | Basionic ™ Grade | Product name | CAS Number |
|---|---|---|---|
| LIQUID AT RT | | | |
| EMIM EtOSO$_3$ | LQ 01 | 1-Ethyl-3-methylimidazolium ethylsulfate | 342573-75-5 |
| BMIM MeOSO$_3$ | LQ 02 | 1-Butyl-3-methylimidazolium methylsulfate | 401788-98-5 |
| LOW VISCOSITY | | | |
| EMIM SCN | VS 01 | 1-Ethyl-3-methylimidazolium thiocyanate | 331717-63-6 |
| BMIM SCN | VS 02 | 1-Butyl-3-methylimidazolium thiocyanate | 344790-87-0 |
| FUNCTIONALIZED | | | |
| COL Acetate | FS 85 | Choline acetate | 14586-35-7 |
| COL Salicylate | FS 65 | Choline salicylate | 2016-36-6 |
| MTEOA MeOSO$_3$ | FS 01 | Tris-(2-hydroxyethyl)-methylammonium methylsulfate | 29463-06-7 |

Cellulose dopes including ionic liquids having dissolved therein about 5% by weight underivatized cellulose are commercially available from Sigma-Aldrich Corp., St. Louis, Mo. (Aldrich). These compositions utilize alkyl-methylimidazolium acetate as the solvent. It has been found that choline-based ionic liquids are not particularly suitable for dissolving cellulose.

After the cellulosic dope is prepared, it is spun into fiber, fibrillated and incorporated into absorbent sheet as described later.

A synthetic cellulose, such as lyocell, is split into micro- and nano-fibers and added to conventional wood pulp at a relatively low level, on the order of 10%. The fiber may be fibrillated in an unloaded disk refiner, for example, or any other suitable technique including using a PFI mil. Preferably, relatively short fiber is used and the consistency kept low during fibrillation. The beneficial features of fibrillated lyocell include biodegradability, hydrogen bonding, dispersibility, repulpability, and smaller microfibers than obtainable with meltspun fibers, for example.

Fibrillated lyocell or its equivalent has advantages over splittable meltspun fibers. Synthetic microdenier fibers come in a variety of forms. For example, a 3 denier nylon/PET fiber in a so-called pie wedge configuration can be split into 16 or 32 segments, typically, in a hydroentangling process. Each segment of a 16-segment fiber would have a coarseness of about 2 mg/100 m versus *eucalyptus* pulp at about 7 mg/100 m. Unfortunately, a number of deficiencies have been identified with this approach for conventional wet laid applications. Dispersibility is less than optimal. Melt spun fibers must be split before sheet formation, and an efficient method is lacking Most available polymers for these fibers are not biodegradable. The coarseness is lower than wood pulp, but still high enough that they must be used in substantial amounts and form a costly part of the furnish. Finally, the lack of hydrogen bonding requires other methods of retaining the fibers in the sheet.

Fibrillated lyocell has fibrils that can be as small as 0.1 to 0.25 microns (μm) in diameter, translating to a coarseness of 0.0013 to 0.0079 mg/100 m. Assuming these fibrils are available as individual strands—separate from the parent fiber—the furnish fiber population can be dramatically increased at a very low addition rate. Even fibrils not separated from the parent fiber may provide benefit. Dispersibility, repulpability, hydrogen bonding, and biodegradability remain product attributes since the fibrils are cellulose.

Fibrils from lyocell fiber have important distinctions from wood pulp fibrils. The most important distinction is the length of the lyocell fibrils. Wood pulp fibrils are only perhaps microns long, and, therefore, act in the immediate area of a fiber-fiber bond. Wood pulp fibrillation from refining leads to stronger, denser sheets. Lyocell fibrils, however, are potentially as long as the parent fibers. These fibrils can act as independent fibers and improve the bulk while maintaining or improving strength. Southern pine and mixed southern hardwood (MSHW) are two examples of fibers that are disadvantaged relative to premium pulps with respect to softness. The term "premium pulps" used herein refers to northern softwoods and *eucalyptus* pulps commonly used in the tissue industry for producing the softest bath, facial, and towel grades. Southern pine is coarser than northern softwood kraft, and mixed southern hardwood is both coarser and higher in fines than market *eucalyptus*. The lower coarseness and lower fines content of premium market pulp leads to a higher fiber population, expressed as fibers per gram (N or $N_{i>0.2}$) in Table 1. The coarseness and length values in Table 1 were obtained with an OpTest Fiber Quality Analyzer. Definitions are as follows:

$$L_n = \frac{\sum_{\text{all fibers}} n_i L_i}{\sum_{\text{all fibers}} n_i} \quad L_{n,i>0.2} = \frac{\sum_{i>0.2} n_i L_i}{\sum_{i>0.2} n_i} \quad C = 10^5 \times \frac{\text{sampleweight}}{\sum_{\text{all fibers}} n_i L_i}$$

$$N = \frac{100}{CL} [=] \text{millionfibers/gram.}$$

Northern bleached softwood kraft (NBSK) and *eucalyptus* have more fibers per gram than southern pine and hardwood. Lower coarseness leads to higher fiber populations and smoother sheets.

For comparison, the "parent" or "stock" fibers of unfibrillated lyocell have a coarseness 16.6 mg/100 m before fibrillation and a diameter of about 11 to 12 μm.

TABLE 3

Fiber Properties

| Sample | Type | C, mg/100 m | Fines, % | $L_{n, mm}$ | N, MM/g | $L_{n, i>0.2, mm}$ | $N_{i<0.2}$, MM/g |
|---|---|---|---|---|---|---|---|
| Southern HW | Pulp | 10.1 | 21 | 0.28 | 35 | 0.91 | 11 |
| Southern H-low fines | Pulp | 10.1 | 7 | 0.54 | 18 | 0.94 | 11 |
| Aracruz Eucalyptus | Pulp | 6.9 | 5 | 0.50 | 29 | 0.72 | 20 |
| Southern SW | Pulp | 18.7 | 9 | 0.60 | 9 | 1.57 | 3 |
| Northern SW | Pulp | 14.2 | 3 | 1.24 | 6 | 1.74 | 4 |
| Southern (30 SW/70 HW) | Base Sheet | 11.0 | 18 | 0.31 | 29 | 0.93 | 10 |
| 30 Southern SW/70 Eucalyptus | Base Sheet | 8.3 | 7 | 0.47 | 26 | 0.77 | 16 |

Figure 5:
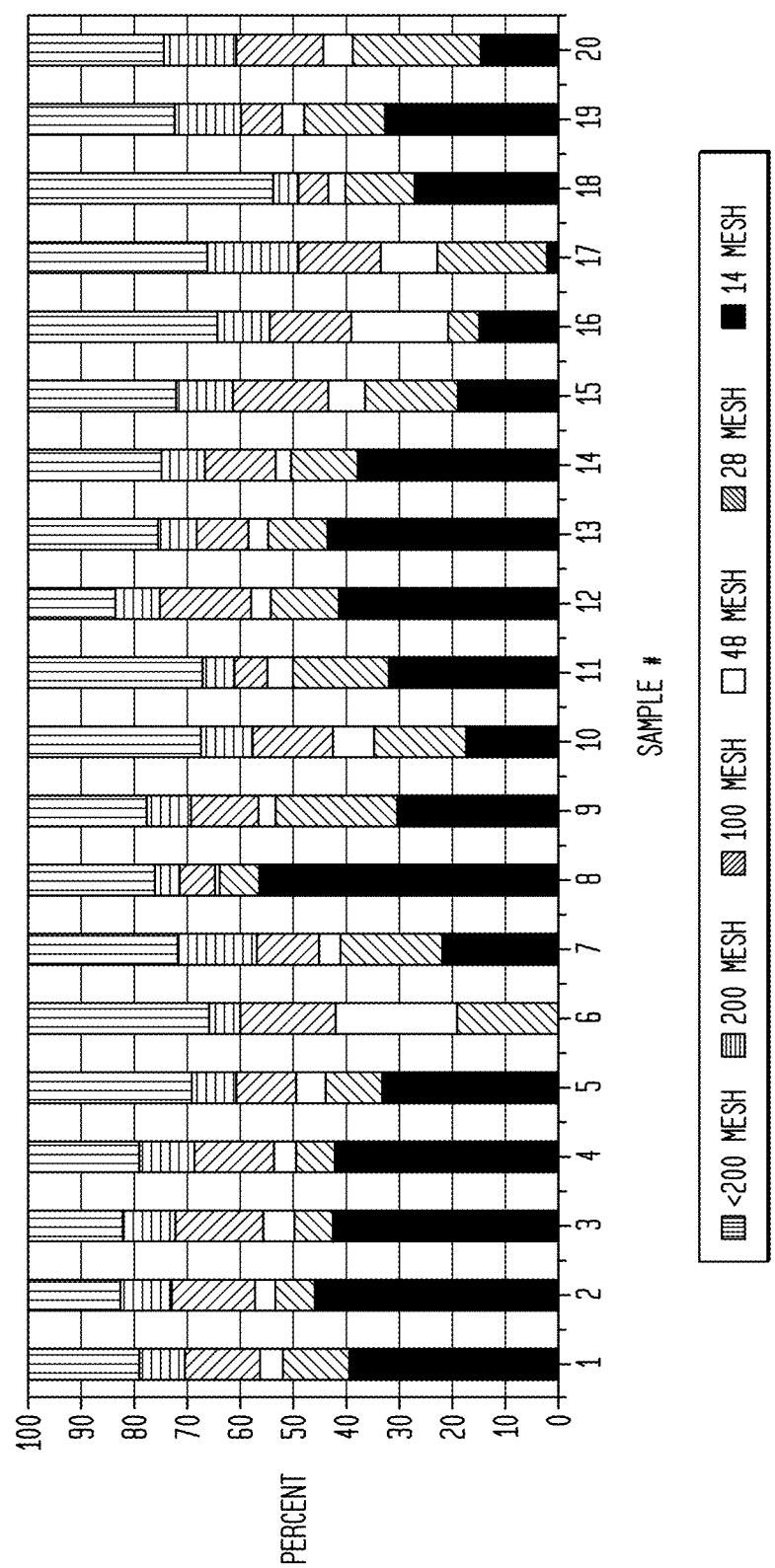
FIG. 5 is a histogram showing fiber size or "fineness" of fibrillated lyocell fibers.
Figure 6:
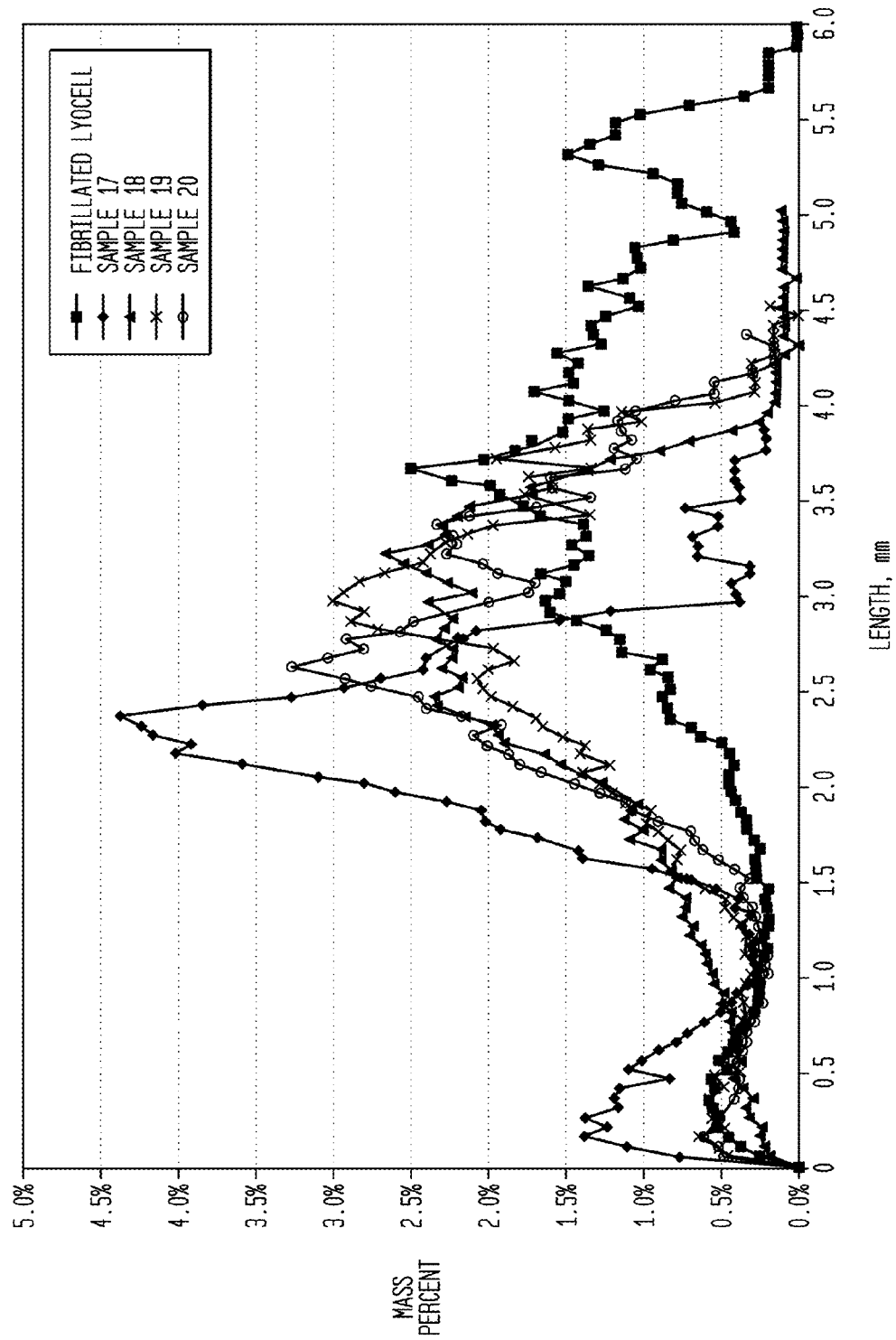
FIG. 6 is a plot of Fiber Quality Analyzer (FQA) measured fiber length for various fibrillated lyocell fiber samples.

The fibrils of fibrillated lyocell have a coarseness on the order of 0.001 to 0.008 mg/100 m. Thus, the fiber population can be dramatically increased at relatively low addition rates. Fiber length of the parent fiber is selectable, and fiber length of the fibrils can depend on the starting length and the degree of cutting during the fibrillation process, as can be seen in FIGS. 5 and 6.

The dimensions of the fibers passing the 200 mesh screen are on the order of 0.2 micron by 100 micron long. Using these dimensions, one calculates a fiber population of 200 billion fibers per gram. For perspective, southern pine might be three million fibers per gram and *eucalyptus* might be twenty million fibers per gram (Table 1). It appears that these fibers are the fibrils that are broken away from the original unrefined fibers. Different fiber shapes with lyocell intended to readily fibrillate could result in 0.2 micron diameter fibers that are perhaps 1000 microns or more long instead of 100. As noted above, fibrillated fibers of regenerated cellulose may be made by producing "stock" fibers having a diameter of 10 to 12 microns or so followed by fibrillating the parent fibers. Alternatively, fibrillated lyocell microfibers have recently become available from Engineered Fibers Technology (Shelton, Conn.) having suitable properties. FIG. 5 shows a series of Bauer-McNett classifier analyses of fibrillated lyocell samples showing various degrees of "fineness". Particularly preferred materials are more than 40% fiber that is finer than 14 mesh and exhibit a very low coarseness (low freeness). For ready reference, mesh sizes appear in Table 4, below.

TABLE 4

Mesh Size

| Sieve Mesh # | Inches | Microns |
|---|---|---|
| 14 | .0555 | 1400 |
| 28 | .028 | 700 |
| 60 | .0098 | 250 |
| 100 | .0059 | 150 |
| 200 | .0029 | 74 |

Details as to fractionation using the Bauer-McNett Classifier appear in Gooding et al., "Fractionation in a Bauer-McNett Classifier", Journal of Pulp and Paper Science; Vol. 27, No. 12, December 2001, the disclosure of which is incorporated herein by reference.

FIG. 6 is a plot showing fiber length as measured by a Fiber Quality Analyzer (FQA) for various samples including samples 17 to 20 shown on FIG. 5. From this data, it is appreciated that much of the fine fiber is excluded by the FQA analyzed and length prior to fibrillation has an effect on fineness.

The following abbreviations and tradenames are used in the examples that follow:

Abbreviations and Tradenames

Amres®—wet strength resin trademark;
BCTMP—bleached chemi-mechanical pulp
cmf—regenerated cellulose microfiber;
CMC—carboxymethyl cellulose;
CWP—conventional wet-press process, including felt-pressing to a drying cylinder;
DB—debonder;
NBSK—northern bleached softwood kraft;
NSK—northern softwood kraft;
RBA—relative bonded area;
REV—refers to refining in a PFI mill, # of revolutions;
SBSK—southern bleached softwood kraft;
SSK—southern softwood kraft;
Varisoft—Trademark for debonder;
W/D—wet/dry CD tensile ratio; and
WSR—wet strength resin.

Examples 1 to 22

Utilizing pulp-derived papermaking fiber and fibrillated lyocell, including the Sample 17 material noted above, handsheets (16 lb/ream nominal) were prepared from furnish at 3% consistency. The sheets were wet-pressed at 15 psi for 5½ minutes prior to drying. A sheet was produced with and without wet and dry strength resins and debonders as indicated in Table 5, which provides details as to composition and properties.

TABLE 5

16 lb. Sheet Data

| Run # | Description | cmf | refining | cmf source | Formation Index | Tensile g/3 in. | Stretch % |
|---|---|---|---|---|---|---|---|
| 1-1 | 0 rev, 100% pulp, no chemical | 0 | 0 | | 95 | 5988 | 4.2 |
| 2-1 | 1000 rev, 100% pulp, no chemical | 0 | 1000 | | 101 | 11915 | 4.2 |

TABLE 5-continued 16 lb. Sheet Data

| Run # | Description | | | | | | |
|---|---|---|---|---|---|---|---|
| 3-1 | 2500 rev, 100% pulp, no chemical | 0 | 2500 | | 102 | 14354 | 4.7 |
| 4-1 | 6000 rev, 100% pulp, no chemical | 0 | 6000 | | 102 | 16086 | 4.8 |
| 5-1 | 0 rev, 90% pulp/10% cmf tank 3, no chemical | 10 | 0 | refined 6 mm | 95 | 6463 | 4.1 |
| 6-1 | 1000 rev, 90% pulp/10% cmf tank 3, no chemical | 10 | 1000 | refined 6 mm | 99 | 10698 | 4.5 |
| 7-1 | 1000 rev, 80% pulp/20% cmf tank 3, no chemical | 20 | 1000 | refined 6 mm | 96 | 9230 | 4.2 |
| 8-1 | 2500 rev, 90% pulp/10% cmf tank 3, no chemical | 10 | 2500 | refined 6 mm | 100 | 12292 | 5.4 |
| 9-1 | 6000 rev, 90% pulp/10% cmf, no chemical | 10 | 6000 | refined 6 mm | 99 | 15249 | 5.0 |
| 10-1 | 0 rev, 90% pulp/10% Sample 17, no chemical | 10 | 0 | cmf | 99 | 7171 | 4.7 |
| 11-1 | 1000 rev, 90% pulp/10% Sample 17, no chemical | 10 | 1000 | cmf | 99 | 10767 | 4.1 |
| 12-1 | 1000 rev, 80% pulp/20% Sample 17, no chemical | 20 | 1000 | cmf | 100 | 9246 | 4.1 |
| 13-1 | 2500 rev, 90% pulp/10% Sample 17, no chemical | 10 | 2500 | cmf | 100 | 13583 | 4.7 |
| 14-1 | 6000 rev, 90% pulp/10% Sample 17, no chemical | 10 | 6000 | cmf | 103 | 15494 | 5.0 |
| 15-1 | 1000 rev, 80/20 pulp/cmf Sample 17, CMC4, WSR20, DB0 | 20 | 1000 | cmf | 99 | 12167 | 4.8 |
| 16-1 | 1000rev, 80/20 pulp/cmf Sample 17, CMC6, WSR30, DB15 | 20 | 1000 | cmf | 90 | 11725 | 4.7 |
| 17-1 | 0 revs, 80/20 pulp/cmf Sample 17, CMC4, WSR20, DB15 | 20 | 0 | cmf | 86 | 7575 | 4.2 |
| 18-1 | 0 rev, 80/20 pulp/cmf Sample 17, CMC4, WSR20, DB0 | 20 | 0 | cmf | 94 | 8303 | 4.2 |
| 19-1 | 1000 rev, 80/20 pulp/cmf tank 3, CMC 4, WSR20, DB 0 | 20 | 1000 | refined 6 mm | 97 | 11732 | 4.9 |
| 20-1 | 1000 rev, 80/20 pulp/cmf tank 3, CMC 6, WSR 30, DB15 | 20 | 1000 | refined 6 mm | 89 | 11881 | 4.8 |
| 21-1 | 0 rev, 80/20 pulp/cmf tank 3, CMC 4, WSR 20, DB 15 | 20 | 0 | refined 6 mm | 85 | 6104 | 3.4 |
| 22-1 | 0 rev, 80/20 pulp/cmf tank 3, CMC 4, WSR 20, DB 0 | 20 | 0 | refined 6 mm | 92 | 8003 | 4.4 |

| Run # | Description | TEA MD mm-gm/mm$^2$ | Opacity TAPPI Opacity Units | Opacity Scat. Coef. m$^2$/kg | Opacity Absorp. Coef. m$^2$/kg | Break Modulus gms/% | Wet Tens Finch g/3 in. |
|---|---|---|---|---|---|---|---|
| 1-1 | 0 rev, 100% pulp, no chemical | 1.514 | 54.9 | 34.58 | 0.0000 | 1,419 | 94 |
| 2-1 | 1000 rev, 100% pulp, no chemical | 3.737 | 50.2 | 29.94 | 0.0000 | 2,861 | 119 |
| 3-1 | 2500 rev, 100% pulp, no chemical | 4.638 | 48.3 | 28.08 | 0.0000 | 3,076 | 172 |
| 4-1 | 6000 rev, 100% pulp, no chemical | 5.174 | 41.9 | 22.96 | 0.0000 | 3,403 | 275 |
| 5-1 | 0 rev, 90% pulp/10% cmf tank 3, no chemical | 1.989 | 60.1 | 43.96 | 0.0763 | 1,596 | 107 |
| 6-1 | 1000 rev, 90% pulp/10% cmf tank 3, no chemical | 3.710 | 53.5 | 34.84 | 0.0000 | 2,387 | 105 |
| 7-1 | 1000 rev, 80% pulp/20% cmf tank 3, no chemical | 2.757 | 63.2 | 47.87 | 0.0000 | 2,212 | 96 |
| 8-1 | 2500 rev, 90% pulp/10% cmf tank 3, no chemical | 4.990 | 53.4 | 34.43 | 0.0000 | 2,309 | 121 |
| 9-1 | 6000 rev, 90% pulp/10% cmf, no chemical | 5.689 | 50.0 | 29.37 | 0.0000 | 3,074 | 171 |
| 10-1 | 0 rev, 90% pulp/10% cmf Sample 17, no chemical | 2.605 | 62.8 | 48.24 | 0.0000 | 1,538 | 69 |
| 11-1 | 1000 rev, 90% pulp/10% Sample 17, no chemical | 3.344 | 57.3 | 39.93 | 0.0000 | 2,633 | 121 |
| 12-1 | 1000 rev, 80% pulp/20% Sample 17, no chemical | 2.815 | 62.6 | 49.60 | 0.0000 | 2,242 | 97 |
| 13-1 | 2500 rev, 90% pulp/10% Sample 17, no chemical | 4.685 | 53.9 | 35.00 | 0.0000 | 2,929 | 122 |
| 14-1 | 6000 rev, 90% pulp/10% Sample 17, no chemical | 5.503 | 48.0 | 28.76 | 0.0000 | 3,075 | 171 |
| 15-1 | 1000 rev, 80/20 pulp/cmf Sample 17, CMC4, WSR20, DB0 | 4.366 | 65.2 | 52.56 | 0.3782 | 2,531 | 4,592 |
| 16-1 | 1000 rev, 80/20 pulp/cmf Sample 17, CMC6, WSR30, DB15 | 3.962 | 64.8 | 53.31 | 0.3920 | 2,472 | 5,439 |
| 17-1 | 0 revs, 80/20 pulp/cmf Sample 17, CMC4, WSR20, DB15 | 2.529 | 75.1 | 59.34 | 0.3761 | 1,801 | 4,212 |
| 18-1 | 0 rev, 80/20 pulp/cmf Sample 17, CMC 4, WSR20, DB0 | 2.704 | 67.4 | 56.16 | 0.3774 | 1,968 | 3,781 |
| 19-1 | 1000 rev, 80/20 pulp/cmf tank 3, CMC 4, WSR20, DB 0 | 4.270 | 59.4 | 44.67 | 0.3988 | 2,403 | 4,265 |
| 20-1 | 1000 rev, 80/20 pulp/cmf tank 3, CMC 6, WSR 30, DB15 | 4.195 | 64.7 | 49.98 | 0.3686 | 2,499 | 5,163 |
| 21-1 | 0 rev, 80/20 pulp/cmf tank 3, CMC 4, WSR 20, DB 15 | 1.597 | 67.1 | 54.38 | 0.3689 | 1,773 | 3,031 |
| 22-1 | 0 rev, 80/20 pulp/cmf tank 3, CMC 4, WSR 20, DB 0 | 2.754 | 64.4 | 50.38 | 0.3771 | 1,842 | 3,343 |

| Run # | Description | Basis Weight Raw Wt g | Caliper 5 Sheet mils/5 sht | Basis Weight g/m$^2$ | Freeness (CSF) mL | Wet/Dry | Basis Weight lb/3000 ft$^2$ |
|---|---|---|---|---|---|---|---|
| 1-1 | 0 rev, 100% pulp, no chemical | 0.534 | 13.95 | 26.72 | 503 | 1.6% | 16.4 |
| 2-1 | 1000 rev, 100% pulp, no chemical | 0.537 | 11.69 | 26.86 | 452 | 1.0% | 16.5 |
| 3-1 | 2500 rev, 100% pulp, no chemical | 0.533 | 11.20 | 26.64 | 356 | 1.2% | 16.4 |
| 4-1 | 6000 rev, 100% pulp, no chemical | 0.516 | 9.67 | 25.79 | 194 | 1.7% | 15.8 |
| 5-1 | 0 rev, 90% pulp/10% cmf tank 3, no chemical | 0.524 | 13.70 | 26.21 | 341 | 1.7% | 16.1 |
| 6-1 | 1000 rev, 90% pulp/10% cmf tank 3, no chemical | 0.536 | 12.03 | 26.81 | 315 | 1.0% | 16.5 |
| 7-1 | 1000 rev, 80% pulp/20% cmf tank 3, no chemical | 0.543 | 12.73 | 27.16 | 143 | 1.0% | 16.7 |
| 8-1 | 2500 rev, 90% pulp/10% cmf tank 3, no chemical | 0.527 | 11.11 | 26.37 | 176 | 1.0% | 16.2 |
| 9-1 | 6000 rev, 90% pulp/10% cmf, no chemical | 0.546 | 10.58 | 27.31 | 101 | 1.1% | 16.8 |
| 10-1 | 0 rev, 90% pulp/10% cmf Sample 17, no chemical | 0.526 | 15.77 | 26.32 | 150 | 1.0% | 16.2 |
| 11-1 | 1000 rev, 90% pulp/10% Sample 17, no chemical | 0.523 | 13.50 | 26.15 | 143 | 1.1% | 16.1 |
| 12-1 | 1000 rev, 80% pulp/20% Sample 17, no chemical | 0.510 | 11.23 | 25.48 | 75 | 1.0% | 15.6 |
| 13-1 | 2500 rev, 90% pulp/10% Sample 17, no chemical | 0.526 | 10.53 | 26.28 | 108 | 0.9% | 16.1 |
| 14-1 | 6000 rev, 90% pulp/10% Sample 17, no chemical | 0.520 | 9.79 | 26.01 | 70 | 1.1% | 16.0 |
| 15-1 | 1000 rev, 80/20 pulp/cmf Sample 17, CMC4, WSR20, DB0 | 0.529 | 11.97 | 26.44 | 163 | 37.7% | 16.2 |
| 16-1 | 1000 rev, 80/20 pulp/cmf Sample 17, CMC6, WSR30, DB15 | 0.510 | 11.80 | 25.51 | 115 | 46.4% | 15.7 |
| 17-1 | 0 revs, 80/20 pulp/cmf Sample 17, CMC4, WSR20, DB15 | 0.532 | 16.43 | 26.59 | 146 | 55.6% | 16.3 |
| 18-1 | 0 rev, 80/20 pulp/cmf Sample 17, CMC 4, WSR20, DB0 | 0.530 | 13.46 | 26.50 | 170 | 45.5% | 16.3 |
| 19-1 | 1000 rev, 80/20 pulp/cmf tank 3, CMC 4, WSR20, DB 0 | 0.501 | 12.24 | 25.07 | 261 | 36.4% | 15.4 |

TABLE 5-continued 16 lb. Sheet Data

| | | | | | | | |
|---|---|---|---|---|---|---|---|
| 20-1 | 1000 rev, 80/20 pulp/cmf tank 3, CMC 6, WSR 30, DB15 | 0.543 | 13.55 | 27.13 | 213 | 43.5% | 16.7 |
| 21-1 | 0 rev, 80/20 pulp/cmf tank 3, CMC 4, WSR 20, DB 15 | 0.542 | 15.05 | 27.10 | 268 | 49.6% | 16.6 |
| 22-1 | 0 rev, 80/20 pulp/cmf tank 3, CMC 4, WSR 20, DB 0 | 0.530 | 14.22 | 26.52 | 281 | 41.8% | 16.3 |

| Run # | Description | Dry Breaking Length, m | Wet Breaking Length, m | RBA |
|---|---|---|---|---|
| 1-1 | 0 rev, 100% pulp, no chemical | 2941 | 46 | 0.16100836 |
| 2-1 | 1000 rev, 100% pulp, no chemical | 5822 | 58 | 0.27375122 |
| 3-1 | 2500 rev, 100% pulp, no chemical | 7071 | 85 | 0.31886175 |
| 4-1 | 6000 rev, 100% pulp, no chemical | 8185 | 140 | 0.44311455 |
| 5-1 | 0 rev, 90% pulp/10% cmf tank 3, no chemical | 3236 | 53 | 0.19494363 |
| 6-1 | 1000 rev, 90% pulp/10% cmf tank 3, no chemical | 5238 | 51 | 0.36183869 |
| 7-1 | 1000 rev, 80% pulp/20% cmf tank 3, no chemical | 4460 | 46 | |
| 8-1 | 2500 rev, 90% pulp/10% cmf tank 3, no chemical | 6117 | 60 | 0.36938921 |
| 9-1 | 6000 rev, 90% pulp/10% cmf, no chemical | 7328 | 82 | 0.46212845 |
| 10-1 | 0 rev, 90% pulp/10% cmf Sample 17, no chemical | 3575 | 34 | 0.24976453 |
| 11-1 | 1000 rev, 90% pulp/10% Sample 17, no chemical | 5404 | 61 | 0.37906447 |
| 12-1 | 1000 rev, 80% pulp/20% Sample 17, no chemical | 4762 | 50 | |
| 13-1 | 2500 rev, 90% pulp/10% Sample 17, no chemical | 6782 | 61 | 0.45566074 |
| 14-1 | 6000 rev, 90% pulp/10% Sample 17, no chemical | 7818 | 86 | 0.55273449 |
| 15-1 | 1000 rev, 80/20 pulp/cmf Sample 17, CMC4, WSR20, DB0 | 6038 | 2279 | |
| 16-1 | 1000 rev, 80/20 pulp/cmf Sample 17, CMC6, WSR30, DB15 | 6031 | 2798 | |
| 17-1 | 0 revs, 80/20 pulp/cmf Sample 17, CMC4, WSR20, DB15 | 3738 | 2078 | |
| 18-1 | 0 rev, 80/20 pulp/cmf Sample 17, CMC4, WSR20, DB0 | 4113 | 1873 | |
| 19-1 | 1000 rev, 80/20 pulp/cmf tank 3, CMC 4, WSR20, DB 0 | 6141 | 2232 | |
| 20-1 | 1000 rev, 80/20 pulp/cmf tank 3, CMC 6, WSR 30, DB15 | 5747 | 2498 | |
| 21-1 | 0 rev, 80/20 pulp/cmf tank 3, CMC 4, WSR 20, DB 15 | 2956 | 1467 | |
| 22-1 | 0 rev, 80/20 pulp/cmf tank 3, CMC 4, WSR 20, DB 0 | 3961 | 1654 | |

Figure 7:
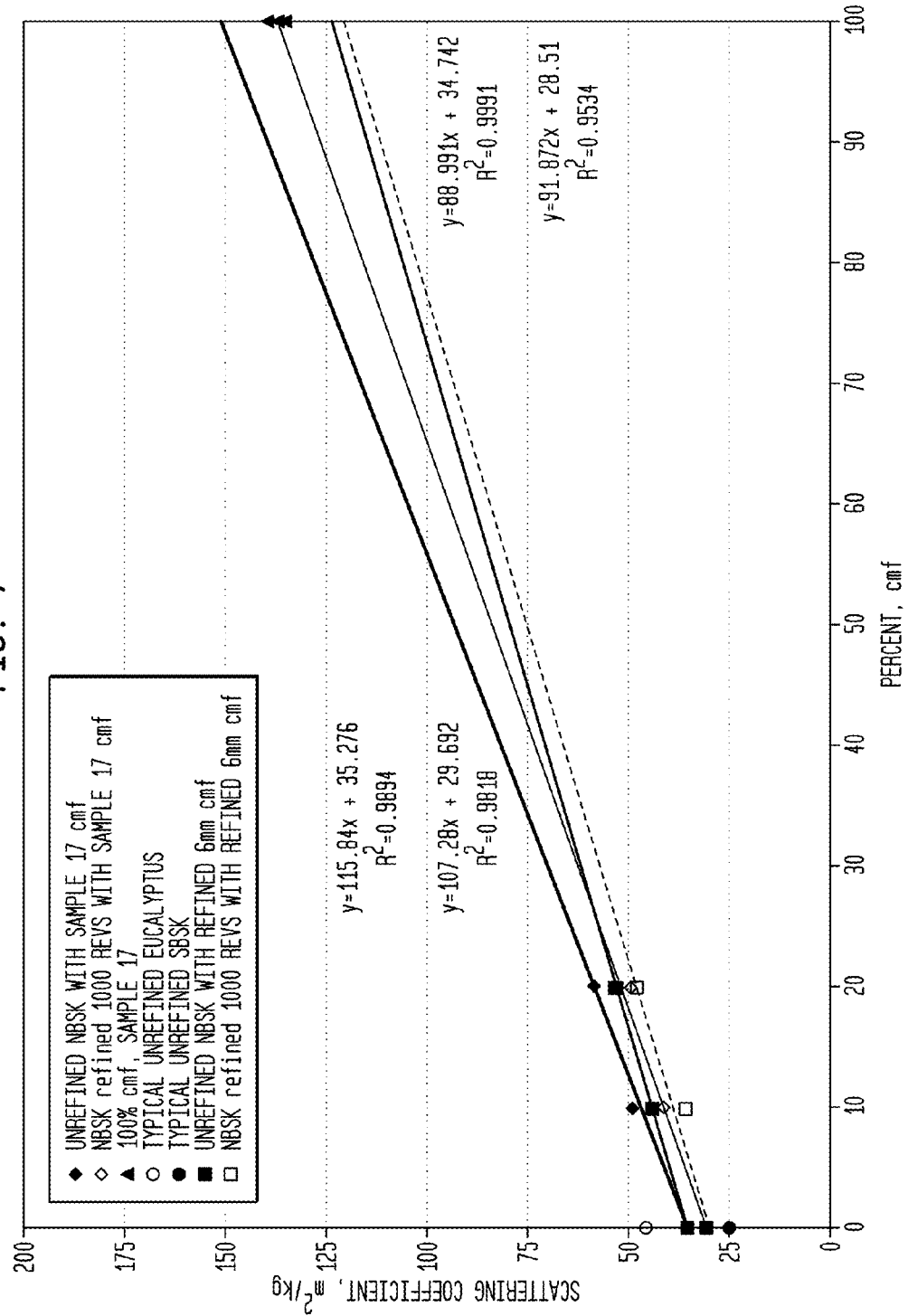
FIG. 7 is a plot of scattering coefficient in $m^2/kg$ versus % fibrillated lyocell microfiber for handsheets prepared with microfiber and papermaking fiber.
Figure 8:
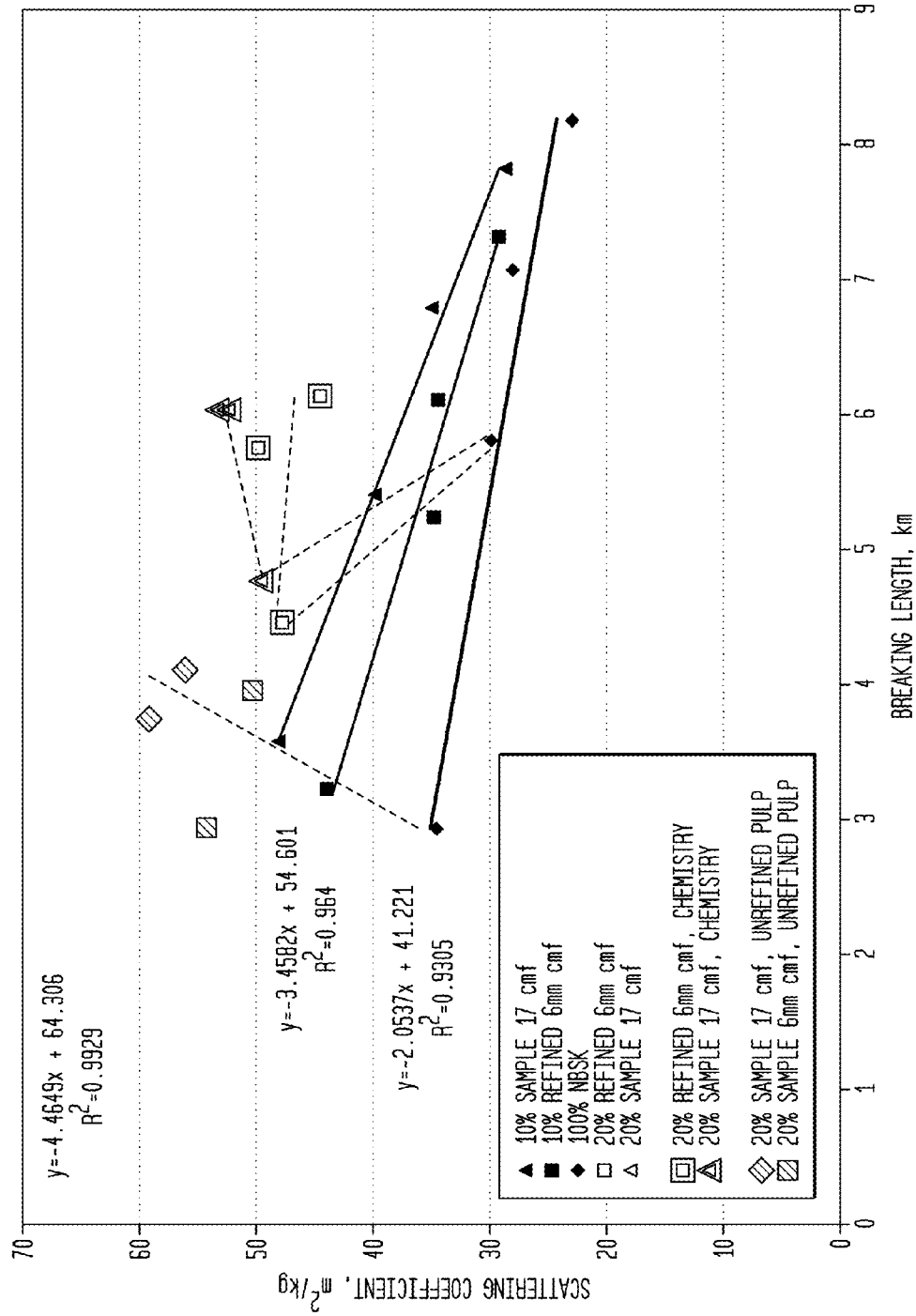
FIG. 8 is a plot of breaking length for various products.
Figure 9:
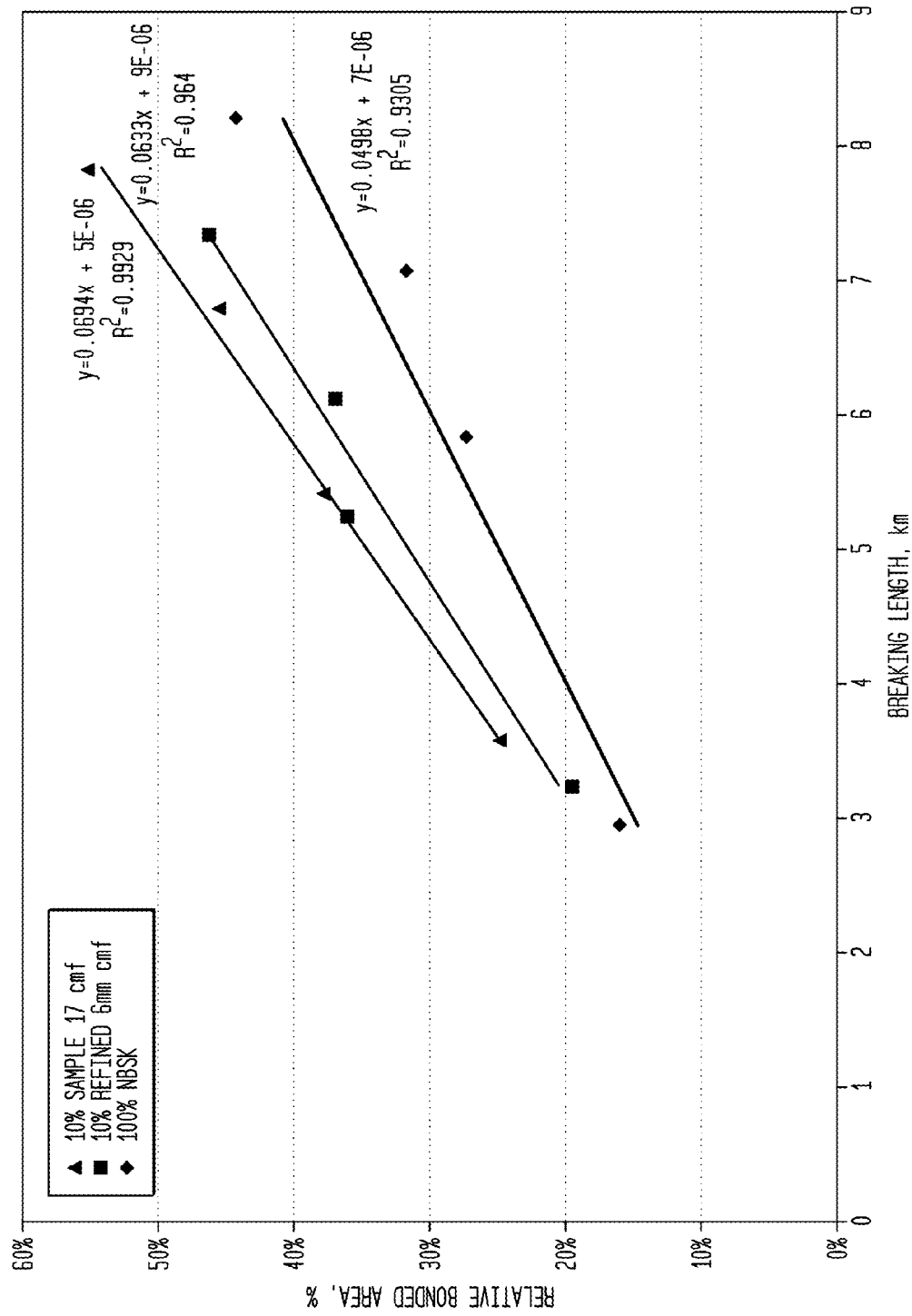
FIG. 9 is a plot of relative bonded area in % versus breaking length for various products.
Figure 10:
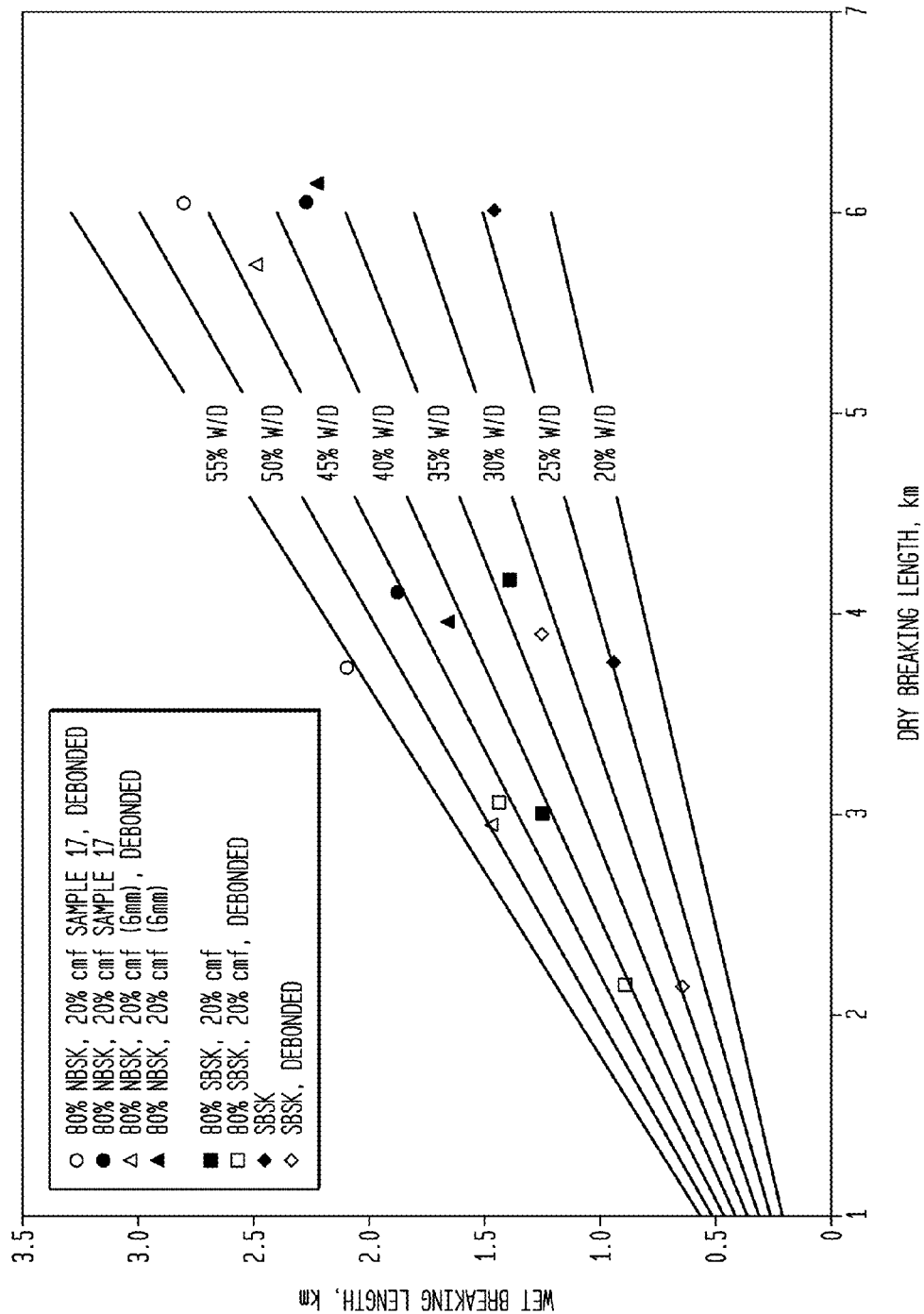
FIG. 10 is a plot of wet breaking length versus dry breaking length for various products, including handsheets made with fibrillated lyocell microfiber and pulp-derived papermaking fiber.
Figure 11:
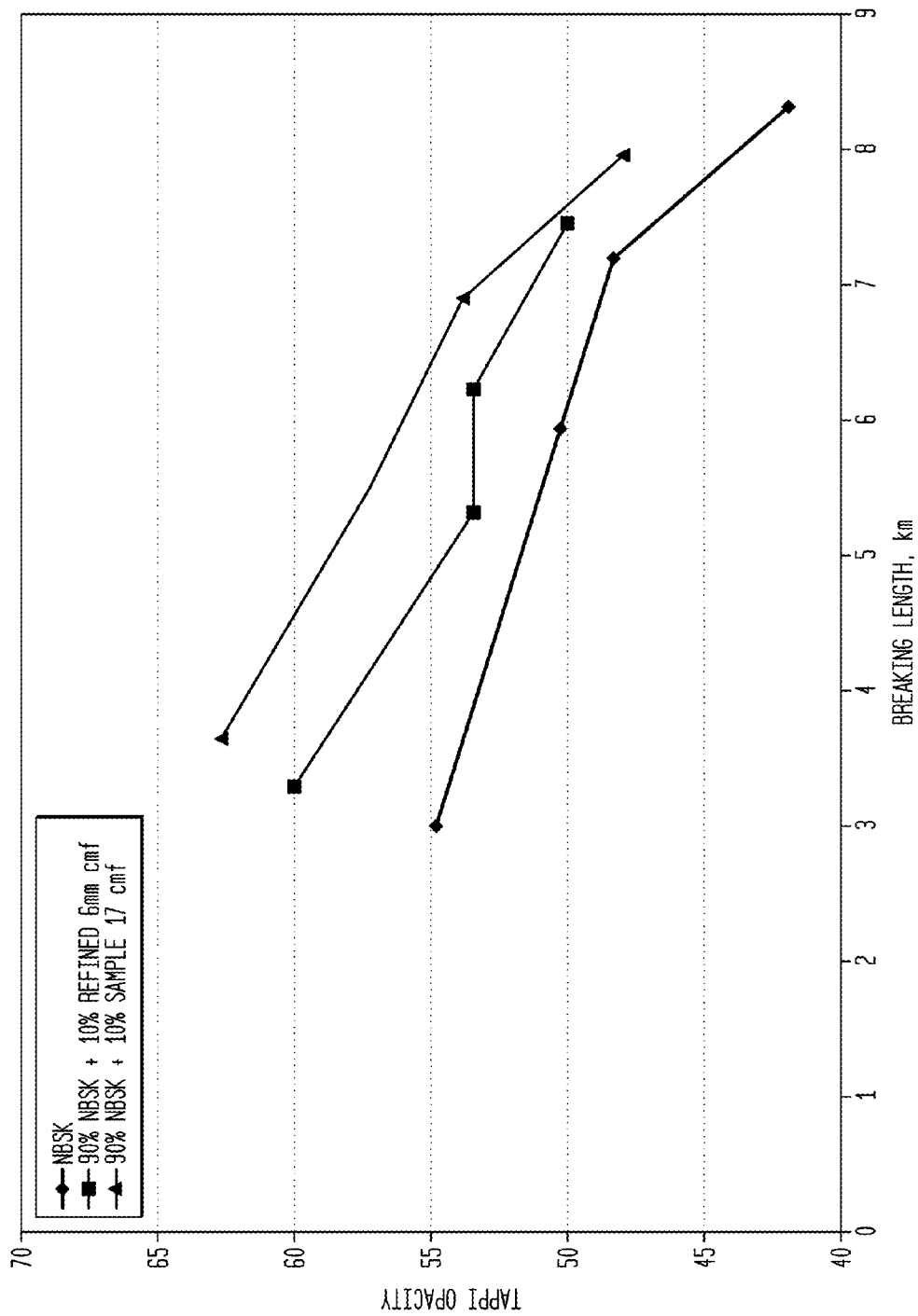
FIG. 11 is a plot of TAPPI Opacity versus breaking length for various products.
Figure 12:
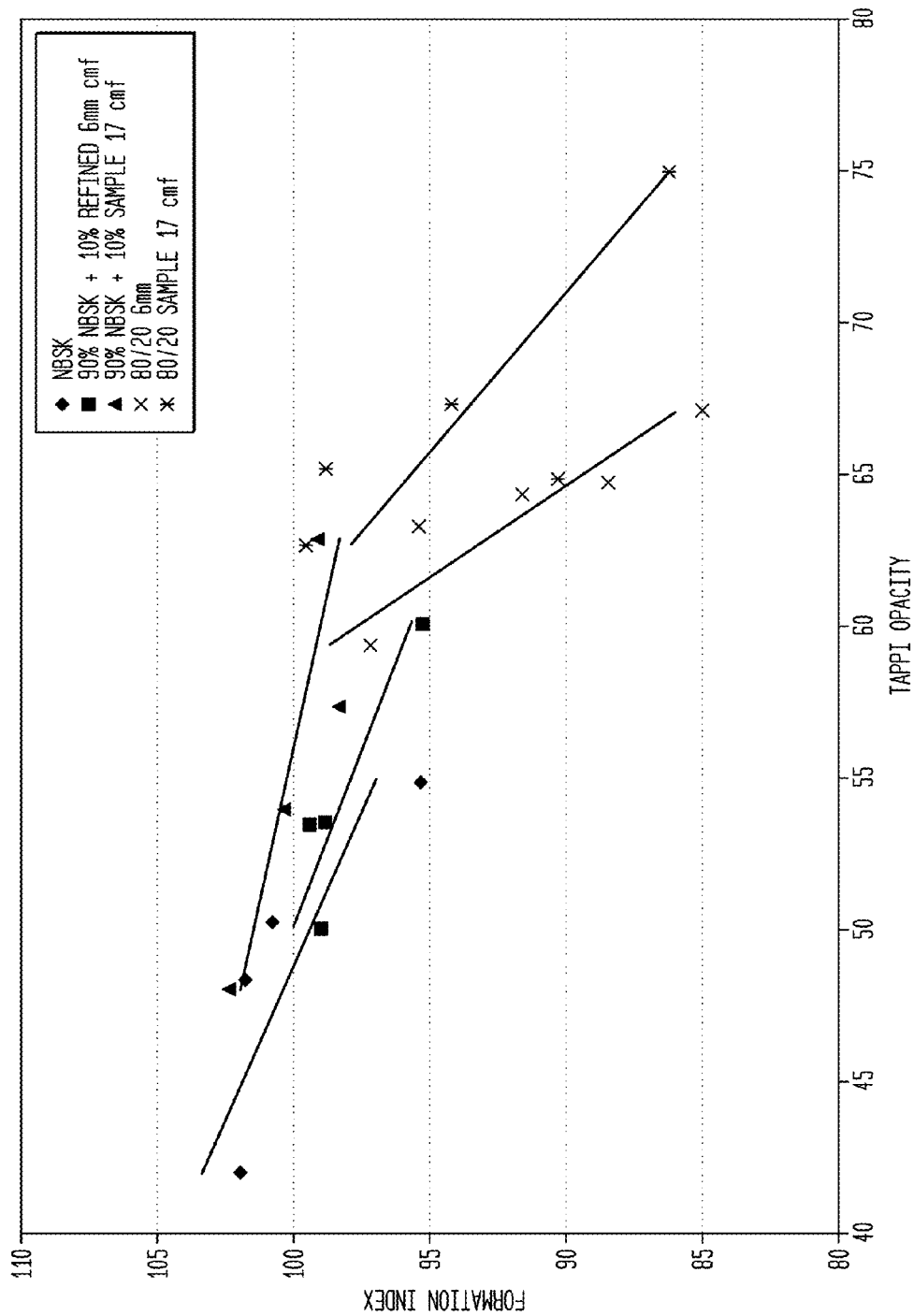
FIG. 12 is a plot of Formation Index versus TAPPI Opacity for various products.

These results and additional results also appear in FIGS. 7 to 12. Particularly noteworthy are FIGS. 7 and 10. In FIG. 7, it is seen that sheets made from pulp-derived fibers exhibit a scattering coefficient of less than 50 $m^2$/kg, while sheets made with lyocell microfibers exhibit scattering coefficients of generally more than 50 $m^2$/kg. In FIG. 10, it is seen that very high wet/dry tensile ratios are readily achieved, 50% or more.

It should be appreciated from FIGS. 8, 9, 11, and 12 that the use of microfibers favorably influences the opacity/breaking length relationship typically seen in paper products.

Figure 13:
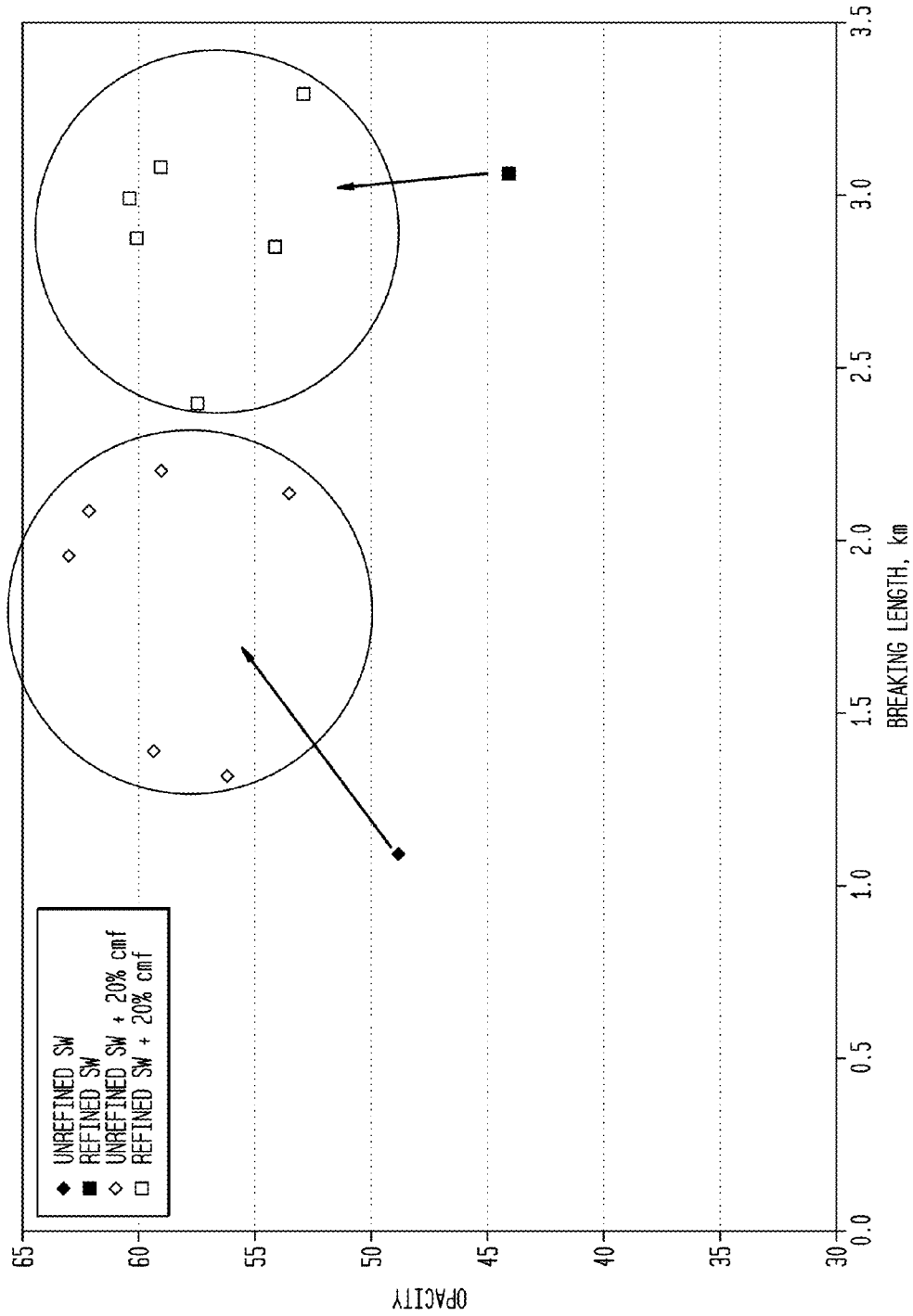
FIG. 13 is a plot of TAPPI Opacity versus breaking length for various products, including lyocell microfiber and pulp-derived papermaking fiber.

This latter feature of the invention is likewise seen in FIG. 13, which shows the impact of adding microfibers to softwood handsheets.

Examples 23 to 48

Figure 14:
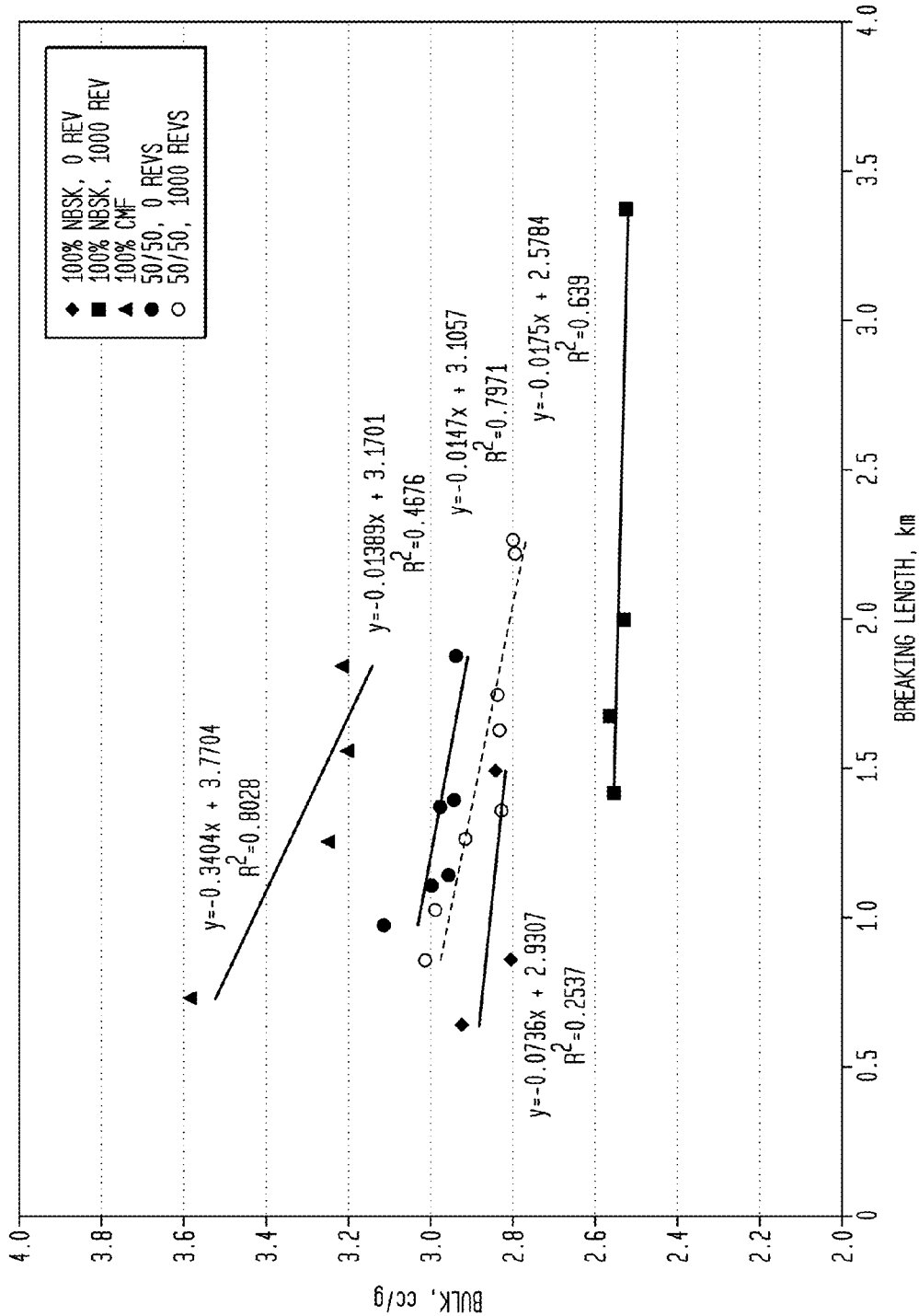
FIG. 14 is a plot of bulk, cc/g, versus breaking length for various products with and without lyocell papermaking fiber.
Figure 15:
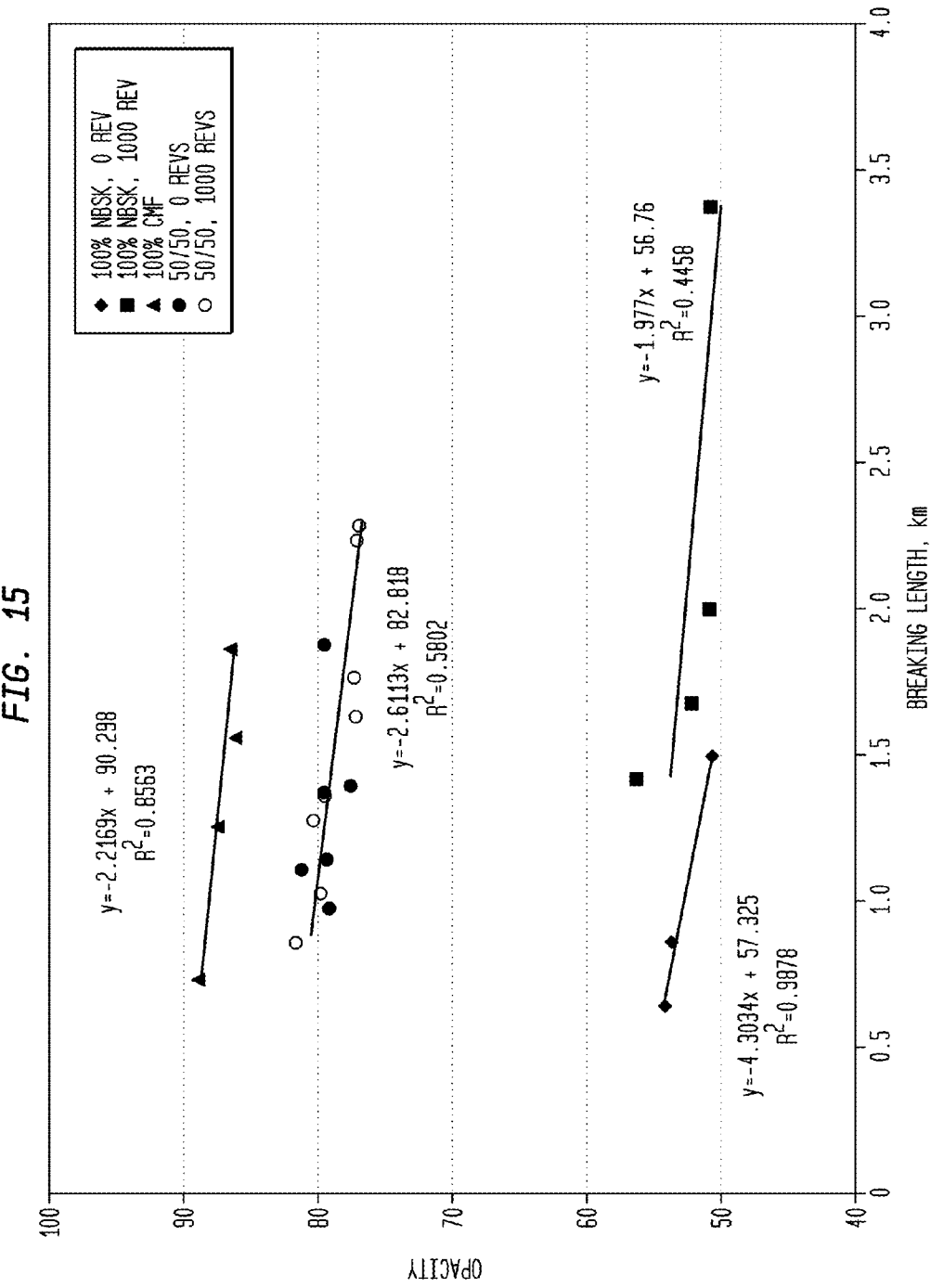
FIG. 15 is a plot of TAPPI Opacity versus breaking length for pulp-derived fiber handsheets and 50/50 lyocell/pulp handsheets.
Figure 16:
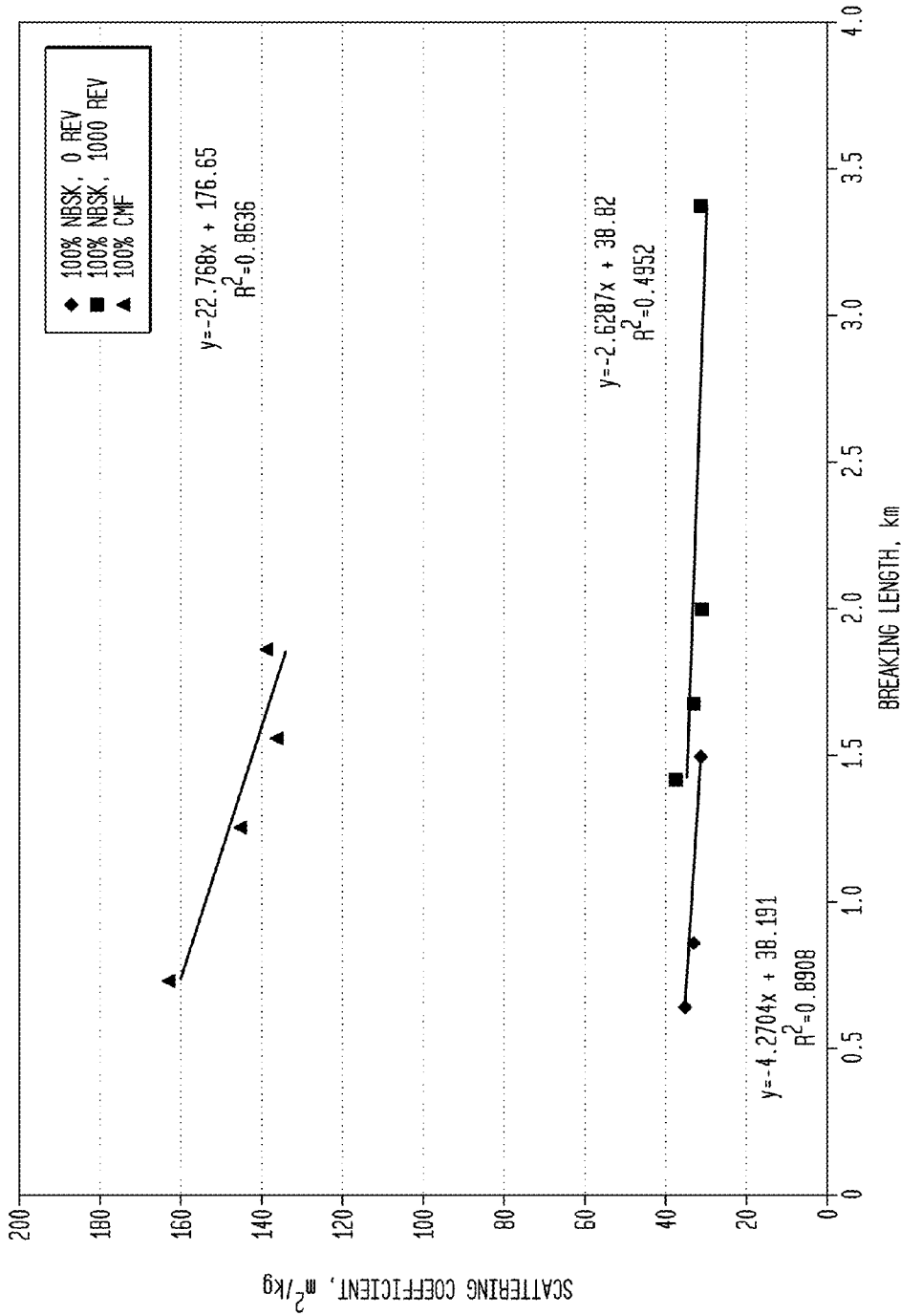
FIG. 16 is a plot of scattering coefficient versus breaking length for 100% lyocell handsheets and softwood fiber handsheets.

Another series of handsheets was produced with various levels of refining, debonder, cellulose microfiber, and strength resins were prepared following the procedures noted above. Details and results appear in Table 6 and in FIGS. 14 to 16, wherein it is seen that the microfiber increases opacity and bulk particularly.

TABLE 6

Handsheets with Debonder and Lyocell Microfiber

| Sheet # | Description | % cmf | lb/t Varisoft | Pulp refining, PFI revs | Addition method | Basis Weight lb/3000 ft² | Basis Weight Raw Wtg | Caliper 5 Sheet mils/5 sht | Opacity TAPPI Opacity Units |
|---|---|---|---|---|---|---|---|---|---|
| 1-1 | 100% NBSK-0 rev; 0 lb/t Varisoft GP-C | 0 | 0 | 0 | NA | 16.04 | 0.522 | 14.58 | 50.9 |
| 2-1 | 100% NBSK-0 rev; 10 lb/t Varisoft GP-C | 0 | 10 | 0 | NA | 16.92 | 0.551 | 15.20 | 53.9 |
| 3-1 | 100% NBSK-0 rev; 20 lb/t Varisoft GP-C | 0 | 20 | 0 | NA | 16.20 | 0.527 | 15.21 | 54.4 |
| 4-1 | 100% NBSK-1000 rev; 0 lb/t Varisoft GP-C | 0 | 0 | 1000 | NA | 16.69 | 0.543 | 13.49 | 50.7 |
| 5-1 | 100% NBSK-1000 rev; 10 lb/t Varisoft GP-C | 0 | 10 | 1000 | NA | 16.72 | 0.544 | 13.54 | 50.9 |
| 6-1 | 100% NBSK-1000 rev; 20 lb/t Varisoft GP-C | 0 | 20 | 1000 | NA | 16.25 | 0.529 | 13.33 | 52.2 |
| 7-1 | 100% NBSK-1000 rev; 40 lb/t Varisoft GP-C | 0 | 40 | 1000 | NA | 16.62 | 0.541 | 13.61 | 56.3 |
| 8-1 | 100% cmf; 0 lb/t Varisoft GP-C | 100 | 0 | | NA | 17.23 | 0.561 | 17.75 | 86.6 |
| 9-1 | 100% cmf; 10 lb/t Varisoft GP-C | 100 | 10 | | NA | 17.00 | 0.553 | 17.45 | 86.2 |
| 10-1 | 100% cmf; 20 lb/t Varisoft GP-C | 100 | 20 | | NA | 17.30 | 0.563 | 18.01 | 87.6 |
| 11-1 | 100% cmf; 40 lb/t Varisoft GP-C | 100 | 40 | | NA | 16.81 | 0.547 | 19.30 | 88.8 |
| 12-1 | 50% cmf/50% NBSK-0 rev; 0 lb/t Varisoft GP-C | 50 | 0 | 0 | NA | 17.14 | 0.558 | 16.14 | 79.5 |
| 13-1 | 50% cmf/50% NBSK-0 rev; 10 lb/t Varisoft GP-C | 50 | 10 | 0 | split to cmf | 16.90 | 0.550 | 16.11 | 79.5 |
| 14-1 | 50% cmf/50% NBSK-0 rev; 20 lb/t Varisoft GP-C | 50 | 20 | 0 | split to cmf | 16.15 | 0.526 | 16.11 | 79.1 |
| 15-1 | 50% cmf/50% NBSK-0 rev; 20 lb/t Varisoft GP-C | 50 | 20 | 0 | blend | 17.05 | 0.555 | 16.39 | 81.2 |

TABLE 6-continued

Handsheets with Debonder and Lyocell Microfiber

| Sheet # | Description | | | | | | | | |
|---|---|---|---|---|---|---|---|---|---|
| 16-1 | 50% cmf/50% NBSK-0 rev; 10 lb/t Varisoft GP-C | 50 | 10 | 0 | split to NBSK | 16.72 | 0.544 | 15.77 | 77.7 |
| 17-1 | 50% cmf/50% NBSK-0 rev; 20 lb/t Varisoft GP-C | 50 | 20 | 0 | split to NBSK | 16.79 | 0.547 | 15.91 | 79.3 |
| 18-1 | 50% cmf/50% NBSK-1000 rev; 0 lb/t Varisoft GP-C | 50 | 0 | 1000 | NA | 16.85 | 0.549 | 15.13 | 77.0 |
| 19-1 | 50% cmf/50% NBSK-1000 rev; 10 lb/t Varisoft C | 50 | 10 | 1000 | split to cmf | 16.38 | 0.533 | 14.85 | 77.1 |
| 20-1 | 50% cmf/50% NBSK-1000 rev; 20 lb/t Varisoft C | 50 | 20 | 1000 | split to cmf | 17.25 | 0.561 | 16.14 | 80.4 |
| 21-1 | 50% cmf/50% NBSK-1000 rev; 40 lb/t Varisoft C | 50 | 40 | 1000 | split to cmf | 17.19 | 0.560 | 16.59 | 81.7 |
| 22-1 | 50% cmf/50% NBSK-1000 rev; 20 lb/t Varisoft C | 50 | 0 | 1000 | blend | 16.50 | 0.537 | 14.78 | 77.2 |
| 23-1 | 50% cmf/50% NBSK-1000 rev; 10 lb/t Varisoft C | 50 | 10 | 1000 | split to NBSK | 16.63 | 0.541 | 15.14 | 77.4 |
| 24-1 | 50% cmf/50% NBSK-1000 rev; 20 lb/t Varisoft C | 50 | 20 | 1000 | split to NBSK | 16.89 | 0.550 | 15.33 | 79.5 |
| 25-1 | 50% cmf/50% NBSK-1000 rev; 40 lb/t Varisoft C | 50 | 40 | 1000 | split to NBSK | 16.33 | 0.532 | 15.66 | 80.0 |

| Sheet # | Description | Basis Weight g/m² | Opacity Scat. Coef. m²/kg | Bulk cm³/g | Opacity Absorp. Coef. m²/kg | Breaking Length 3 in. km | Tensile Modulus HS-3 in. gms/% | Stretch HS 3 in. % | TEA HS 3 in. g/mm |
|---|---|---|---|---|---|---|---|---|---|
| 1-1 | 100% NBSK-0 rev; 0 lb/t Varisoft GP-C | 26.11 | 32.02 | 2.838 | 0.77 | 1.49 | 1,630.623 | 1.822 | 0.312 |
| 2-1 | 100% NBSK-0 rev; 10 lb/t Varisoft GP-C | 27.54 | 33.78 | 2.805 | 0.73 | 0.86 | 1,295.520 | 1.400 | 0.128 |
| 3-1 | 100% NBSK-0 rev; 20 lb/t Varisoft GP-C | 26.37 | 36.02 | 2.930 | 0.76 | 0.64 | 918.044 | 1.392 | 0.086 |
| 4-1 | 100% NBSK-1000 rev; 0 lb/t Varisoft GP-C | 27.16 | 30.86 | 2.523 | 0.74 | 3.37 | 2,394.173 | 2.937 | 1.391 |
| 5-1 | 100% NBSK-1000 rev; 10 lb/t Varisoft GP-C | 27.21 | 30.94 | 2.527 | 0.73 | 2.00 | 2,185.797 | 1.900 | 0.444 |
| 6-1 | 100% NBSK-1000 rev; 20 lb/t Varisoft GP-C | 26.45 | 33.43 | 2.560 | 0.76 | 1.68 | 1,911.295 | 1.778 | 0.334 |
| 7-1 | 100% NBSK-1000 rev; 40 lb/t Varisoft GP-C | 27.04 | 37.79 | 2.556 | 0.74 | 1.42 | 1,750.098 | 1.678 | 0.281 |
| 8-1 | 100% cmf; 0 lb/t Varisoft GP-C | 28.05 | 139.34 | 3.215 | 0.36 | 1.84 | 1,311.535 | 3.022 | 0.852 |
| 9-1 | 100% cmf; 10 lb/t Varisoft GP-C | 27.66 | 136.57 | 3.204 | 0.36 | 1.56 | 1,289.616 | 2.556 | 0.575 |
| 10-1 | 100% cmf; 20 lb/t Varisoft GP-C | 28.16 | 145.61 | 3.249 | 0.36 | 1.25 | 1,052.958 | 2.555 | 0.437 |
| 11-1 | 100% cmf; 40 lb/t Varisoft GP-C | 27.36 | 162.62 | 3.583 | 0.37 | 0.73 | 529.223 | 2.878 | 0.317 |
| 12-1 | 50% cmf/50% NBSK-0 rev; 0 lb/t Varisoft GP-C | 27.89 | 93.93 | 2.939 | 0.36 | 1.88 | 1,486.862 | 2.700 | 0.731 |
| 13-1 | 50% cmf/50% NBSK-0 rev; 10 lb/t Varisoft GP-C | 27.50 | 94.77 | 2.977 | 0.36 | 1.37 | 1,195.921 | 2.412 | 0.431 |
| 14-1 | 50% cmf/50% NBSK-0 rev; 20 lb/t Varisoft GP-C | 26.29 | 97.15 | 3.114 | 0.38 | 0.97 | 853.814 | 2.300 | 0.292 |
| 15-1 | 50% cmf/50% NBSK-0 rev; 20 lb/t Varisoft GP-C | 27.76 | 101.74 | 3.000 | 0.36 | 1.10 | 1,056.968 | 2.222 | 0.363 |
| 16-1 | 50% cmf/50% NBSK-0 rev; 10 lb/t Varisoft GP-C | 27.22 | 88.11 | 2.944 | 0.37 | 1.39 | 1,150.015 | 2.522 | 0.467 |
| 17-1 | 50% cmf/50% NBSK-0 rev; 20 lb/t Varisoft GP-C | 27.33 | 94.47 | 2.958 | 0.37 | 1.14 | 1,067.909 | 2.222 | 0.375 |
| 18-1 | 50% cmf/50% NBSK-1000 rev; 0 lb/t Varisoft GP-C | 27.43 | 85.17 | 2.802 | 0.36 | 2.27 | 1,506.162 | 3.156 | 1.096 |
| 19-1 | 50% cmf/50% NBSK-1000 rev; 10 lb/t Varisoft C | 26.65 | 87.73 | 2.831 | 0.38 | 1.63 | 1,197.047 | 2.778 | 0.587 |
| 20-1 | 50% cmf/50% NBSK -1000 rev; 20 lb/t Varisoft C | 28.07 | 97.20 | 2.921 | 0.36 | 1.26 | 1,051.156 | 2.592 | 0.480 |
| 21-1 | 50% cmf/50% NBSK-1000 rev; 40 lb/t Varisoft C | 27.98 | 104.01 | 3.012 | 0.36 | 0.86 | 816.405 | 2.256 | 0.266 |
| 22-1 | 50% cmf/50% NBSK-1000 rev; 20 lb/t Varisoft C | 26.86 | 87.65 | 2.796 | 0.37 | 2.22 | 1,400.670 | 3.267 | 1.042 |
| 23-1 | 50% cmf/50% NBSK-1000 rev; 10 lb/t Varisoft C | 27.07 | 87.78 | 2.841 | 0.37 | 1.75 | 1,396.741 | 2.614 | 0.626 |
| 24-1 | 50% cmf/50% NBSK-1000 rev; 20 lb/t Varisoft C | 27.49 | 95.53 | 2.833 | 0.36 | 1.35 | 1,296.112 | 2.200 | 0.417 |
| 25-1 | 50% cmf/50% NBSK-1000 rev; 40 lb/t Varisoft C | 26.58 | 100.22 | 2.994 | 0.38 | 1.02 | 937.210 | 2.211 | 0.312 |

| Sheet # | Description | Tensile HS 3 in. g/3 in. |
|---|---|---|
| 1-1 | 100% NBSK-0 rev; 0 lb/t Varisoft GP-C | 2,969.539 |
| 2-1 | 100% NBSK-0 rev; 10 lb/t Varisoft GP-C | 1,810.456 |
| 3-1 | 100% NBSK-0 rev; 20 lb/t Varisoft GP-C | 1,278.806 |
| 4-1 | 100% NBSK-1000 rev; 0 lb/t Varisoft GP-C | 6,992.244 |
| 5-1 | 100% NBSK-1000 rev; 10 lb/t Varisoft GP-C | 4,150.495 |
| 6-1 | 100% NBSK-1000 rev; 20 lb/t Varisoft GP-C | 3,387.215 |
| 7-1 | 100% NBSK-1000 rev; 40 lb/t Varisoft GP-C | 2,932.068 |

TABLE 6-continued

Handsheets with Debonder and Lyocell Microfiber

| | | |
|---|---|---|
| 8-1 | 100% cmf; 0 lb/t Varisoft GP-C | 3,944.432 |
| 9-1 | 100% cmf; 10 lb/t Varisoft GP-C | 3,292.803 |
| 10-1 | 100% cmf; 20 lb/t Varisoft GP-C | 2,684.076 |
| 11-1 | 100% cmf; 40 lb/t Varisoft GP-C | 1,521.815 |
| 12-1 | 50% cmf/50% NBSK-0 rev; 0 lb/t Varisoft GP-C | 3,993.424 |
| 13-1 | 50% cmf/50% NBSK-0 rev; 10 lb/t Varisoft GP-C | 2,867.809 |
| 14-1 | 50% cmf/50% NBSK-0 rev; 20 lb/t Varisoft GP-C | 1,947.234 |
| 15-1 | 50% cmf/50% NBSK-0 rev; 20 lb/t Varisoft GP-C | 2,335.337 |
| 16-1 | 50% cmf/50% NBSK-0 rev; 10 lb/t Varisoft GP-C | 2,890.722 |
| 17-1 | 50% cmf/50% NBSK-0 rev; 20 lb/t Varisoft GP-C | 2,372.417 |
| 18-1 | 50% cmf/50% NBSK-1000 rev; 0 lb/t Varisoft GP-C | 4,750.895 |
| 19-1 | 50% cmf/50% NBSK-1000 rev; 10 lb/t Varisoft C | 3,308.207 |
| 20-1 | 50% cmf/50% NBSK-1000 rev; 20 lb/t Varisoft C | 2,705.497 |
| 21-1 | 50% cmf/50% NBSK-1000 rev; 40 lb/t Varisoft C | 1,835.452 |
| 22-1 | 50% cmf/50% NBSK-1000 rev; 20 lb/t Varisoft C | 4,549.488 |
| 23-1 | 50% cmf/50% NBSK-1000 rev; 10 lb/t Varisoft C | 3,608.213 |
| 24-1 | 50% cmf/50% NBSK-1000 rev; 20 lb/t Varisoft C | 2,841.376 |
| 25-1 | 50% cmf/50% NBSK-1000 rev; 40 lb/t Varisoft C | 2,072.885 |

Examples 49 to 51

Figure 17:
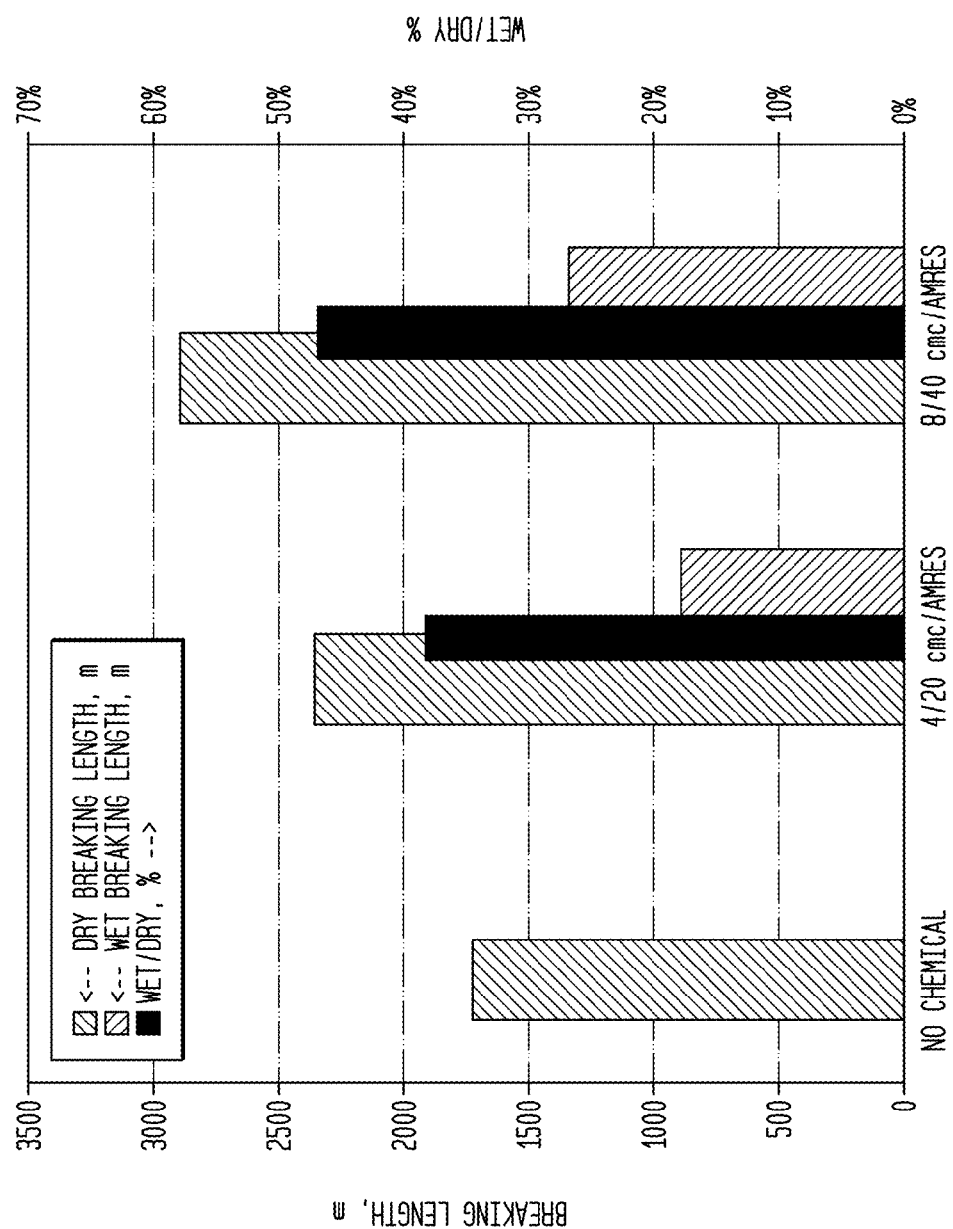
FIG. 17 is a histogram illustrating the effect of strength resins on breaking length and wet/dry ratio.

Following generally the same procedures, additional handsheets were made with 100% fibrillated lyocell with and without dry strength resin and wet strength resin. Details and results appear in Table 7 and FIG. 17.

It is seen from this data that conventional wet and dry strength resins can be used to make cellulosic sheet comparable in strength to conventional cellulosic sheet and that unusually high wet/dry ratios are achieved.

TABLE 7

100% Handsheets.xls

| Example | Description | Basis Weight lb/3000 ft$^2$ | Basis Weight Raw Wt g | Tensile MD g/3 in. | Stretch MD % | TEA MD mm-gm/mm$^2$ | Wet Tens Finch Cured-MD g/3 in. | Dry breaking length, m | Wet Breaking length, m | W/D |
|---|---|---|---|---|---|---|---|---|---|---|
| 49 | No chemical | 16.34 | 0.532 | 3493 | 2.8 | 0.678 | 18 | 1722 | 0 | 0.0% |
| 50 | 4/20 cmc/Amres ® | 17.37 | 0.565 | 5035 | 3.9 | 1.473 | 1,943 | 2335 | 901 | 38.6% |
| 51 | 8/40 cmc/Amres ® | 16.02 | 0.521 | 5738 | 4.8 | 2.164 | 2,694 | 2887 | 1355 | 46.9% |

The present invention also includes production methods, such as a method of making absorbent cellulosic sheet comprising (a) preparing an aqueous furnish with a fiber mixture including from about 25 percent to about 90 percent of a pulp-derived papermaking fiber, the fiber mixture also including from about 10 to about 75 percent by weight of regenerated cellulose microfibers having a CSF value of less than 175 ml, (b) depositing the aqueous furnish on a foraminous support to form a nascent web and at least partially dewatering the nascent web, and (c) drying the web to provide absorbent sheet. Typically, the aqueous furnish has a consistency of 2 percent or less, even more typically, the aqueous furnish has a consistency of 1 percent or less. The nascent web may be compactively dewatered with a papermaking felt and applied to a Yankee dryer and creped therefrom. Alternatively, the compactively dewatered web is applied to a rotating cylinder and fabric-creped therefrom or the nascent web is at least partially dewatered by through-drying or the nascent web is at least partially dewatered by impingement air drying. In many cases, fiber mixture includes softwood kraft and hardwood kraft.

Figure 18:
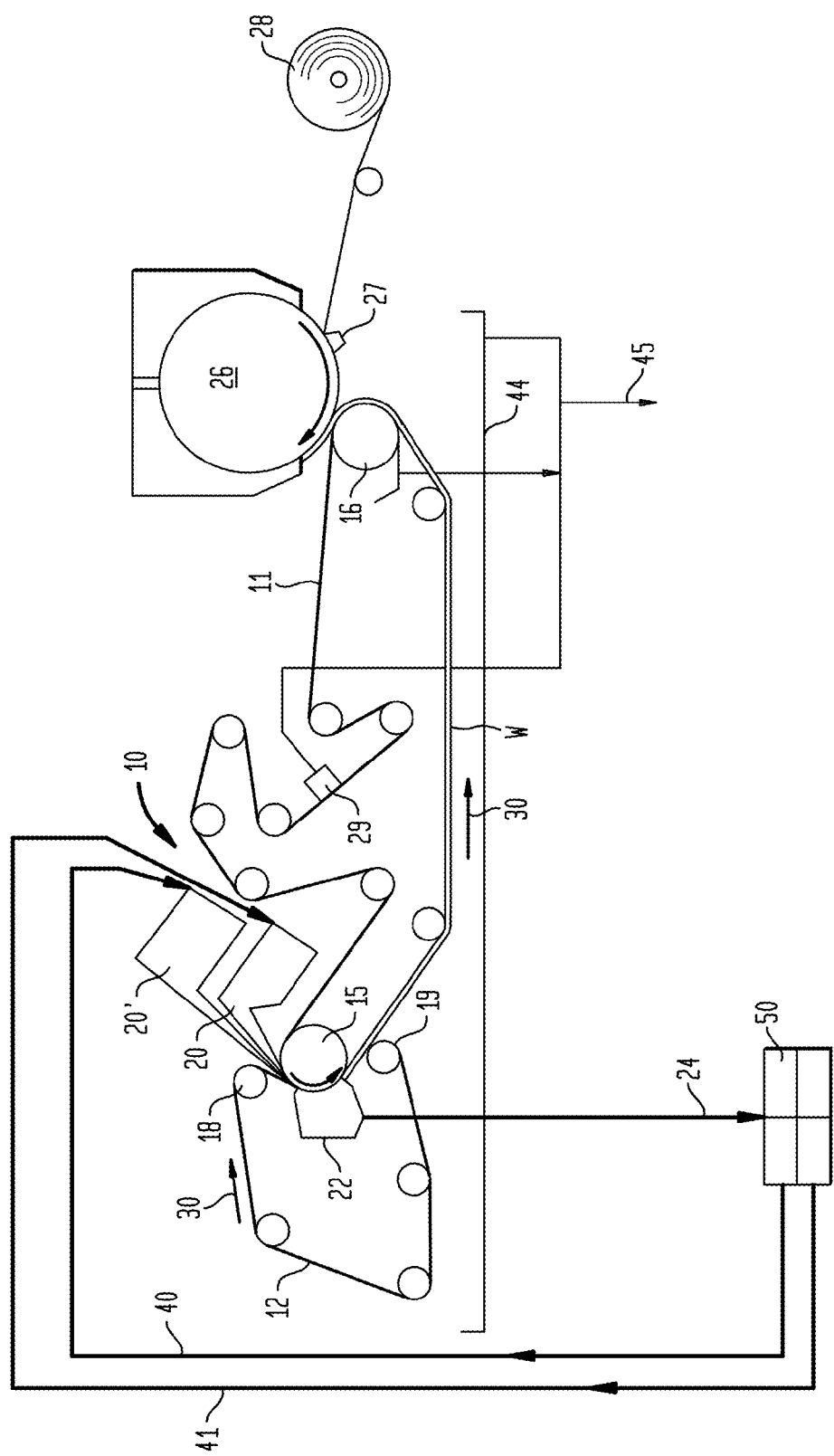
FIG. 18 is a schematic diagram of a wet-press paper machine that may be used in the practice of the present invention.

FIG. 18 illustrates one way of practicing the present invention in which a machine chest 50, which may be compartmentalized, is used for preparing furnishes that are treated with chemicals having different functionality depending on the character of the various fibers used. This embodiment shows a divided headbox thereby making it possible to produce a stratified product. The product according to the present invention can be made with single or multiple headboxes, 20, 20' and regardless of the number of headboxes may be stratified or unstratified. A layer may embody the sheet characteristics described herein in a multilayer structure wherein other strata do not. The treated furnish is transported through different conduits 40 and 41, where it is delivered to the headbox of a crescent forming machine 10 as is well known, although any convenient configuration can be used.

FIG. 18 shows a web-forming end or wet end with a liquid permeable foraminous support member 11, which may be of any convenient configuration. Foraminous support member 11 may be constructed of any of several known materials including photopolymer fabric, felt, fabric or a synthetic filament woven mesh base with a very fine synthetic fiber batt attached to the mesh base. The foraminous support member 11 is supported in a conventional manner on rolls, including breast roll 15 and pressing roll 16.

Forming fabric 12 is supported on rolls 18 and 19, which are positioned relative to the breast roll 15 for guiding the forming wire 12 to converge on the foraminous support member 11 at the cylindrical breast roll 15 at an acute angle relative to the foraminous support member 11. The foraminous support member 11 and the wire 12 move at the same speed and in the same direction, which is the direction of rotation of the breast roll 15. The forming wire 12 and the foraminous support member 11 converge at an upper surface of the forming roll 15 to form a wedge-shaped space or nip into which one or more jets of water or foamed liquid fiber dispersion may be injected and trapped between the forming wire 12 and the foraminous support member 11 to force fluid through the wire 12 into a save-all 22 where it is collected for re-use in the process (recycled via line 24).

The nascent web W formed in the process is carried along the machine direction 30 by the foraminous support member 11 to the pressing roll 16 where the wet nascent web W is transferred to the Yankee dryer 26. Fluid is pressed from the wet web W by pressing roll 16 as the web is transferred to the Yankee dryer 26 where it is dried and creped by means of a creping blade 27. The finished web is collected on a take-up roll 28.

A pit 44 is provided for collecting water squeezed from the furnish by the press roll 16, as well as collecting the water removed from the fabric by a Uhle box 29. The water collected in pit 44 may be collected into a flow line 45 for separate processing to remove surfactant and fibers from the water and to permit recycling of the water back to the papermaking machine 10.

Examples 51 to 59

Using a CWP apparatus of the class shown in FIG. 18, a series of absorbent sheets was made with softwood furnishes including refined lyocell fiber. The general approach was to prepare a kraft softwood/microfiber blend in a mixing tank and dilute the furnish to a consistency of less than 1% at the headbox. Tensile was adjusted with wet and dry strength resins.

Details and results appear in Table 8:

0029235), filed May 16, 2007, now U.S. Pat. No. 7,494,563, entitled "Fabric Creped Absorbent Sheet with Variable Local Basis Weight", U.S. patent application Ser. No. 11/678,669 (U.S. Patent Application Publication No. 2007/0204966), now U.S. Pat. No. 7,850,823, entitled "Method of Controlling Adhesive Build-Up on a Yankee Dryer", U.S. patent application Ser. No. 11/451,112 (U.S. Patent Application Publication No. 2006/0289133), filed Jun. 12, 2006, now U.S. Pat. No. 7,585,388, entitled "Fabric-Creped Sheet for Dispensers", U.S. patent application Ser. No. 11/451,111 (U.S. Patent Application Publication No. 2006/0289134), filed Jun. 12, 2006, now U.S. Pat. No. 7,585,389, entitled "Method of Making Fabric-creped Sheet for Dispensers", U.S. patent application Ser. No. 11/402,609 (U.S. Patent Application Publication No. 2006/0237154), filed Apr. 12, 2006, now U.S. Pat. No. 7,662,257, entitled "Multi-Ply Paper Towel With Absorbent Core", U.S. patent application Ser. No. 11/151,761 (U.S. Patent Application Publication No. 2005/0279471), filed Jun. 14, 2005, now U.S. Pat. No. 7,503,998, entitled "High Solids Fabric-crepe Process for Producing Absorbent Sheet with In-Fabric Drying", U.S. patent application Ser. No. 11/108,458 (U.S. Patent Application Publication No. 2005/0241787), filed Apr. 18, 2005, now U.S. Pat. No. 7,442,278, entitled "Fabric-Crepe and In Fabric Drying Process for Producing Absorbent Sheet", U.S. patent application Ser. No. 11/108,375 (U.S. Patent Application Publication No. 2005/0217814), filed Apr. 18, 2005, now U.S. Pat. No. 7,789,995, entitled "Fabric-crepe/Draw Process for Producing Absorbent Sheet", U.S. patent application Ser. No. 11/104,014 (U.S. Patent Application Publication No. 2005/0241786), filed Apr. 12, 2005, now U.S. Pat. No. 7,588,660, entitled "Wet-Pressed Tissue and Towel Products With Elevated CD Stretch and Low Tensile Ratios Made With a High Solids Fabric-Crepe Process", see also U.S. Pat. No. 7,399,378, issued Jul. 15, 2008, entitled

TABLE 8

CWP Creped Sheets

| CWP # | Percent Pulp | Percent Microfiber | Chemistry | Caliper 8 sheet mils/8 sht | Basis Weight lb/3000 ft$^2$ | Tensile MD g/3 in. | Stretch MD % | Tensile CD g/3 in. | Stretch CD % | Wet Tens Finch Cured-CD g/3 in. | Break Modulus CD gms/% | Break Modulus MD gms/% | SAT g/g | Void Volume Ratio cc/g |
|---|---|---|---|---|---|---|---|---|---|---|---|---|---|---|
| 12-1 | 100 | 0 | None | 29.6 | 9.6 | 686 | 23.9 | 500 | 5.4 | | 83 | 29 | 9.4 | 4.9 |
| 13-1 | 75 | 25 | None | 34.3 | 11.2 | 1405 | 31.6 | 1000 | 5.8 | | 178 | 44 | 6.8 | 4.5 |
| 14-1 | 50 | 50 | None | 37.8 | 10.8 | 1264 | 31.5 | 790 | 8.5 | | 94 | 40 | 7.9 | 5.3 |
| 15-1 | 50 | 50 | 4 lb/T cmc and 20 lb/T Amres ® | 31.4 | 11.0 | 1633 | 31.2 | 1093 | 9.1 | 396 | 122 | 53 | 6.6 | 4.2 |
| 16-1 | 75 | 25 | 4 lb/T cmc and 20 lb/T Amres ® | 30.9 | 10.8 | 1205 | 29.5 | 956 | 6.2 | 323 | 166 | 35 | 7.1 | 4.5 |
| 17-1 | 75 | 25 | 4 lb/T cmc and 20 lb/T Amres ® | 32.0 | 10.5 | 1452 | 32.6 | 1080 | 5.7 | 284 | 186 | 46 | 7.0 | 4.0 |
| 18-1 | 100 | 0 | 4 lb/T cmc and 20 lb/T Amres ® | 28.4 | 10.8 | 1931 | 28.5 | 1540 | 4.9 | 501 | 297 | 70 | 8.6 | 3.4 |
| 19-1 | 100 | 0 | 4 lb/T cmc and 20 lb/T Amres ® | 26.2 | 10.2 | 1742 | 27.6 | 1499 | 5.1 | 364 | 305 | 66 | 7.6 | 3.8 |

Instead of a conventional wet-press process, a wet-press, fabric creping process may be employed to make the inventive wipers. Preferred aspects of processes including fabric-creping are described in U.S. patent application Ser. No. 11/804,246 (U.S. Patent Application Publication No. 2008/ "Fabric-crepe Process for Making Absorbent Sheet", U.S. patent application Ser. No. 12/033,207 (U.S. Patent Application Publication No. 2008/0264589), filed Feb. 19, 2008, now U.S. Pat. No. 7,608,164, entitled "Fabric Crepe Process With Prolonged Production Cycle". The applications and patents referred to immediately above are particularly relevant to the selection of machinery, materials, processing conditions, and so forth, as to fabric creped products of the present invention and the disclosures of these applications are incorporated herein by reference.

Liquid Porosimetry

Liquid porosimetry is a procedure for determining the pore volume distribution (PVD) within a porous solid matrix. Each pore is sized according to its effective radius, and the contribution of each size to the total free volume is the principal objective of the analysis. The data reveals useful information about the structure of a porous network, including absorption and retention characteristics of a material.

Figure 19:
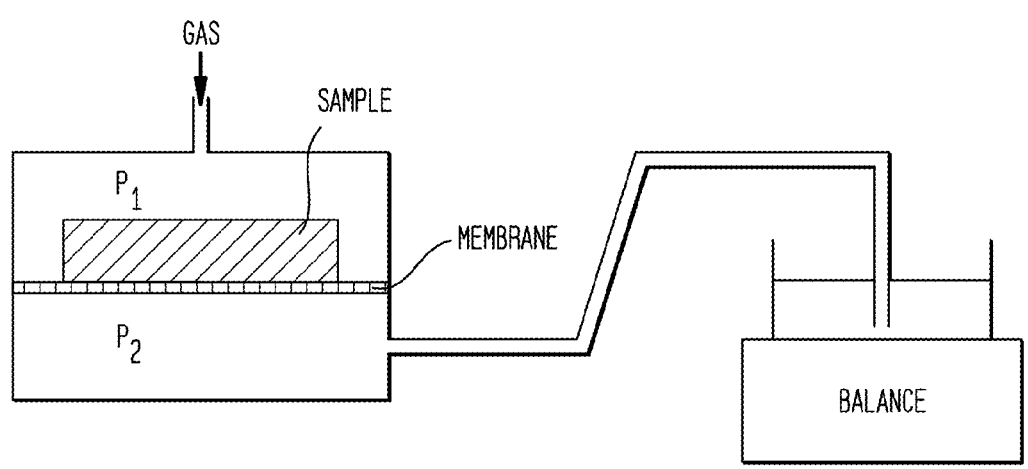
FIG. 19 is a schematic diagram of an extrusion porosimetry apparatus.

The procedure generally requires quantitative monitoring of the movement of liquid either into or out of a porous structure. The effective radius R of a pore is operationally defined by the Laplace equation:

$$R = \frac{2\gamma \cos\theta}{\Delta P}$$

where $\gamma$ is liquid surface tension, $\theta$ is advancing or receding contact angle of the liquid, and $\Delta P$ is pressure difference across the liquid/air meniscus. For liquid to enter or to drain from a pore, an external pressure must be applied that is just enough to overcome the Laplace $\Delta P$. Cos $\theta$ is negative when liquid must be forced in, cos $\theta$ is positive when it must be forced out. If the external pressure on a matrix having a range of pore sizes is changed, either continuously or in steps, filling or emptying will start with the largest pore and proceed in turn down to the smallest size that corresponds to the maximum applied pressure difference. Porosimetry involves recording the increment of liquid that enters or leaves with each pressure change and can be carried out in the extrusion mode, that is, liquid is forced out of the porous network rather than into it. The receding contact angle is the appropriate term in the Laplace relationship, and any stable liquid that has a known cos $\theta$, >0 can be used. If necessary, initial saturation with liquid can be accomplished by pre-evacuation of the dry material. The basic arrangement used for extrusion porosimetry measurements is illustrated in FIG. 19. The presaturated specimen is placed on a microporous membrane, which is itself supported by a rigid porous plate. The gas pressure within the chamber was increased in steps, causing liquid to flow out of some of the pores, largest ones first. The amount of liquid removed is monitored by the top-loading recording balance. In this way, each level of applied pressure (which determines the largest effective pore size that remains filled) is related to an increment of liquid mass. The chamber was pressurized by means of a computer-controlled, reversible, motor-driven piston/cylinder arrangement that can produce the required changes in pressure to cover a pore radius range from 1 to 1000 μm. Further details concerning the apparatus employed are seen in Miller et al., Liquid Porosimetry: New Methodology and Applications, J. of Colloid and Interface Sci., 162, 163 to 170 (1994) (TRI/Princeton), the disclosure of which is incorporated herein by reference. It will be appreciated by one of skill in the art that an effective Laplace radius, R, can be determined by any suitable technique, preferably, using an automated apparatus to record pressure and weight changes.

Utilizing the apparatus of FIG. 19 and water with 0.1% TX-100 wetting agent (surface tension 30 dyne/cm) as the absorbed/extruded liquid, the PVD of a variety of samples were measured by extrusion porosimetry in an uncompressed mode. Alternatively, the test can be conducted in an intrusion mode if so desired.

Sample A was a CWP basesheet prepared from 100% northern bleached softwood kraft (NBSK) fiber. Sample B was a like CWP sheet made with 25% regenerated cellulose microfiber and sample C was also a like CWP sheet made with 50% regenerated cellulose microfiber and 50% NBSK fiber. Details and results appear in Table 9 below, and in FIGS. 20, 21, and 22 for these samples. The pore radius intervals are indicated in columns 1 and 5 only for brevity.

TABLE 9

CWP Porosity Distribution

| Pore Radius, micron | Capillary Pressure, mmH2O | Cumul. Pore Volume Sample A, mm³/mg | Cumul. Pore Volume Sample A, % | Pore Radius, micron | Pore Volume Sample A, mm³/ (um * g) | Cumul. Pore Volume Sample B, mm³/mg | Cumul. Pore Volume Sample B, % | Pore Volume Sample B, mm³/ (um * g) | Cumul. Pore Volume Sample C, mm³/mg | Cumul. Pore Volume Sample C, % | Pore Volume Sample C, mm³/ (um * g) | Capillary Pressure, mmH₂O |
|---|---|---|---|---|---|---|---|---|---|---|---|---|
| 500 | 12 | 7.84 | 100 | 400 | 5.518 | 5.843 | 100 | 3.943 | 5.5 | 100 | 2.806 | 12.3 |
| 300 | 20 | 6.74 | 85.93 | 250 | 10.177 | 5.054 | 86.5 | 8.25 | 4.938 | 89.79 | 3.979 | 20.4 |
| 200 | 31 | 5.72 | 72.95 | 187.5 | 13.902 | 4.229 | 72.38 | 9.482 | 4.54 | 82.56 | 4.336 | 30.6 |
| 175 | 35 | 5.38 | 68.52 | 162.5 | 12.933 | 3.992 | 68.33 | 8.642 | 4.432 | 80.59 | 4.425 | 35 |
| 150 | 41 | 5.05 | 64.4 | 137.5 | 13.693 | 3.776 | 64.63 | 7.569 | 4.321 | 78.58 | 4.9 | 40.8 |
| 125 | 49 | 4.71 | 60.04 | 117.5 | 15.391 | 3.587 | 61.39 | 9.022 | 4.199 | 76.35 | 4.306 | 49 |
| 110 | 56 | 4.48 | 57.09 | 105 | 14.619 | 3.452 | 59.07 | 7.595 | 4.134 | 75.18 | 3.86 | 55.7 |
| 100 | 61 | 4.33 | 55.23 | 95 | 13.044 | 3.376 | 57.78 | 7.297 | 4.096 | 74.47 | 4.009 | 61.3 |
| 90 | 68 | 4.20 | 53.57 | 85 | 15.985 | 3.303 | 56.53 | 6.649 | 4.056 | 73.74 | 2.821 | 68.1 |
| 80 | 77 | 4.04 | 51.53 | 75 | 18.781 | 3.236 | 55.39 | 4.818 | 4.027 | 73.23 | 2.45 | 76.6 |
| 70 | 88 | 3.85 | 49.13 | 65 | 18.93 | 3.188 | 54.56 | 4.811 | 4.003 | 72.79 | 3.192 | 87.5 |
| 60 | 102 | 3.66 | 46.72 | 55 | 30.441 | 3.14 | 53.74 | 0.806 | 3.971 | 72.21 | 0.445 | 102.1 |
| 50 | 123 | 3.36 | 42.84 | 47.5 | 40.749 | 3.132 | 53.6 | 11.021 | 3.967 | 72.12 | 13.512 | 122.5 |
| 45 | 136 | 3.16 | 40.24 | 42.5 | 48.963 | 3.077 | 52.66 | 15.027 | 3.899 | 70.9 | 21.678 | 136.1 |
| 40 | 153 | 2.91 | 37.12 | 37.5 | 65.448 | 3.002 | 51.37 | 17.22 | 3.791 | 68.93 | 34.744 | 153.1 |
| 35 | 175 | 2.58 | 32.95 | 32.5 | 83.255 | 2.916 | 49.9 | 25.44 | 3.617 | 65.77 | 53.155 | 175 |
| 30 | 204 | 2.17 | 27.64 | 27.5 | 109.136 | 2.788 | 47.72 | 36.333 | 3.351 | 60.93 | 89.829 | 204.2 |
| 25 | 245 | 1.62 | 20.68 | 22.5 | 94.639 | 2.607 | 44.61 | 69.934 | 2.902 | 52.77 | 119.079 | 245 |
| 20 | 306 | 1.15 | 14.65 | 18.75 | 82.496 | 2.257 | 38.63 | 104.972 | 2.307 | 41.94 | 104.529 | 306.3 |
| 17.5 | 350 | 0.94 | 12.02 | 16.25 | 71.992 | 1.995 | 34.14 | 119.225 | 2.045 | 37.19 | 93.838 | 350 |
| 15 | 408 | 0.76 | 9.73 | 13.75 | 55.568 | 1.697 | 29.04 | 125.643 | 1.811 | 32.92 | 92.65 | 408.3 |
| 12.5 | 490 | 0.62 | 7.95 | 11.25 | 58.716 | 1.382 | 23.66 | 120.581 | 1.579 | 28.71 | 100.371 | 490 |

TABLE 9-continued

CWP Porosity Distribution

| Pore Radius, micron | Capillary Pressure, mmH2O | Cumul. Pore Volume Sample A, mm³/mg | Cumul. Pore Volume Sample A, % | Pore Radius, micron | Pore Volume Sample A, mm³/ (um * g) | Cumul. Pore Volume Sample B, mm³/mg | Cumul. Pore Volume Sample B, % | Pore Volume Sample B, mm³/ (um * g) | Cumul. Pore Volume Sample C, mm³/mg | Cumul. Pore Volume Sample C, % | Pore Volume Sample C, mm³/ (um * g) | Capillary Pressure, mmH₂O |
|---|---|---|---|---|---|---|---|---|---|---|---|---|
| 10 | 613 | 0.48 | 6.08 | 9.5 | 58.184 | 1.081 | 18.5 | 102.703 | 1.328 | 24.15 | 84.632 | 612.5 |
| 9 | 681 | 0.42 | 5.34 | 8.5 | 71.164 | 0.978 | 16.74 | 119.483 | 1.244 | 22.61 | 104.677 | 680.6 |
| 8 | 766 | 0.35 | 4.43 | 7.5 | 65.897 | 0.859 | 14.7 | 92.374 | 1.139 | 20.71 | 94.284 | 765.6 |
| 7 | 875 | 0.28 | 3.59 | 6.5 | 78.364 | 0.766 | 13.12 | 116.297 | 1.045 | 18.99 | 103.935 | 875 |
| 6 | 1021 | 0.20 | 2.6 | 5.5 | 93.96 | 0.65 | 11.13 | 157.999 | 0.941 | 17.1 | 83.148 | 1020.8 |
| 5 | 1225 | 0.11 | 1.4 | 4.5 | 21.624 | 0.492 | 8.42 | 91.458 | 0.857 | 15.59 | 97.996 | 1225 |
| 4 | 1531 | 0.09 | 1.12 | 3.5 | 23.385 | 0.401 | 6.86 | 120.222 | 0.759 | 13.81 | 198.218 | 1531.3 |
| 3 | 2042 | 0.07 | 0.82 | 2.5 | 64.584 | 0.28 | 4.8 | 176.691 | 0.561 | 10.21 | 311.062 | 2041.7 |
| 2 | 3063 | 0.00 | 0 | 1.5 | 12.446 | 0.104 | 1.78 | 103.775 | 0.25 | 4.55 | 250.185 | 3062.5 |
| 1 | 6125 | 0.01 | 0.16 | | | 0 | 0 | | 0 | 0 | | 6125 |
| | | | AVG 73.6 | | | | AVG 35.3 | | | AVG 23.7 | | |
| | | | | | Wicking ratio (Sample A/Sample B) | | 2.1 | (Sample A/Sample C) | | 3.1 | | |

Figure 20:
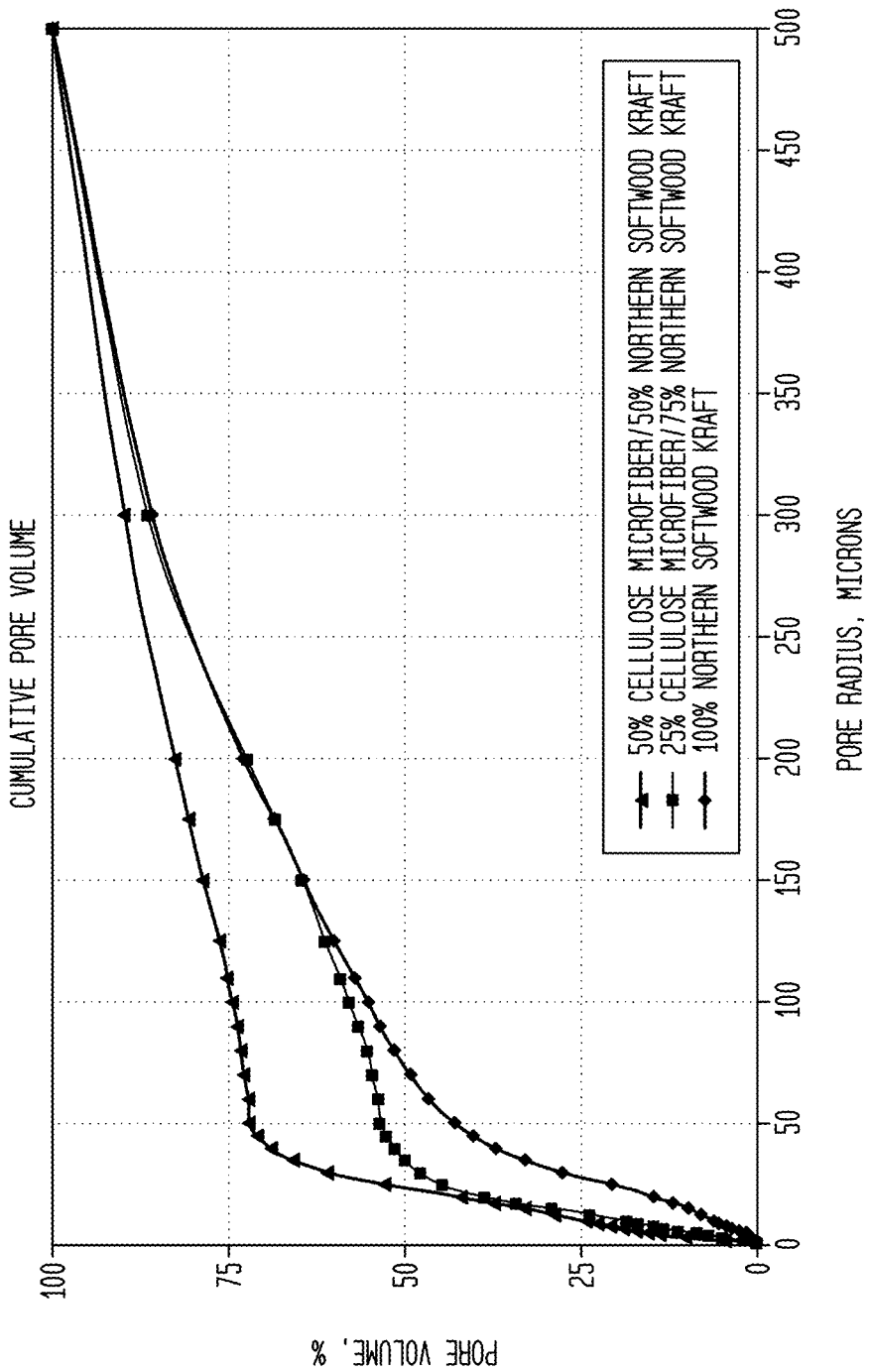
FIG. 20 is a plot of pore volume in percent versus pore radius in microns for various wipers.
Figure 21:
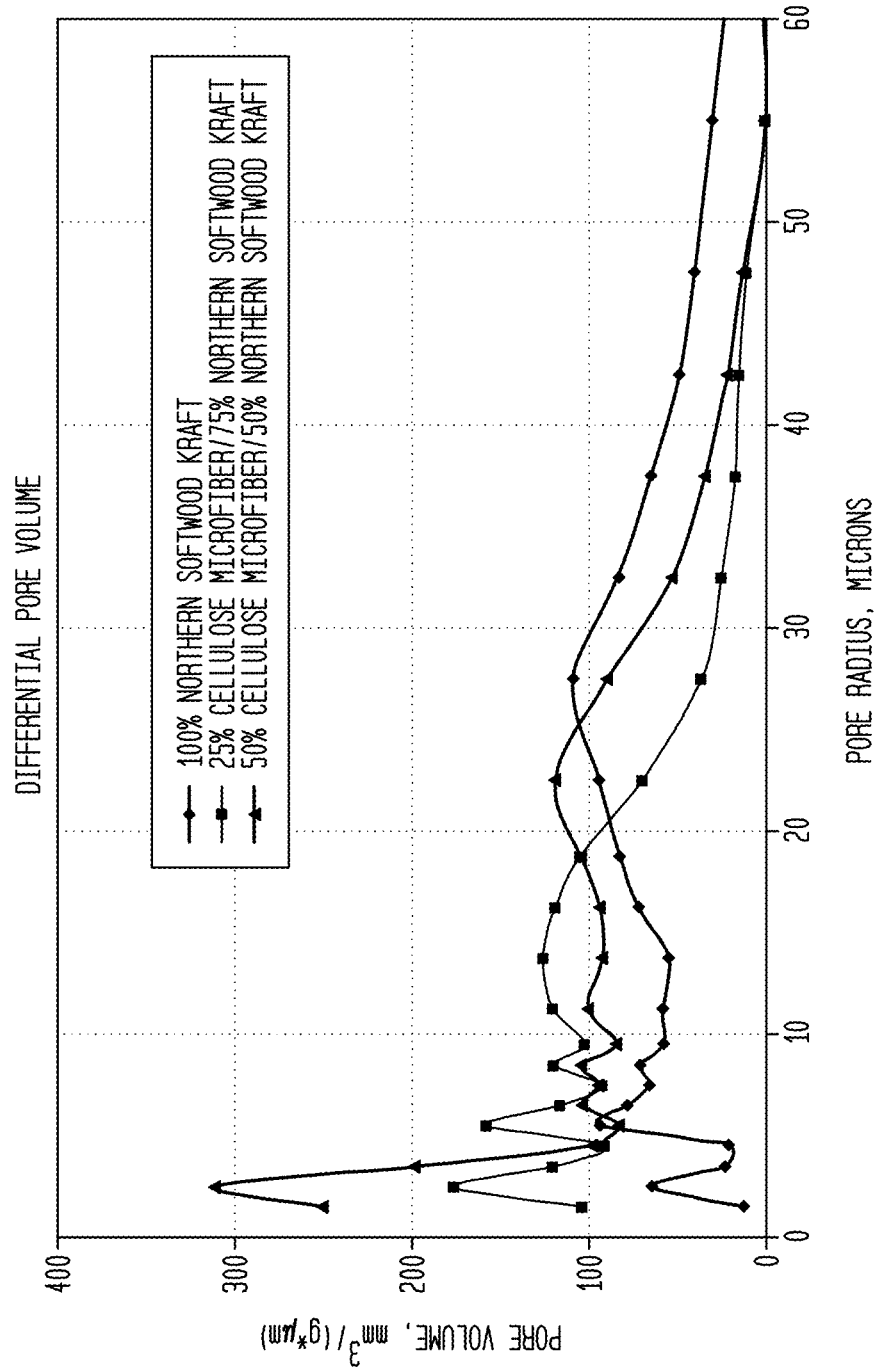
FIG. 21 is a plot of pore volume, $mm^3/(g*microns)$.
Figure 22:
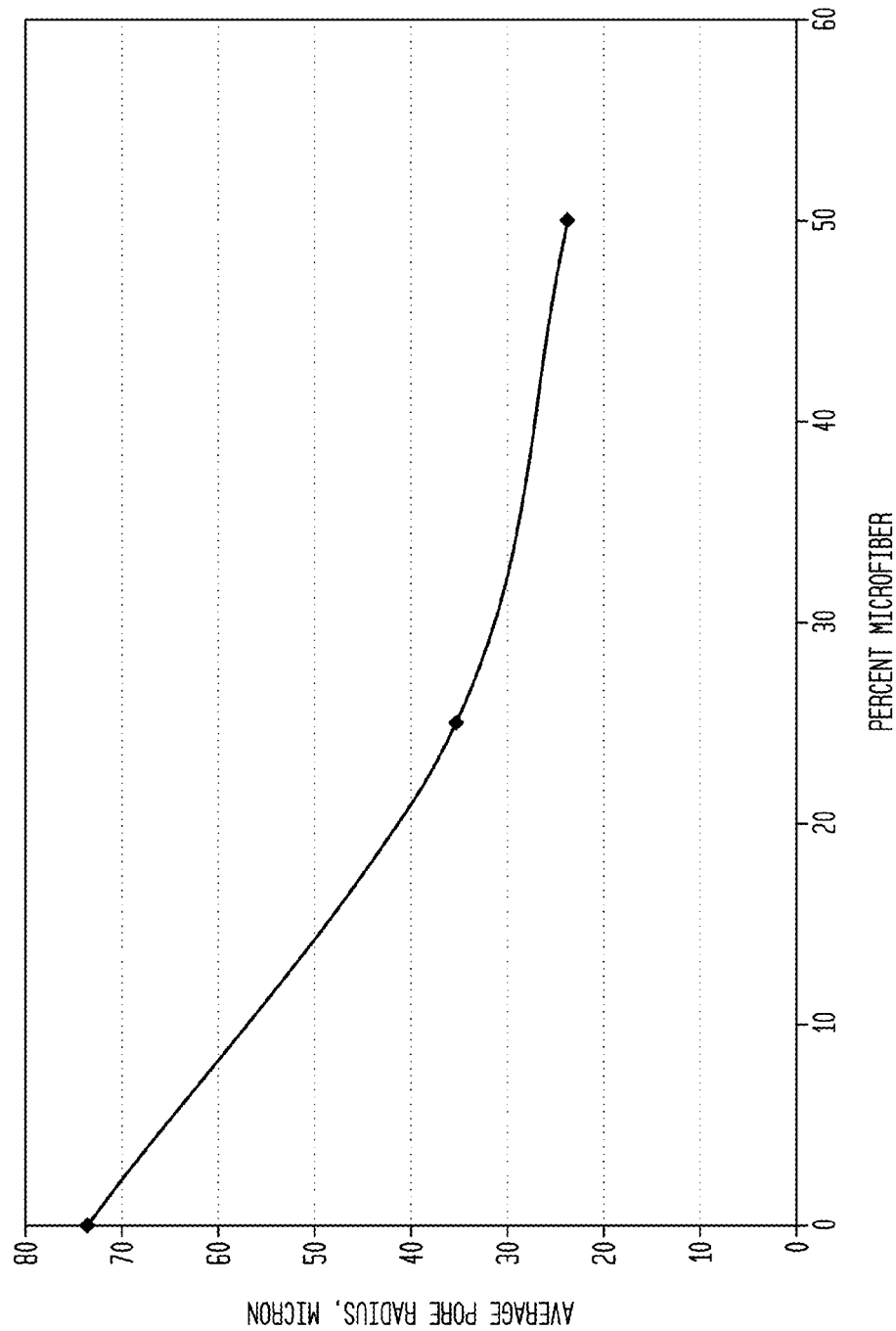
FIG. 22 is a plot of average pore radius in microns versus microfiber content for softwood kraft basesheets.

Table 9 and FIGS. 20 to 22 show that the 3 samples had an average or a median pore sizes of 74, 35, and 24 microns, respectively. Using the Laplace equation, the relative driving forces (Delta P) for 25% and 50% microfibers were 2 to 3 times greater than the control: (74/35=2), (74/24=3). The Bendtsen smoothness data (discussed below) imply more intimate contact with the surface, while the higher driving force from the smaller pores indicates greater ability to pick up small droplets remaining on the surface. An advantage that cellulose has over other polymeric surfaces such as nylon, polyester, and polyolefins is the higher surface energy of cellulose that attracts and wicks liquid residue away from lower energy surfaces such as glass, metals, and so forth.

For purposes of convenience, we refer to the relative wicking ratio of a microfiber containing sheet as the ratio of the average pore effective sizes of a like sheet without microfibers to a sheet containing microfibers. Thus, the Sample B and the Sample C sheets had relative wicking ratios of approximately 2 and 3 as compared with the control Sample A. While the wicking ratio readily differentiates single ply CWP sheet made with cmf from a single ply sheet made with NBSK alone, perhaps more universal indicators of differences achieved with cmf fiber are high differential pore volumes at small pore radius (less than 10 to 15 microns), as well as high capillary pressures at low saturation, as is seen with two-ply wipers and handsheets.

Following generally the procedures noted above, a series of two-ply CWP sheets was prepared and tested for porosity. Sample D was a control, prepared with NBSK fiber and without cmf, Sample E was a two-ply sheet with 75% by weight NBSK fiber and 25% by weight cmf and Sample F was a two-ply sheet with 50% by weight NBSK fiber and 50% by weight cmf. Results appear in Table 10 and are presented graphically in FIG. 23.

TABLE 10

Two-Ply Sheet Porosity Data

| Pore Radius, micron | Capillary Pressure, mmH₂O | Cumulative (Cumul.) Pore Volume Sample D, mm³/mg | Cumul. Pore Volume Sample D, % | Pore Radius, micron | Pore Volume Sample D, mm³/ (um * g) | Cumul. Pore Volume Sample E, mm³/mg | Cumul. Pore Volume Sample E, % | Pore Volume Sample E, mm³/ (um * g) | Cumul. Pore Volume Sample F, mm³/mg | Cumul. Pore Volume Sample F, % | Pore Volume Sample F, mm/(um * g) |
|---|---|---|---|---|---|---|---|---|---|---|---|
| 500 | 12 | 11.700 | 100.0 | 400.0 | 12.424 | 11.238 | 100.0 | 14.284 | 13.103 | 100.0 | 12.982 |
| 300 | 20 | 9.216 | 78.8 | 250.0 | 8.925 | 8.381 | 74.6 | 9.509 | 10.507 | 80.2 | 14.169 |
| 200 | 31 | 8.323 | 71.1 | 187.5 | 11.348 | 7.430 | 66.1 | 12.618 | 9.090 | 69.4 | 23.661 |
| 175 | 35 | 8.039 | 68.7 | 162.5 | 14.277 | 7.115 | 63.3 | 12.712 | 8.498 | 64.9 | 27.530 |
| 150 | 41 | 7.683 | 65.7 | 137.5 | 15.882 | 6.797 | 60.5 | 14.177 | 7.810 | 59.6 | 23.595 |
| 125 | 49 | 7.285 | 62.3 | 117.5 | 20.162 | 6.443 | 57.3 | 18.255 | 7.220 | 55.1 | 47.483 |
| 110 | 56 | 6.983 | 59.7 | 105.0 | 22.837 | 6.169 | 54.9 | 18.097 | 6.508 | 49.7 | 34.959 |
| 100 | 61 | 6.755 | 57.7 | 95.0 | 26.375 | 5.988 | 53.3 | 24.786 | 6.158 | 47.0 | 35.689 |
| 90 | 68 | 6.491 | 55.5 | 85.0 | 36.970 | 5.740 | 51.1 | 29.910 | 5.801 | 44.3 | 41.290 |
| 80 | 77 | 6.121 | 52.3 | 75.0 | 57.163 | 5.441 | 48.4 | 33.283 | 5.389 | 41.1 | 50.305 |
| 70 | 88 | 5.550 | 47.4 | 65.0 | 88.817 | 5.108 | 45.5 | 45.327 | 4.885 | 37.3 | 70.417 |
| 60 | 102 | 4.661 | 39.8 | 55.0 | 87.965 | 4.655 | 41.4 | 55.496 | 4.181 | 31.9 | 64.844 |
| 50 | 123 | 3.782 | 32.3 | 47.5 | 93.089 | 4.100 | 36.5 | 69.973 | 3.533 | 27.0 | 57.847 |
| 45 | 136 | 3.316 | 28.3 | 42.5 | 90.684 | 3.750 | 33.4 | 73.408 | 3.244 | 24.8 | 70.549 |
| 40 | 153 | 2.863 | 24.5 | 37.5 | 71.681 | 3.383 | 30.1 | 60.294 | 2.891 | 22.1 | 61.640 |
| 35 | 175 | 2.504 | 21.4 | 32.5 | 69.949 | 3.081 | 27.4 | 64.984 | 2.583 | 19.7 | 60.308 |
| 30 | 204 | 2.155 | 18.4 | 27.5 | 76.827 | 2.756 | 24.5 | 90.473 | 2.281 | 17.4 | 62.847 |
| 25 | 245 | 1.771 | 15.1 | 22.5 | 85.277 | 2.304 | 20.5 | 119.637 | 1.967 | 15.0 | 57.132 |
| 20 | 306 | 1.344 | 11.5 | 18.8 | 83.511 | 1.706 | 15.2 | 110.051 | 1.681 | 12.8 | 56.795 |
| 17.5 | 350 | 1.135 | 9.7 | 16.3 | 83.947 | 1.431 | 12.7 | 89.091 | 1.539 | 11.8 | 62.253 |
| 15 | 408 | 0.926 | 7.9 | 13.8 | 73.671 | 1.208 | 10.8 | 63.423 | 1.384 | 10.6 | 62.246 |

TABLE 10-continued

Two-Ply Sheet Porosity Data

| Pore Radius, micron | Capillary Pressure, mmH$_2$O | Cumulative (Cumul.) Pore Volume Sample D, mm$^3$/mg | Cumul. Pore Volume Sample D, % | Pore Radius, micron | Pore Volume Sample D, mm$^3$/(um * g) | Cumul. Pore Volume Sample E, mm$^3$/mg | Cumul. Pore Volume Sample E, % | Pore Volume Sample E, mm$^3$/(um * g) | Cumul. Pore Volume Sample F, mm$^3$/mg | Cumul. Pore Volume Sample F, % | Pore Volume Sample F, mm/(um * g) |
|---|---|---|---|---|---|---|---|---|---|---|---|
| 12.5 | 490 | 0.741 | 6.3 | 11.3 | 72.491 | 1.049 | 9.3 | 59.424 | 1.228 | 9.4 | 65.881 |
| 10 | 613 | 0.560 | 4.8 | 9.5 | 74.455 | 0.901 | 8.0 | 63.786 | 1.063 | 8.1 | 61.996 |
| 9 | 681 | 0.486 | 4.2 | 8.5 | 68.267 | 0.837 | 7.5 | 66.147 | 1.001 | 7.6 | 69.368 |
| 8 | 766 | 0.417 | 3.6 | 7.5 | 66.399 | 0.771 | 6.9 | 73.443 | 0.932 | 7.1 | 70.425 |
| 7 | 875 | 0.351 | 3.0 | 6.5 | 64.570 | 0.698 | 6.2 | 82.791 | 0.861 | 6.6 | 79.545 |
| 6 | 1021 | 0.286 | 2.5 | 5.5 | 66.017 | 0.615 | 5.5 | 104.259 | 0.782 | 6.0 | 100.239 |
| 5 | 1225 | 0.220 | 1.9 | 4.5 | 70.058 | 0.510 | 4.5 | 119.491 | 0.682 | 5.2 | 122.674 |
| 4 | 1531 | 0.150 | 1.3 | 3.5 | 74.083 | 0.391 | 3.5 | 142.779 | 0.559 | 4.3 | 170.707 |
| 3 | 2042 | 0.076 | 0.7 | 2.5 | 63.471 | 0.248 | 2.2 | 150.017 | 0.388 | 3.0 | 220.828 |
| 2 | 3063 | 0.013 | 0.1 | 1.5 | 12.850 | 0.098 | 0.9 | 98.197 | 0.167 | 1.3 | 167.499 |
| 1 | 6125 | 0.000 | 0.0 | | | 0.000 | 0.0 | | 0.000 | 0.0 | |

Figure 23:
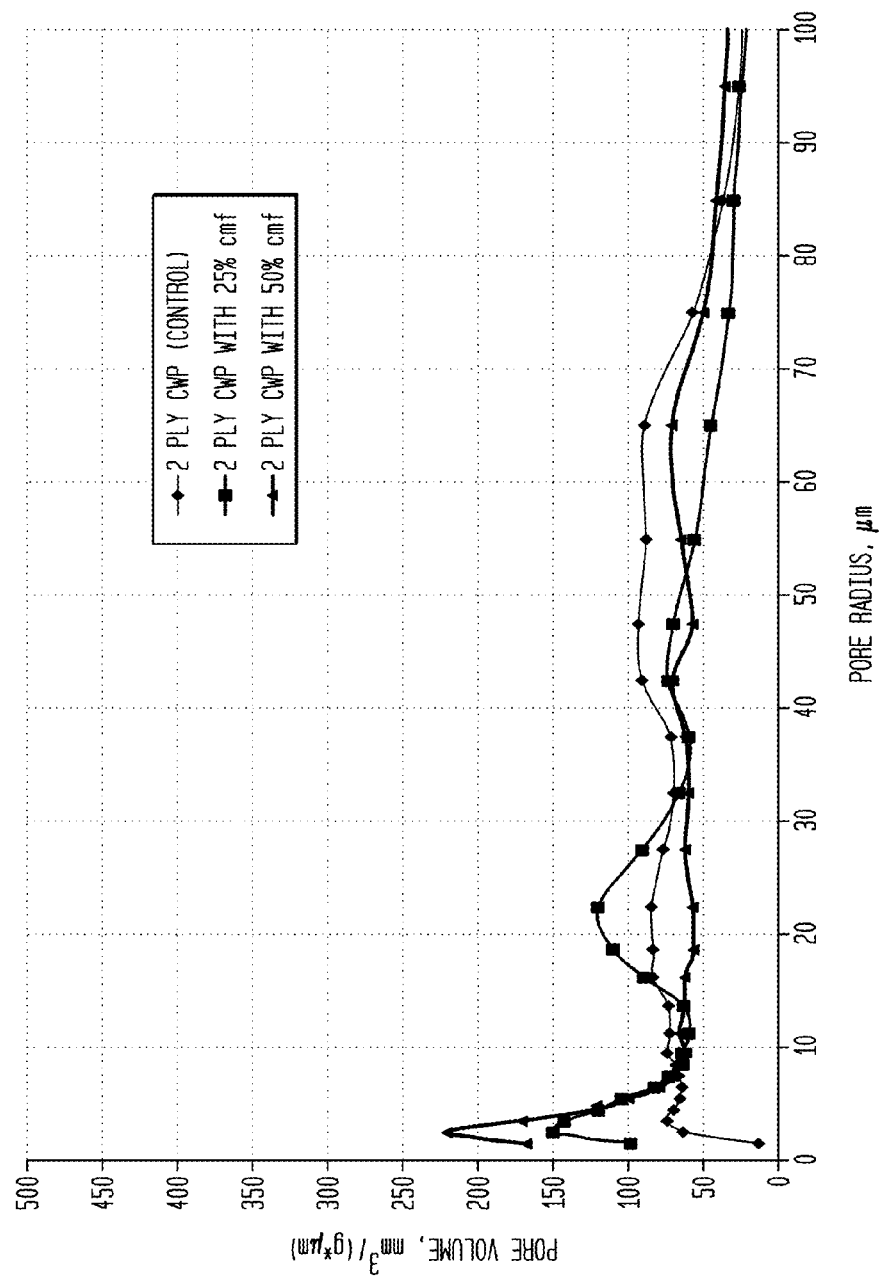
FIG. 23 is a plot of pore volume versus pore radius for wipers with and without cellulose microfiber.

Table 10 and FIG. 23 show that the two-ply sheet structure somewhat masks the pore structure of individual sheets. Thus, for purposes of calculating wicking ratio, single plies should be used.

The porosity data for the cmf containing two-ply sheet is nevertheless unique in that a relatively large fraction of the pore volume is at smaller radii pores, below about 15 microns. Similar behavior is seen in handsheets, discussed below.

Figure 24:
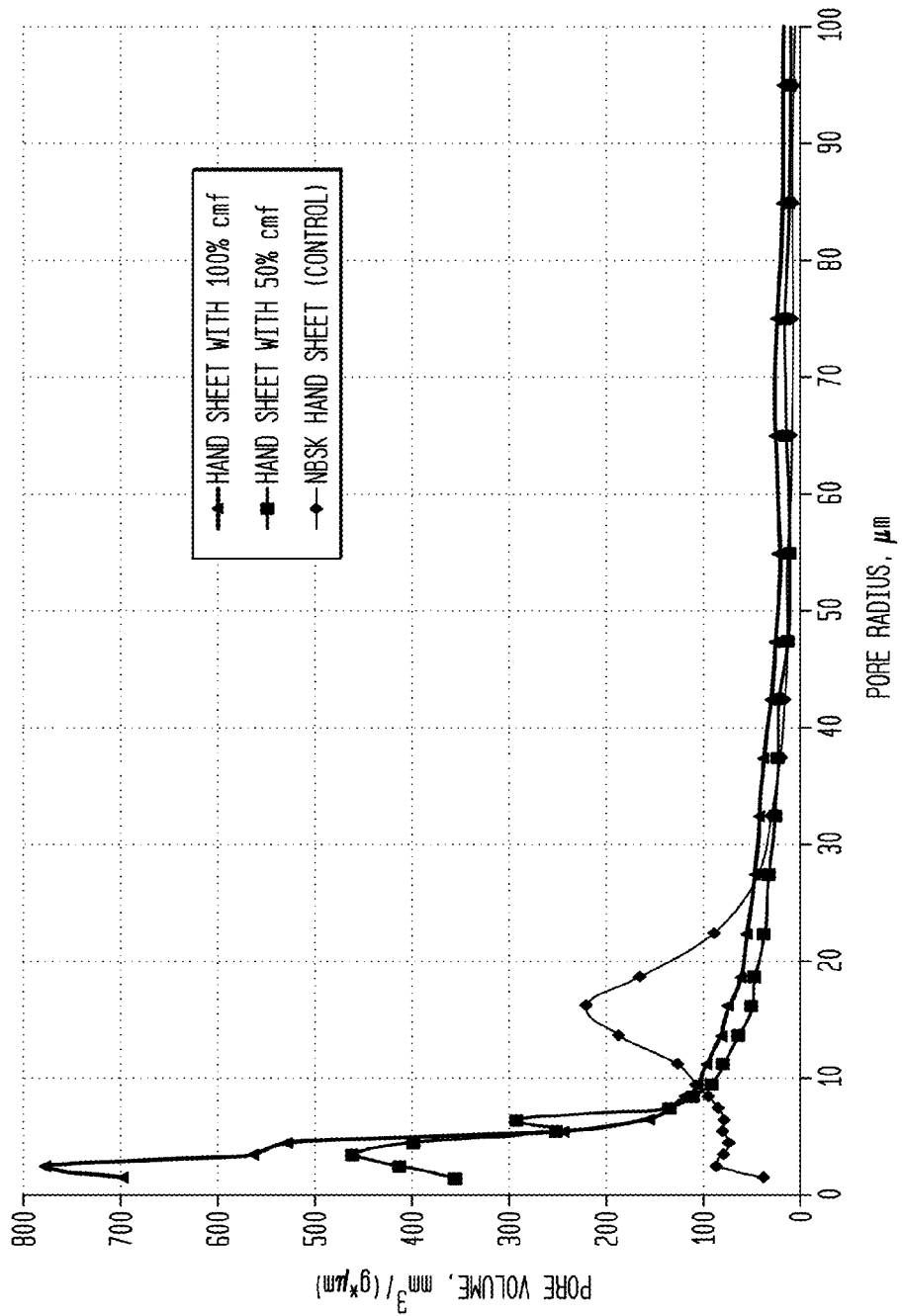
FIG. 24 is another plot of pore volume versus pore radius for handsheet with and without cellulose microfiber.
Figure 25:
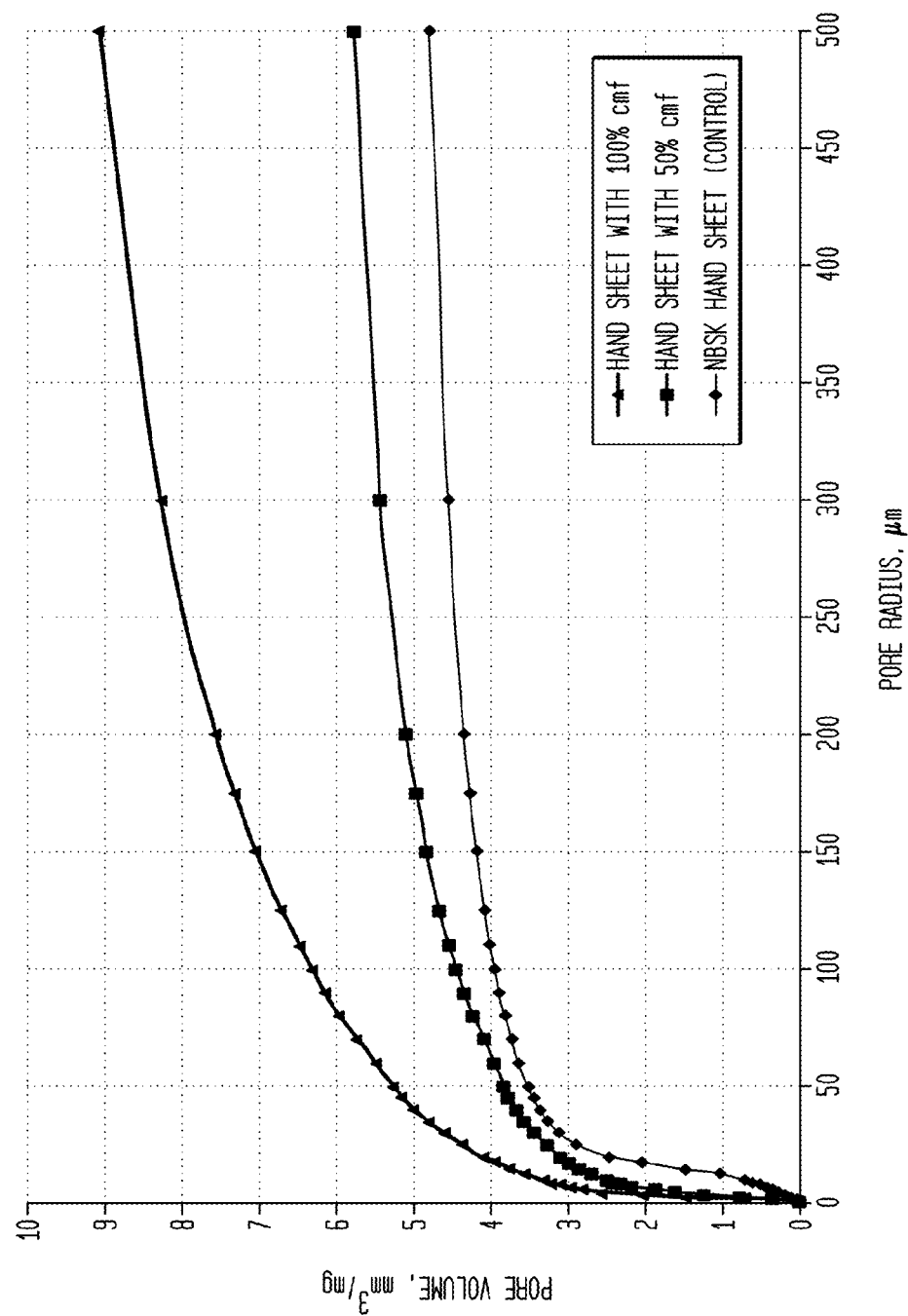
FIG. 25 is a plot of cumulative pore volume versus pore radius for handsheet with and without cellulose microfiber.

Following the procedures noted above, handsheets were prepared and tested for porosity. Sample G was a NBSK handsheet without cmf, Sample J was 100% cmf fiber handsheet and sample K was a handsheet with 50% cmf fiber and 50% NBSK Results appear in Table 11 and FIGS. 24 and 25.

TABLE 11

Handsheet Porosity Data

| Pore Radius, micron | Capillary Pressure, mmH$_2$O | Cumulative (Cumul.) Pore Volume Sample G, mm$^3$/mg | Cumul. Pore Volume Sample G, % | Pore Radius, micron | Pore Volume Sample G, mm$^3$/(um * g) | Cumul. Pore Volume Sample J, mm$^3$/mg | Cumul. Pore Volume Sample J, % | Pore Volume Sample J, mm$^3$/(um * g) | Cumul. Pore Volume Sample K, mm$^3$/mg | Cumul. Pore Volume Sample K, % | Pore Volume Sample K, mm$^3$/(um * g) |
|---|---|---|---|---|---|---|---|---|---|---|---|
| 500 | 12.3 | 4.806 | 100.0 | 400.0 | 1.244 | 9.063 | 100.0 | 3.963 | 5.769 | 100.0 | 1.644 |
| 300 | 20.4 | 4.557 | 94.8 | 250.0 | 2.149 | 8.271 | 91.3 | 7.112 | 5.440 | 94.3 | 3.365 |
| 200 | 30.6 | 4.342 | 90.4 | 187.5 | 2.990 | 7.560 | 83.4 | 9.927 | 5.104 | 88.5 | 5.247 |
| 175 | 35 | 4.267 | 88.8 | 162.5 | 3.329 | 7.311 | 80.7 | 10.745 | 4.972 | 86.2 | 5.543 |
| 150 | 40.8 | 4.184 | 87.1 | 137.5 | 3.989 | 7.043 | 77.7 | 13.152 | 4.834 | 83.8 | 6.786 |
| 125 | 49 | 4.084 | 85.0 | 117.5 | 4.788 | 6.714 | 74.1 | 15.403 | 4.664 | 80.9 | 8.428 |
| 110 | 55.7 | 4.013 | 83.5 | 105.0 | 5.734 | 6.483 | 71.5 | 16.171 | 4.538 | 78.7 | 8.872 |
| 100 | 61.3 | 3.955 | 82.3 | 95.0 | 6.002 | 6.321 | 69.8 | 17.132 | 4.449 | 77.1 | 9.934 |
| 90 | 68.1 | 3.895 | 81.1 | 85.0 | 8.209 | 6.150 | 67.9 | 17.962 | 4.350 | 75.4 | 11.115 |
| 80 | 76.6 | 3.813 | 79.4 | 75.0 | 7.867 | 5.970 | 65.9 | 23.652 | 4.239 | 73.5 | 15.513 |
| 70 | 87.5 | 3.734 | 77.7 | 65.0 | 8.950 | 5.734 | 63.3 | 25.565 | 4.083 | 70.8 | 13.651 |
| 60 | 102.1 | 3.645 | 75.9 | 55.0 | 13.467 | 5.478 | 60.4 | 20.766 | 3.947 | 68.4 | 10.879 |
| 50 | 122.5 | 3.510 | 73.0 | 47.5 | 12.794 | 5.270 | 58.2 | 25.071 | 3.838 | 66.5 | 11.531 |
| 45 | 136.1 | 3.446 | 71.7 | 42.5 | 16.493 | 5.145 | 56.8 | 29.581 | 3.780 | 65.5 | 21.451 |
| 40 | 153.1 | 3.364 | 70.0 | 37.5 | 19.455 | 4.997 | 55.1 | 37.527 | 3.673 | 63.7 | 22.625 |
| 35 | 175 | 3.267 | 68.0 | 32.5 | 28.923 | 4.810 | 53.1 | 41.024 | 3.560 | 61.7 | 24.854 |
| 30 | 204.2 | 3.122 | 65.0 | 27.5 | 42.805 | 4.604 | 50.8 | 46.465 | 3.436 | 59.6 | 32.211 |
| 25 | 245 | 2.908 | 60.5 | 22.5 | 88.475 | 4.372 | 48.2 | 54.653 | 3.275 | 56.8 | 35.890 |
| 20 | 306.3 | 2.465 | 51.3 | 18.8 | 164.807 | 4.099 | 45.2 | 61.167 | 3.095 | 53.7 | 47.293 |
| 17.5 | 350 | 2.053 | 42.7 | 16.3 | 220.019 | 3.946 | 43.5 | 73.384 | 2.977 | 51.6 | 48.704 |
| 15 | 408.3 | 1.503 | 31.3 | 13.8 | 186.247 | 3.762 | 41.5 | 81.228 | 2.855 | 49.5 | 62.101 |
| 12.5 | 490 | 1.038 | 21.6 | 11.3 | 126.594 | 3.559 | 39.3 | 95.602 | 2.700 | 46.8 | 78.623 |
| 10 | 612.5 | 0.721 | 15.0 | 9.5 | 108.191 | 3.320 | 36.6 | 104.879 | 2.504 | 43.4 | 91.098 |
| 9 | 680.6 | 0.613 | 12.8 | 8.5 | 94.149 | 3.215 | 35.5 | 118.249 | 2.412 | 41.8 | 109.536 |
| 8 | 765.6 | 0.519 | 10.8 | 7.5 | 84.641 | 3.097 | 34.2 | 132.854 | 2.303 | 39.9 | 136.247 |
| 7 | 875 | 0.434 | 9.0 | 6.5 | 78.563 | 2.964 | 32.7 | 155.441 | 2.167 | 37.6 | 291.539 |
| 6 | 1020.8 | 0.356 | 7.4 | 5.5 | 79.416 | 2.809 | 31.0 | 242.823 | 1.875 | 32.5 | 250.346 |
| 5 | 1225 | 0.276 | 5.8 | 4.5 | 73.712 | 2.566 | 28.3 | 529.000 | 1.625 | 28.2 | 397.926 |
| 4 | 1531.3 | 0.203 | 4.2 | 3.5 | 78.563 | 2.037 | 22.5 | 562.411 | 1.227 | 21.3 | 459.953 |
| 3 | 2041.7 | 0.124 | 2.6 | 2.5 | 86.401 | 1.475 | 16.3 | 777.243 | 0.767 | 13.3 | 411.856 |
| 2 | 3062.5 | 0.038 | 0.8 | 1.5 | 37.683 | 0.697 | 7.7 | 697.454 | 0.355 | 6.2 | 355.034 |
| 1 | 6125 | 0.000 | 0.0 | | | 0.000 | 0.0 | | 0.000 | 0.0 | |

Here, again, it is seen that the sheets containing cmf had significantly more relative pore volume at small pore radii. The cmf-containing two-ply sheet had twice as much relative pore volume below 10 to 15 microns than the NBSK sheet; while the cmf and cmf-containing handsheets had 3 to 4 times the relative pore volume below about 10 to 15 microns than the handsheet without cmf.

Figure 26:
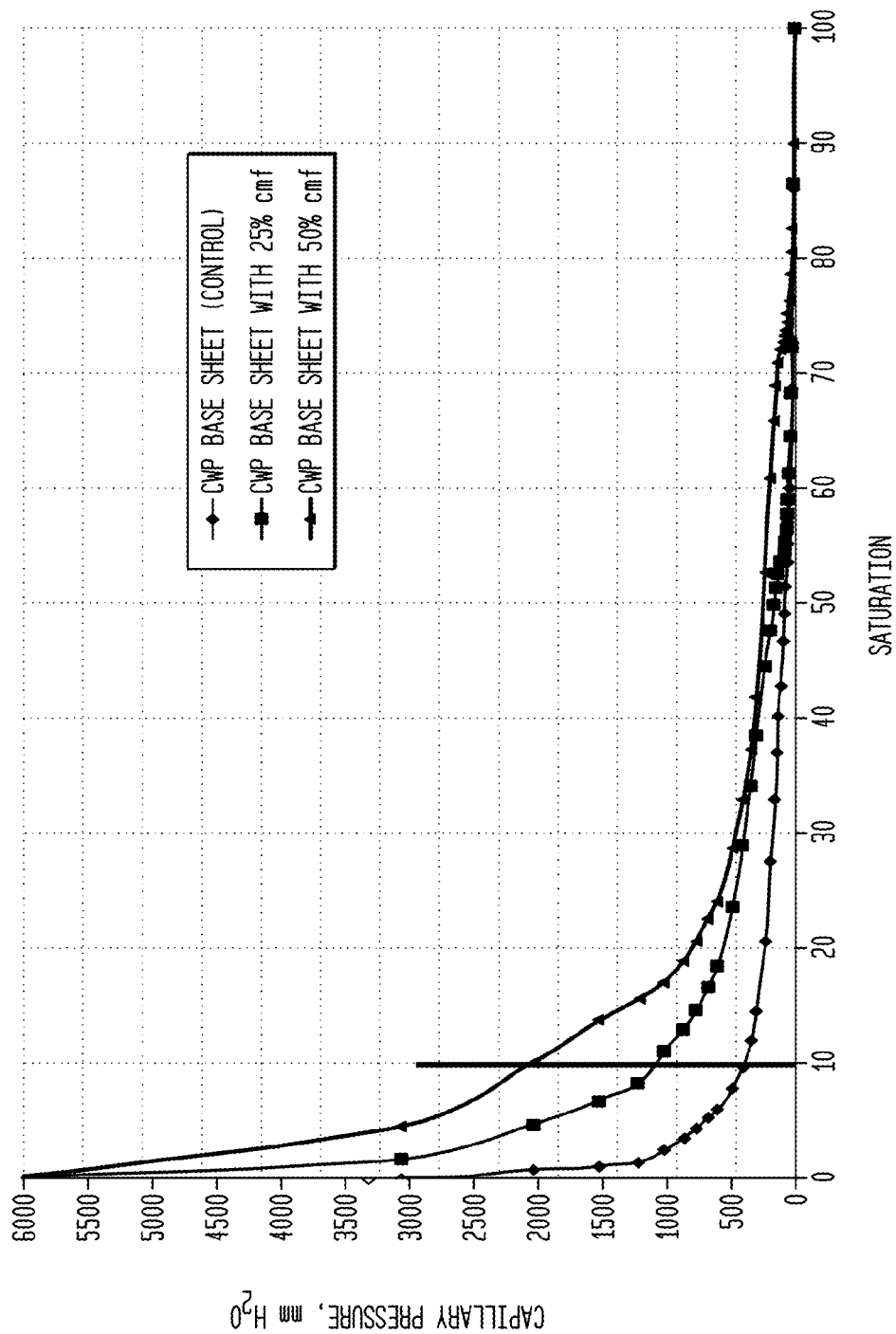
FIG. 26 is a plot of capillary pressure versus saturation for wipers with and without cellulose microfiber.

FIG. 26 is a plot of capillary pressure versus saturation (cumulative pore volume) for CWP sheets with and without cmf. Here, it is seen that sheets with cellulose microfiber exhibit up to 5 times the capillary pressure at low saturation due to the large fraction of small pores.

Bendtsen Testing (1) Bendtsen Roughness and Relative Bendtsen Smoothness

The addition of regenerated cellulose microfibers to a papermaking furnish of conventional papermaking fibers provides remarkable smoothness to the surface of a sheet, a highly desirable feature in a wiper, since this property promotes good surface-to-surface contact between the wiper and a substrate to be cleaned.

Bendtsen Roughness is one method by which to characterize the surface of a sheet. Generally, Bendtsen Roughness is measured by clamping the test piece between a flat glass plate and a circular metal land and measuring the rate of airflow between the paper and the land, the air being supplied at a nominal pressure of 1.47 kPa. The measuring land has an internal diameter of 31.5 mm±0.2 mm. and a width of 150 µm±2 µm. The pressure exerted on the test piece by the land is either 1 kg pressure or 5 kg pressure. A Bendtsen smoothness and porosity tester (9 code SE 114), equipped with an air compressor, 1 kg test head, 4 kg weight and clean glass plate was obtained from L&W USA, Inc., 10 Madison Road, Fairfield, N.J. 07004, and used in the tests that are described below. Tests were conducted in accordance with ISO Test Method 8791-2 (1990), the disclosure of which is incorporated herein by reference.

Bendtsen Smoothness relative to a sheet without microfiber is calculated by dividing the Bendtsen Roughness of a sheet without microfiber by the Bendtsen Roughness of a like sheet with microfiber. Either like sides or both sides of the sheets may be used to calculate relative smoothness, depending upon the nature of the sheet. If both sides are used, it is referred to as an average value.

A series of handsheets was prepared with varying amounts of cmf and the conventional papermaking fibers listed in Table 12. The handsheets were prepared wherein one surface was plated and the other surface was exposed during the air-drying process. Both sides were tested for Bendtsen Roughness at 1 kg pressure and 5 kg pressure as noted above. Table 12 presents the average values of Bendtsen Roughness at 1 kg pressure and 5 kg pressure, as well as the relative Bendtsen Smoothness (average) as compared with cellulosic sheets made without regenerated cellulose microfiber.

TABLE 12

Bendtsen Roughness and Relative Bendtsen Smoothness

| Description | % cmf | Bendtsen Roughness Ave-1 kg ml/min | Bendtsen Roughness Ave-5 kg ml/min | Relative Bendtsen Smoothness (Avg) 1 kg | Relative Bendtsen Smoothness (Avg) 5 kg |
|---|---|---|---|---|---|
| 0% cmf/100% NSK | 0 | 762 | 372 | 1.00 | 1.00 |
| 20% cmf/80% NSK | 20 | 382 | 174 | 2.00 | 2.14 |
| 50% cmf/50% NSK | 50 | 363 | 141 | 2.10 | 2.63 |
| 100% cmf/0% NSK | 100 | 277 | 104 | — | — |
| 0% cmf/100% SWK | 0 | 1,348 | 692 | 1.00 | 1.00 |
| 20% cmf/80% SWK | 20 | 590 | 263 | 2.29 | 2.63 |
| 50% cmf/50% SWK | 50 | 471 | 191 | 2.86 | 3.62 |
| 100% cmf/0% SWK | 100 | 277 | 104 | — | — |
| 0% cmf/100% Euc | 0 | 667 | 316 | 1.00 | 1.00 |
| 20% cmf/80% Euc | 20 | 378 | 171 | 1.76 | 1.85 |
| 50% cmf/50% Euc | 50 | 314 | 128 | 2.13 | 2.46 |
| 100% cmf/0% Euc | 100 | 277 | 104 | — | — |
| 0% cmf/100% SW BCTMP | 0 | 2,630 | 1,507 | 1.00 | 1.00 |
| 20% cmf/80% SW BCTMP | 20 | 947 | 424 | 2.78 | 3.55 |
| 50% cmf/50% SW BCTMP | 50 | 704 | 262 | 3.74 | 5.76 |
| 100% cmf/0% SW BCTMP | 100 | 277 | 104 | — | — |

Figure 27:
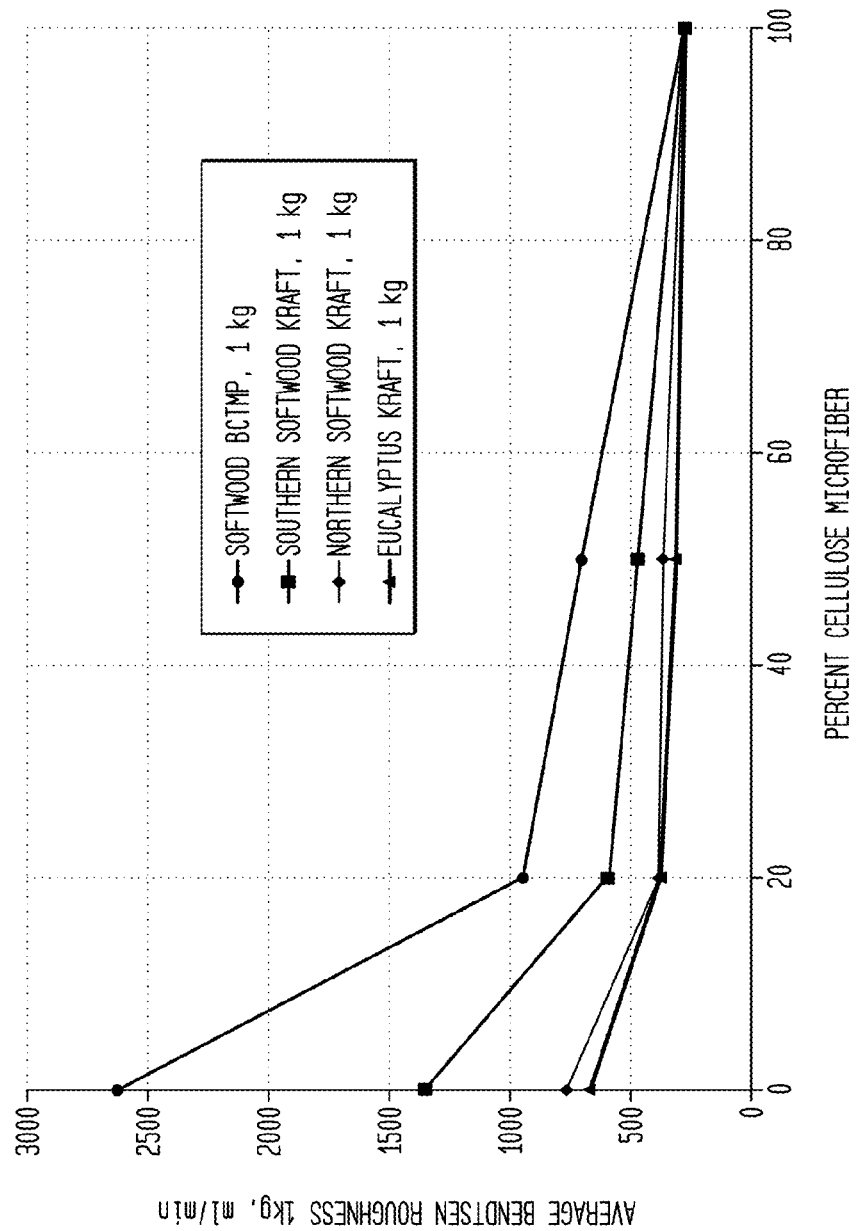
FIG. 27 is a plot of average Bendtsen Roughness @ 1 kg, ml/min versus percent by weight cellulose microfiber in the sheet.
Figure 28:
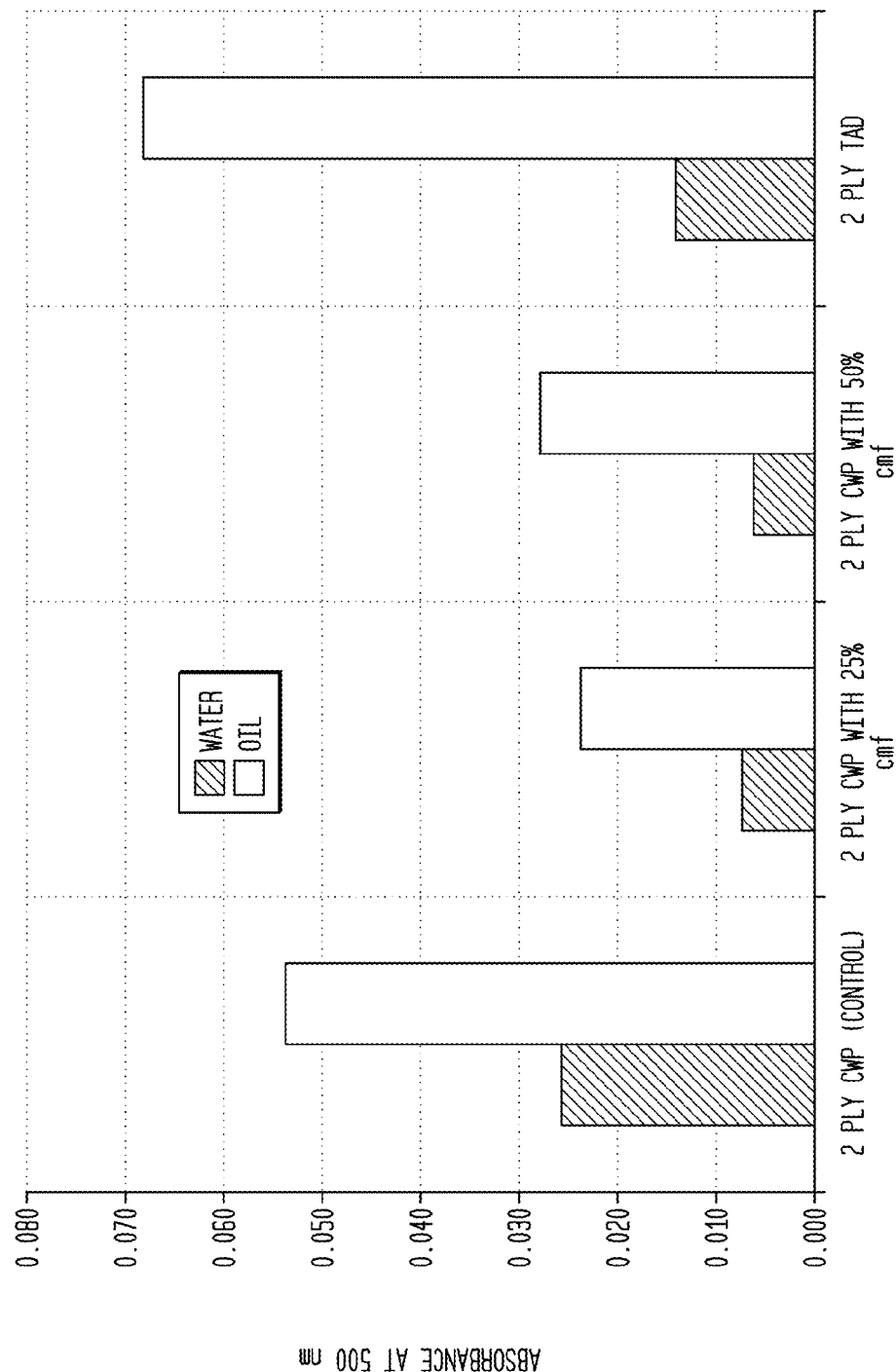
FIG. 28 is a histogram illustrating water and oil residue testing for wipers with and without cellulose microfiber.

Results also appear in FIG. 27 for Bendtsen Roughness at 1 kg pressure. The data in Table 10 and FIG. 27 show that Bendtsen Roughness decreases in a synergistic fashion, especially, at additions of fiber up to 50% or so. The relative smoothness of the sheets relative to a sheet without papermaking fiber ranged from about 1.7 up to about 6 in these tests.

Wiper Residue Testing

Utilizing, generally, the test procedure described in U.S. Pat. No. 4,307,143 to Meitner, the disclosure of which is incorporated herein by reference, wipers were prepared and tested for their ability to remove residue from a substrate.

Water residue results were obtained using a Lucite slide 3.2 inches wide by 4 inches in length with a notched bottom adapted to receive a sample and slide along a 2 inch wide glass plate of 18 inches in length. In carrying out the test, a 2.5 inch by 8 inch strip of towel to be tested was wrapped around the Lucite slide and taped in place. The top side of the sheet faces the glass for the test. Using a 0.5% solution of Congo Red water soluble indicator, from Fisher Scientific, the plate surface was wetted by pipetting 0.40 ml. drops at 2.5, 5, and 7 inches from one end of the glass plate. A 500 gram weight was placed on top of the notched slide and it was then positioned at the end of the glass plate with the liquid drops. The slide (plus the weight and sample) was then pulled along the plate in a slow smooth, continuous motion until it is pulled off the end of the glass plate. The indicator solution remaining on the glass plate was then rinsed into a beaker using distilled water and diluted to 100 ml. in a volumetric flask. The residue was then determined by absorbance at 500 nm using a calibrated Varian Cary 50 Conc UV-Vis Spectrophotometer.

Oil residue results were obtained similarly, using a Lucite slide 3.2 inches wide by 4 inches in length with a notched bottom adapted to receive a sample and slide along a 2 inch wide glass plate of 18 inches in length. In carrying out the test, a 2.5 inch by 8 inch strip of towel to be tested was wrapped around the Lucite slide and taped in place. The top side of the sheet faces the glass for the test. Using a 0.5% solution of Dupont Oil Red B HF (from Pylam Products Company Inc) in Mazola® corn oil, the plate surface was wetted by pippeting 0.15 ml. drops at 2.5 and 5 inches from the end of the glass plate. A 2000 gram weight was placed on top of the notched slide and it was then positioned at the end of the glass plate with the oil drops. The slide (plus the weight and sample) was then pulled along the plate in a slow smooth, continuous motion until it is pulled off of the end of the glass plate. The oil solution remaining on the glass plate was then rinsed into a beaker using Hexane and diluted to 100 ml. in a volumetric flask. The residue was then determined by absorbance at 500 nm using a calibrated Varian Cary 50 Conc UV-Vis Spectrophotometer.

Results appear in Tables 13, 14, and 15 below.

The conventional wet press (CWP) towel tested had a basis weight of about 24 lbs/3000 square feet ream, while the through-air dried (TAD) towel was closer to about 30 lbs/ream. One of skill in the art will appreciate that the foregoing tests may be used to compare different basis weights by adjusting the amount of liquid to be wiped from the glass plate. It will also be appreciated that the test should be conducted such that the weight of liquid applied to the area to be wiped is much less than the weight of the wiper specimen actually tested (that portion of the specimen applied to the area to be wiped), preferably, by a factor of three or more. Likewise, the length of the glass plate should be three or more times the corresponding dimension of the wiper to produce sufficient length to compare wiper performance. Under those conditions, one needs to specify the weight of liquid applied to the specimen and identify the liquid in order to compare performance.

TABLE 13

Wiper Oil and Water Residue Results

| | Absorbance at 500 nm | |
|---|---|---|
| Sample ID | Water | Oil |
| Two-Ply CWP (Control) | 0.0255 | 0.0538 |
| Two-Ply CWP with 25% CMF | 0.0074 | 0.0236 |
| Two-Ply CWP with 50% CMF | 0.0060 | 0.0279 |
| 2 Ply TAD | 0.0141* | 0.0679** |

*Volume of indicator placed on glass plate was adjusted to 0.54 mil/drop because of sample basis weight.
**Volume of oil placed on glass plate was adjusted to 0.20 mil/drop because of sample basis weight.

TABLE 14

Wiper Efficiency for Aqueous Residue

| | Water Residue Test | | | | |
|---|---|---|---|---|---|
| Sample ID | µL Residue | Solution Applied | Efficiency | g Residual | gsm |
| Two-Ply CWP (Control) | 12.3 | 1200 | 0.98975 | 0.0123 | 0.529584 |
| Two-Ply CWP with 25% CMF | 3.5 | 1200 | 0.997083 | 0.0035 | 0.150695 |
| Two-Ply CWP with 50% CMF | 2.8 | 1200 | 0.997667 | 0.0028 | 0.120556 |
| Two-Ply TAD | 6.8 | 1620 | 0.995802 | 0.0068 | 0.292778 |

TABLE 15

Wiper Efficiency for Oil

| | Oil Residue Test | | | | |
|---|---|---|---|---|---|
| Sample ID | µL Residue | Solution Applied | Efficiency | g Residual | gsm |
| Two-Ply CWP (Control) | 51.3 | 300 | 0.829 | 0.0472 | 2.03 |
| Two-Ply CWP with 25% CMF | 22.8 | 300 | 0.924 | 0.0210 | 0.90 |
| Two-Ply CWP with 50% CMF | 26.9 | 300 | 0.910 | 0.0247 | 1.07 |
| Two-Ply TAD | 64.6 | 400 | 0.839 | 0.0594 | 2.56 |

The relative efficiency of a wiper is calculated by dividing one minus wiper efficiency of a wiper without cmf by one minus wiper efficiency with cmf and multiplying by 100%.

$$\text{Relative Efficiency} = \left(\frac{1 - E_{withoutcmf}}{1 - E_{withcmf}}\right) * 100\%$$

Applying this formula to the above data, it is seen the wipers have the relative efficiencies seen in Table 16 for CWP sheets.

TABLE 16

Relative efficiency for CWP sheets

| Sample ID | Relative Efficiency for Water (%) | Relative Efficiency for Oil (%) |
|---|---|---|
| Two-Ply CWP (Control) | 100 | 100 |
| Two-Ply CWP with 25% CMF | 377 | 225 |
| Two-Ply CWP with 50% CMF | 471 | 190 |

The fibrillated cellulose microfiber is present in the wiper sheet in amounts of greater than 25 percent or greater than 35 percent or 40 percent by weight, and more based on the weight of fiber in the product in some cases. More than 37.5 percent, and so forth, may be employed as will be appreciated by one of skill in the art. In various products, sheets with more than 25%, more than 30% or more than 35%, 40% or more by weight of any of the fibrillated cellulose microfiber specified herein may be used depending upon the intended properties desired. Generally, up to about 75% by weight regenerated cellulose microfiber is employed, although one may, for example, employ up to 90% or 95% by weight regenerated cellulose microfiber in some cases. A minimum amount of regenerated cellulose microfiber employed may be over 20% or 25% in any amount up to a suitable maximum, i.e., 25+X (%) where X is any positive number up to 50 or up to 70, if so desired. The following exemplary composition ranges may be suitable for the absorbent sheet:

| % Regenerated Cellulose Microfiber | % Pulp-Derived Papermaking Fiber |
|---|---|
| >25 up to 95 | 5 to less than 75 |
| >30 up to 95 | 5 to less than 70 |
| >30 up to 75 | 25 to less than 70 |
| >35 up to 75 | 25 to less than 65 |
| 37.5-75 | 25-62.5 |
| 40-75 | 25-60 |

In some embodiments, the regenerated cellulose microfiber may be present from 10 to 75% as noted below, it being understood that the foregoing weight ranges may be substituted in any embodiment of the invention sheet if so desired.

The invention thereby thus provides a high efficiency disposable cellulosic wiper including from about 25% by weight to about 90% by weight of pulp derived papermaking fiber having a characteristic scattering coefficient of less than 50 m²/kg together with from about 10% to about 75% by weight fibrillated regenerated cellulosic microfiber having a characteristic CSF value of less than 175 ml. The microfiber is selected and present in amounts such that the wiper exhibits a scattering coefficient of greater than 50 m²/kg. In its various embodiments, the wiper exhibits a scattering coefficient of greater than 60 m²/kg, greater than 70 m²/kg or more. Typically, the wiper exhibits a scattering coefficient between 50 m²/kg and 120 m²/kg such as from about 60 m²/kg to about 100 m²/kg.

The fibrillated regenerated cellulosic microfiber may have a CSF value of less than 150 ml, such as less than 100 ml, or less than 50 ml. CSF values of less than 25 ml or 0 ml are likewise suitable.

The wiper may have a basis weight of from about 5 lbs per 3000 square foot ream to about 60 lbs per 3000 square foot ream. In many cases, the wiper will have a basis weight of from about 15 lbs per 3000 square foot ream to about 35 lbs per 3000 square foot ream together with an absorbency of at least about 4 g/g. Absorbencies of at least about 4.5 g/g, 5 g/g, 7.5 g/g are readily achieved. Typical wiper products may have an absorbency of from about 6 g/g to about 9.5 g/g.

The cellulose microfiber employed in connection with the present invention may be prepared from a fiber spun from a cellulosic dope including cellulose dissolved in a tertiary amine N-oxide. Alternatively, the cellulose microfiber is prepared from a fiber spun from a cellulosic dope including cellulose dissolved in an ionic liquid.

The high efficiency disposable cellulosic wiper of the invention may have a breaking length from about 2 km to about 9 km in the MD and a breaking length of from about 400 m to about 3000 m in the CD. A wet/dry CD tensile ratio of between about 35% and 60% is desirable. A CD wet/dry tensile ratio of at least about 40% or at least about 45% is readily achieved. The wiper may include a dry strength resin such as carboxymethyl cellulose and a wet strength resin such as a polyamidamine-epihalohydrin resin. The high efficiency disposable cellulosic wiper generally has a CD break modulus of from about 50 g/in/% to about 400 g/in/% and a MD break modulus of from about 20 g/in/% to about 100 g/in/%.

Various ratios of pulp derived papermaking fiber to cellulose microfiber may be employed. For example, the wiper may include from about 30 weight percent to an 80 weight percent pulp derived papermaking fiber and from about 20 weight percent to about 70 weight percent cellulose microfiber. Suitable ratios also include from about 35 percent by weight papermaking fiber to about 70 percent by weight pulp derived papermaking fiber and from about 30 percent by weight to about 65 percent by weight cellulose microfiber. Likewise, 40 percent to 60 percent by weight pulp derived papermaking fiber may be used with 40 percent by weight to about 60 percent by weight cellulose microfiber. The microfiber is further characterized in some cases in that the fiber is 40 percent by weight finer than 14 mesh. In other cases, the microfiber may be characterized in that at least 50, 60, 70, or 80 percent by weight of the fibrillated regenerated cellulose microfiber is finer than 14 mesh. So also, the microfiber may have a number average diameter of less than about 2 microns, suitably, between about 0.1 and about 2 microns. Thus, the regenerated cellulose microfiber may have a fiber count of greater than 50 million fibers/gram or greater than 400 million fibers/gram. A suitable regenerated cellulose microfiber has a weight average diameter of less than 2 microns, a weight average length of less than 500 microns, and a fiber count of greater than 400 million fibers/gram such as a weight average diameter of less than 1 micron, a weight average length of less than 400 microns and a fiber count of greater than 2 billion fibers/gram. In still other cases, the regenerated cellulose microfiber has a weight average diameter of less than 0.5 microns, a weight average length of less than 300 microns and a fiber count of greater than 10 billion fibers/gram. In another embodiment, the fibrillated regenerated cellulose microfiber has a weight average diameter of less than 0.25 microns, a weight average length of less than 200 microns and a fiber count of greater than 50 billion fibers/gram. Alternatively, the fibrillated regenerated cellulose microfiber may have a fiber count of greater than 200 billion fibers/gram and/or a coarseness value of less than about 0.5 mg/100 m. A coarseness value for the regenerated cellulose microfiber may be from about 0.001 mg/100 m to about 0.2 mg/100 m.

The wipers of the invention may be prepared on conventional papermaking equipment, if so desired. That is to say, a suitable fiber mixture is prepared in an aqueous furnish composition, the composition is deposited on a foraminous support and the sheet is dried. The aqueous furnish generally has a consistency of 5% or less, more typically, 3% or less, such as 2% or less, or 1% or less. The nascent web may be compactively dewatered on a papermaking felt and dried on a Yankee dryer or compactively dewatered and applied to a rotating cylinder and fabric creped therefrom. Drying techniques include any conventional drying techniques, such as through-air drying, impingement air drying, Yankee drying, and so forth. The fiber mixture may include pulp derived papermaking fibers such as softwood kraft and hardwood kraft.

The wipers of the invention are used to clean substrates such as glass, metal, ceramic, countertop surfaces, appliance surfaces, floors, and so forth. Generally speaking, the wiper is effective to remove residue from a surface such that the surface has less than 1 g/m²; suitably, less than 0.5 g/m²; still more suitably, less 0.25 g/m² of residue and, in most cases, less than 0.1 g/m² of residue or less than 0.01 g/m² of residue. Still more preferably, the wipers will remove substantially all of the residue from a surface.

A still further aspect of the invention provides a high efficiency disposable cellulosic wiper including from about 25 percent by weight to about 90 percent by weight pulp derived papermaking fiber and from about 10 percent by weight to about 75 percent by weight regenerated cellulosic microfiber having a characteristic CSF value of less than 175 ml, wherein the microfiber is selected and present in amounts such that the wiper exhibits a relative wicking ratio of at least 1.5. A relative wicking ratio of at least about 2 or at least about 3 is desirable. Generally, the wipers of the invention have a relative wicking ratio of about 1.5 to about 5 or 6 as compared with a like wiper prepared without microfiber.

Wipers of the invention also suitably exhibit an average effective pore radius of less than 50 microns such as less than 40 microns, less than 35 microns, or less than 30 microns. Generally, the wiper exhibits an average effective pore radius of from about 15 microns to less than 50 microns.

In still another aspect, the invention provides a disposable cellulosic wiper as described herein and above, wherein the wiper has a surface that exhibits a relative Bendtsen Smoothness at 1 kg of at least 1.5 as compared with a like wiper prepared without microfiber. The relative Bendtsen Smoothness at 1 kg is typically at least about 2, suitably, at least about 2.5 and, preferably, 3 or more in many cases. Generally, the relative Bendtsen Smoothness at 1 kg is from about 1.5 to about 6 as compared with a like wiper prepared without microfiber. In many cases, the wiper will have a surface with a Bendtsen Roughness 1 kg of less than 400 ml/min. Less than 350 ml/min or less than 300 ml/min are desirable. In many cases, a wiper surface will be provided having a Bendtsen Roughness 1 kg of from about 150 ml/min to about 500 ml/min.

A high efficiency disposable cellulosic wiper may, therefore, include (a) from about 25% by weight to about 90% by weight pulp-derived papermaking fiber, and (b) from about 10% to about 75% by weight regenerated cellulosic microfiber having a characteristic CSF value of less than 175 ml, the microfiber being selected and present in amounts such that the wiper exhibits a relative water residue removal efficiency of at least 150% as compared with a like sheet without regenerated cellulosic microfiber. The wiper may exhibit a relative water residue removal efficiency of at least 200% as compared with a like sheet without regenerated cellulosic microfiber, or the wiper exhibits a relative water residue removal efficiency of at least 300% or 400% as compared with a like sheet without regenerated cellulosic microfiber. Relative water residue removal efficiencies of from 150% to about 1,000% may be achieved as compared with a like sheet without regenerated cellulosic microfiber. Like efficiencies are seen with oil residue.

In still yet another aspect of the invention, a high efficiency disposable cellulosic wiper may include (a) from about 25% by weight to about 90% by weight pulp-derived papermaking fiber, and (b) from about 10% to about 75% by weight regenerated cellulosic microfiber having a characteristic CSF value of less than 175 ml, the microfiber being selected and present in amounts such that the wiper exhibits a Laplace pore volume fraction at pore sizes less than 15 microns of at least 1.5 times that of a like wiper prepared without regenerated cellulose microfiber. The wiper may exhibit a Laplace pore volume fraction at pore sizes less than 15 microns of at least twice, and three times or more than that of a like wiper prepared without regenerated cellulose microfiber. Generally, a wiper suitably exhibits a Laplace pore volume fraction at pore sizes less than 15 microns from 1.5 to 5 times that of a like wiper prepared without regenerated cellulose microfiber.

Capillary pressure is also indicative of the pore structure. Thus, a high efficiency disposable cellulosic wiper may exhibit a capillary pressure at 10% saturation by extrusion porosimetry of at least twice or three, four, or five times that of a like sheet prepared without regenerated cellulose microfiber. Generally, a preferred wiper exhibits a capillary pressure at 10% saturation by extrusion porosimetry from about 2 to about 10 times that of a like sheet prepared without regenerated cellulose microfiber.

While the invention has been described in connection with several examples, modifications to those examples within the spirit and scope of the invention will be readily apparent to those of skill in the art. In view of the foregoing discussion, relevant knowledge in the art and references including copending applications discussed above in connection with the Background and Detailed Description, the disclosures of which are all incorporated herein by reference, further description is deemed unnecessary.

We claim:

1. A method of cleaning residue from a surface, the method comprising:
   (A) providing a disposable cellulosic wiper comprising (a) a percentage by weight of pulp-derived papermaking fibers, and (b) from about 10% to about 75% by weight of fibrillated regenerated independent cellulosic microfibers having a number average diameter of less than about 2 microns and a characteristic Canadian Standard Freeness (CSF) value of less than 175 ml, the microfibers being selected and present in amounts such that the wiper exhibits a relative wicking ratio of at least 1.5;
   (B) applying the wiper, with a predetermined amount of pressure, to a residue-bearing surface; and
   (C) wiping the surface with the applied wiper, while applying the predetermined amount of pressure, to remove residue from the surface, such that the surface has less than 1 $g/m^2$ of residue after being wiped under the predetermined amount of pressure with the applied wiper.

2. The method of cleaning residue from a surface according to claim 1, wherein the surface is selected from the group consisting of glass, metal, ceramic, a countertop, an appliance, and a floor.

3. The method of cleaning residue from a surface according to claim 1, wherein the surface has less than 0.5 $g/m^2$ of residue after being wiped with the applied wiper.

4. The method of cleaning residue from a surface according to claim 1, wherein the surface has less than 0.25 $g/m^2$ of residue after being wiped with the applied wiper.

5. The method of cleaning residue from a surface according to claim 1, wherein the surface has less than 0.1 $g/m^2$ of residue after being wiped with the applied wiper.

6. The method of cleaning residue from a surface according to claim 1, wherein the surface has less than 0.01 $g/m^2$ of residue after being wiped with the applied wiper.

7. The method of cleaning residue from a surface according to claim 1, wherein the percentage by weight of the pulp-derived papermaking fibers is 25% or more.

8. The method of cleaning residue from a surface according to claim 1, wherein the wiper includes more than 25% by weight of the fibrillated regenerated independent cellulosic microfibers.

9. The method of cleaning residue from a surface according to claim 1, wherein the wiper includes more than 30% by weight of the fibrillated regenerated independent cellulosic microfibers.

10. The method of cleaning residue from a surface according to claim 1, wherein the wiper includes more than 35% by weight of the fibrillated regenerated independent cellulosic microfibers.

11. The method of cleaning residue from a surface according to claim 1, wherein the wiper exhibits a relative wicking ratio of at least 2.

12. The method of cleaning residue from a surface according to claim 1, wherein the wiper exhibits a relative wicking ratio of at least 3.

13. The method of cleaning residue from a surface according to claim 1, wherein the wiper exhibits a relative wicking ratio of from 1.5 to about 5.

14. The method of cleaning residue from a surface according to claim 1, wherein the wiper comprises from about 30% by weight to about 75% by weight of the pulp-derived papermaking fibers and up to 70% by weight of the fibrillated regenerated independent cellulosic microfibers.

15. The method of cleaning residue from a surface according to claim 1, wherein the wiper comprises from about 35% by weight to about 70% by weight of the pulp-derived papermaking fibers and from about 30% by weight to about 65% by weight of the fibrillated regenerated independent cellulosic microfibers.

16. The method of cleaning residue from a surface according to claim 1, wherein the wiper comprises from about 40% by weight to about 60% by weight of the pulp-derived papermaking fibers and from about 40% by weight to about 60% by weight of the fibrillated regenerated independent cellulosic microfibers.

17. The method of cleaning residue from a surface according to claim 1, wherein the wiper contains kraft softwood fibers and the fibrillated regenerated independent cellulosic microfibers.

18. The method of cleaning residue from a surface according to claim 17, wherein the fibrillated regenerated independent cellulosic microfibers are prepared from fiber spun from a cellulosic dope comprising cellulose dissolved in a tertiary amine N-oxide.

19. The method of cleaning residue from a surface according to claim 17, wherein the fibrillated regenerated independent cellulosic microfibers are prepared from fiber spun from a cellulosic dope comprising cellulose dissolved in an ionic liquid.

* * * * *